(12) United States Patent
Ma et al.

(10) Patent No.: US 11,027,453 B2
(45) Date of Patent: Jun. 8, 2021

(54) CUTTING TOOL

(71) Applicant: Positec Power Tools (Suzhou) Co., Ltd., Jiangsu (CN)

(72) Inventors: Yichun Ma, Suzhou (CN); Shisong Zhang, Suzhou (CN); Hongfeng Zhong, Suzhou (CN); Xiangliang Zhang, Suzhou (CN); Jingtao Xu, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 16/229,811

(22) Filed: Dec. 21, 2018

(65) Prior Publication Data
US 2019/0168405 A1 Jun. 6, 2019

Related U.S. Application Data

(63) Continuation of application No. PCT/CN2017/091505, filed on Jul. 3, 2017.

(30) Foreign Application Priority Data

Jul. 1, 2016 (CN) .......................... 201610504622.7

(51) Int. Cl.
*B27B 9/04* (2006.01)
*B23D 47/02* (2006.01)
*B23D 47/04* (2006.01)

(52) U.S. Cl.
CPC ................ *B27B 9/04* (2013.01); *B23D 47/02* (2013.01); *B23D 47/04* (2013.01)

(58) Field of Classification Search
CPC .... B27B 9/00; B27B 9/02; B27B 9/04; B23D 47/04; B23D 47/02
See application file for complete search history.

(56) References Cited

U.S. PATENT DOCUMENTS

| 3,242,953 A | 3/1966 | McCarty et al. |
| 3,447,577 A | 6/1969 | Burrows et al. |

(Continued)

FOREIGN PATENT DOCUMENTS

| CN | 201644918 U | 11/2010 |
| CN | 201824012 U | 5/2011 |

(Continued)

OTHER PUBLICATIONS

English Translation of CN107876876 (Year: 2018).*

(Continued)

*Primary Examiner* — Jennifer B Swinney
(74) *Attorney, Agent, or Firm* — Middleton Reutlinger

(57) ABSTRACT

Embodiments of the invention provides a cutting tool. The cutting tool includes a housing; a motor, accommodated in the housing; a transmission mechanism, connected to the motor and used for driving a saw blade, having a saw blade plane; and base plates, connected to the housing and comprising a first base plate provided with a first bottom surface and a second base plate provided with a second bottom surface, wherein at least one of the first base plate and the second base plate is provided with an abutting surface coplanar with the saw blade plane; the abutting surface is used for being matched with a guide surface, and the first base plate and the second base plate are movable to expose the abutting surface.

12 Claims, 50 Drawing Sheets

(56) References Cited

U.S. PATENT DOCUMENTS

| | | | |
|---|---|---|---|
| 4,079,648 A | | 3/1978 | Chappell |
| 4,856,394 A | * | 8/1989 | Glowers .............. B23D 59/006 |
| | | | 83/56 |
| 7,159,323 B2 | | 1/2007 | Petrenko |
| 7,971,361 B2 | * | 7/2011 | Fukinuki .................. B27B 9/00 |
| | | | 30/373 |
| 2005/0262706 A1 | * | 12/2005 | Yoshida .............. B23Q 11/005 |
| | | | 30/388 |

FOREIGN PATENT DOCUMENTS

| | | | | | |
|---|---|---|---|---|---|
| CN | 102689049 | A | | 12/2012 | |
| CN | 203357500 | U | | 12/2013 | |
| CN | 203944920 | U | | 11/2014 | |
| CN | 104874861 | | * | 9/2015 | |
| CN | 104874861 | A | | 9/2015 | |
| DE | 102010001913 | A1 | * | 8/2011 | ............... B27B 9/04 |
| EP | 2105231 | A2 | * | 9/2009 | ............... B27B 9/02 |
| GB | 2164292 | B | | 6/1988 | |
| JP | 05124002 | A | * | 5/1993 | ............... B27B 9/02 |

OTHER PUBLICATIONS

English Translation of CN104874861. (Year: 2015).*
State Intellectual Property Office of the P.R. China, International Search Report and Written Opinion for PCT/CN2017/091505 (English Translation included) dated Sep. 5, 2017.

* cited by examiner

CUTTING TOOL

BACKGROUND

Technical Field

The present invention relates to a cutting tool.

Related Art

A cutting tool, for example, an electric circular saw is a common electric tool for people to cut a workpiece by a saw blade. When the workpiece is cut, a general manner is that a base plate of the cutting tool is placed on the workpiece, meanwhile, the saw blade is aligned with a cutting line marked on the workpiece, and then the cutting tool is pushed on the surface of the workpiece to perform cutting.

SUMMARY

An operator usually cannot ensure a cutting precision due to artificial factors in a cutting process, and working efficiency is also lower.

An existing solution is to guide with a guide device, during cutting, a lateral side of the base plate of the cutting tool parallel with the saw blade is abutted against a guide surface of the guide device, then the cutting tool is moved to cut, such lateral side of the base plate of the cutting tool is enabled to always move along the guide surface, and the problems of lower cutting precision and lower working efficiency caused by the artificial factors can be avoided. But this solution still has a problem, due to a certain width of the base plate of the cutting tool, there exists a certain distance between the saw blade and the lateral side of the base plate, therefore, people cannot directly align the guide surface of the guide device with the cutting line marked on the workpiece, but need to firstly measure the distance between the saw blade and the lateral side of the base plate, and then fix the guide device in a position that an interval between the guide surface and the cutting line is equal to the distance, the operation is relatively troublesome, and the working efficiency is lower especially when the cutting that the position of the guide device needs to be constantly changed is performed; and a certain error possibly exists when in measuring and when the position of the guide device is set according to a measuring result, as a result, a certain deviation possibly exists between an actual cutting result of the cutting tool and the cutting line, and a cutting precision is lower.

In order to overcome the defects of the prior art, a problem to be solved by the present invention is to provide a cutting tool convenient to use.

In order to solve the above problem, an aspect of the disclosure provides:

A cutting tool, used for cutting with a guide device being provided with a guide surface, wherein the cutting tool comprising: a housing; a motor, accommodated in the housing; a transmission mechanism being configured to be connected to the motor and used for driving a saw blade, wherein the blade is provided with a saw blade plane; and base plates connected to the housing, and the base plates comprising a first base plate provided with a first bottom surface and a second base plate provided with a second bottom surface, wherein at least one of the first base plate and the second base plate is provided with an abutting surface coplanar with the saw blade plane, the abutting surface is used for being matched with the guide surface, and the first base plate and the second base plate are relatively movable to expose the abutting surface.

In an embodiment, the first base plate and the second base plate are rotatable.

In an embodiment, the first base plate is rotatable relative to the second base plate around an axis parallel to the abutting surface.

In an embodiment, the first base plate is translational relative to the second base plate by a connecting mechanism.

In an embodiment, the connecting mechanism comprises a swing arm, one end of the swing arm is pivotally connected with the first base plate by a first pivoting shaft, the other end of the swing arm is pivotally connected with the second base plate by a second pivoting shaft, and the first pivoting shaft and the second pivoting shaft are perpendicular to the abutting surface.

In an embodiment, one of a first base plate and a second base plate is provided with a waist-shaped hole, and at least one of a first pivoting shaft and a second pivoting shaft moves in the waist-shaped hole.

In an embodiment, a connecting mechanism comprises a first connecting rod and a second connecting disposed in parallel, wherein one end of the first connecting rod is in pivoting connection with the first base plate around the axis of a first rotary shaft, the other end of the first connecting rod is in pivoting connection with the second base plate around the axis of a third axis, one end of the second connecting rod is in pivoting connection with the first base plate around the axis of a second rotary shaft, the other end of the second connecting rod is in pivoting connection with the second bottom around the axis of a fourth rotary shaft, and the axes of the first, second, third and fourth rotary shafts are disposed in parallel with an abutting surface.

In an embodiment, the connecting mechanism comprises a linear slide rail disposed on one of the first base plate and the second base plate and a sliding matching-connecting member disposed on the other of the first base plate and the second base plate, and the sliding matching-connecting member is matched with the linear slide rail.

In an embodiment, the connecting mechanism comprises a sliding guiding part disposed on at least one of the first base plate and the second base plate and a sliding fixing member matched with the sliding guiding part, when the sliding fixing member is released, the second base plate can slide relative to the first base plate, and when the sliding fixing member is fixed, the second base plate is fixed relative to the first base plate.

In an embodiment, the first base plate is slidable relative to the second base plate.

In an embodiment, the first base plate slides along a direction perpendicular to a first bottom surface relative to the second base plate.

In an embodiment, the abutting surface is perpendicular to the first bottom surface.

In an embodiment, the blade is provided with an end surface away from a transmission mechanism, the end surface is defined as a first lateral cutting plane, and the first lateral cutting plane and the abutting surface are coplanar.

In an embodiment, the blade is provided with an end surface away from a transmission mechanism, the end surface is defined as a first lateral cutting plane, and the first lateral cutting plane is positioned between the transmission mechanism and the abutting surface.

In an embodiment, the blade is provided with an end surface away from a transmission mechanism, the end surface is defined as a first lateral cutting plane, and a distance between the first lateral cutting plane and the abutting surface is smaller than or equal to 3 mm.

In an embodiment, the distance between the first lateral cutting plane and the abutting surface is between 0.5 mm-0.8 mm.

In an embodiment, the first base plate is provided with a first abutting surface, the second base plate is provided with a second abutting surface, and the first abutting surface and the second abutting surface are alternatively matched with a guide surface.

In an embodiment, the blade is provided with an end surface away from the transmission mechanism and an end surface close to the transmission mechanism, the end surface away from the transmission mechanism is defined as a first lateral cutting plane, the end surface close to the transmission mechanism is defined as a second lateral cutting plane, the first lateral cutting plane and the first abutting surface are coplanar, and the second lateral cutting plane and the second abutting surface are coplanar.

In an embodiment, a distance between the first abutting surface and the second abutting surface is not smaller than that of the first lateral cutting plane and the second lateral cutting plane.

In an embodiment, the blade is provided with an end surface away from the transmission mechanism and an end surface close to the transmission mechanism, the end surface away from the transmission mechanism is defined as a first lateral cutting plane, the end surface close to the transmission mechanism is defined as a second lateral cutting plane, the first lateral cutting plane is positioned between the transmission mechanism and the first abutting surface, and the second lateral cutting plane is positioned between the second lateral cutting plane and the transmission mechanism.

In an embodiment, the cutting tool further comprise a mode switching mechanism, the mode switching mechanism can be set in two positions, when it is in the first position, the mode switching mechanism prevents the relative movement of the first base plate and the second base plate; and when it is in the second position, the mode switching mechanism allows the relative movement of the first base plate and the second base plate t.

In an embodiment, a maximal distance that the saw blade extends out of the first bottom surface is defined as a maximal cutting depth of the cutting tool, when the mode switching mechanism is in the first position, the cutting tool is set by a first maximal cutting depth, when the mode switching mechanism is in the second position, the cutting tool is set by a second maximal cutting depth, and the second maximal cutting depth is smaller than the first maximal cutting depth.

In an embodiment, when the mode switching mechanism is in the second position, it prevents the saw blade from being inclined relative to the first bottom surface.

In an embodiment, the mode switching mechanism comprises a stopping member connected on one of the first base plate and the second base plate and a matching part selectively matched with the stopping member, and in the first position, the stopping member is matched with the matching part; and in the second position, the matching part is dis-matched from the matching part.

In an embodiment, the mode switching mechanism comprises a depth limiting portion connected to a housing, and in the second position, the stopping member is matched with the depth limiting portion to limit a distance that the saw blade can extend out of the first bottom surface.

In an embodiment, the mode switching mechanism comprises a beveling limiting portion connected to the housing, and in a second mode, the stopping member is matched with the beveling limiting portion to limit the saw blade from being inclined relative to the first bottom surface.

In order to solve the above problem, an aspect of the disclosure provides: a cutting tool, comprising: a housing; a motor, accommodated in the housing; a transmission mechanism, connected to the motor and used for driving a saw blade; base plates, connected to the housing, and comprising a first base plate provided with a first bottom surface and a second base plate provided with a second bottom surface, wherein the first base plate and the second base plate are movably connected, such that the base plate can be set in a first position where the first bottom surface and the second bottom surface are coplanar and a second position where the first bottom surface and the second bottom surface are non-coplanar.

In an embodiment, an elastic element is disposed between the first base plate and the second base plate, and the elastic element provides an elastic force promoting the second bottom surface to move toward a direction coplanar with the first bottom surface.

In an embodiment, when the first bottom surface and the second bottom surface are non-coplanar, the first bottom surface is parallel to the second bottom surface.

In order to solve the above problem, an aspect of the disclosure provides: a cutting tool, used for cutting with a guide device being provided with a guide surface, wherein the cutting tool comprising: a housing; a motor, accommodated in the housing; a transmission mechanism, connected to the motor and the used for driving a saw blade; and base plates, connected to the housing and comprising a first base plate provided with a first bottom surface and a second base plate provided with a second bottom surface, wherein at least one of the first base plate and the second base plate is provided with an abutting surface, and when the abutting surface is exposed to be matched with the guide surface, the first bottom surface and the second bottom surface are non-coplanar.

In order to solve the above problem, an aspect of the disclosure provides: a cutting tool, used for cutting with a guide device being provided with a guide surface, wherein the cutting tool comprising: a housing; a motor, accommodated in the housing; a transmission mechanism, connected to the motor and used for driving a saw blade; and base plates, connected to the housing and comprising a first base plate provided with a first bottom surface and a second base plate provided with a second bottom surface, wherein at least one of the first base plate and the second base plate is provided with an abutting surface, and when the abutting surface is matched with the guide surface, the first bottom surface or the second bottom surface is supported by the guide device.

Compared with the prior art, the cutting tool provided by the present invention has the advantages that since the abutting surface can be exposed by relative movement of the first base plate and the second base plate, when a workpiece is cut, by matching the abutting surface with the guide surface, the cutting tool can be moved for cutting, and the operation is very convenient.

BRIEF DESCRIPTION OF THE DRAWINGS

The present invention is further explained in combination with drawings and embodiments.

DETAILED DESCRIPTION

In the embodiment, an inventive concept of the present invention is elaborated by taking an electric circular saw and a jig saw as examples. However, a power tool of the present invention is not limited to the electric circular saw and the jig saw and can be other portable power tools. In addition, in the description of the present invention, unless otherwise pointed out, the direction terms such as front, back, left, right, upper, lower and the like are all relative directions when the power tool as shown in FIG. 1 is normally used, for example, an advancing direction of the power tool is defined as the front, and the direction opposite to the advancing direction is defined as the back, etc.

FIGS. 1 to 8 show a cutting tool 1 provided by an example embodiment of the present invention.

Figure 1:
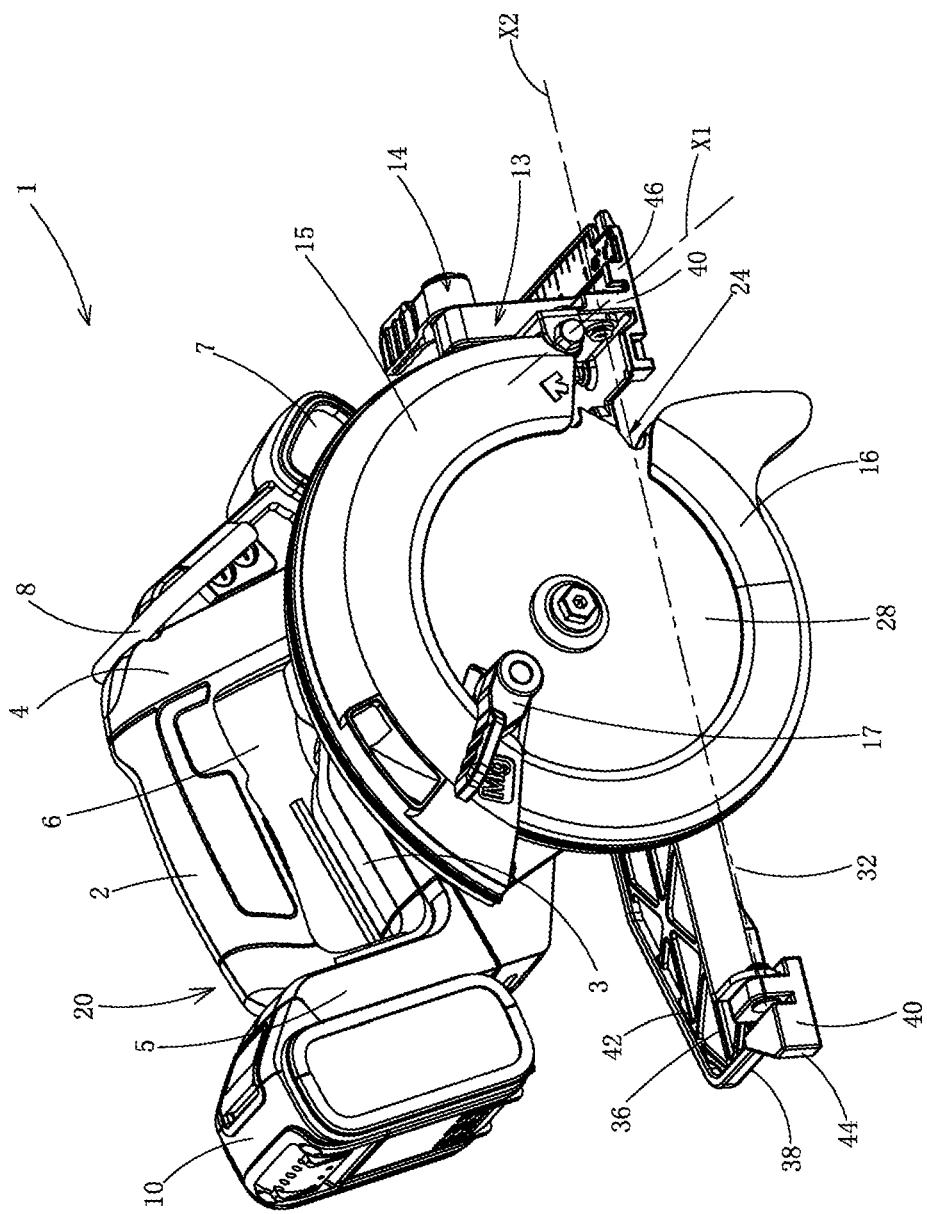
FIG. 1 is a perspective view from the front side of a cutting tool provided by an example embodiment of the present invention.
Figure 2:
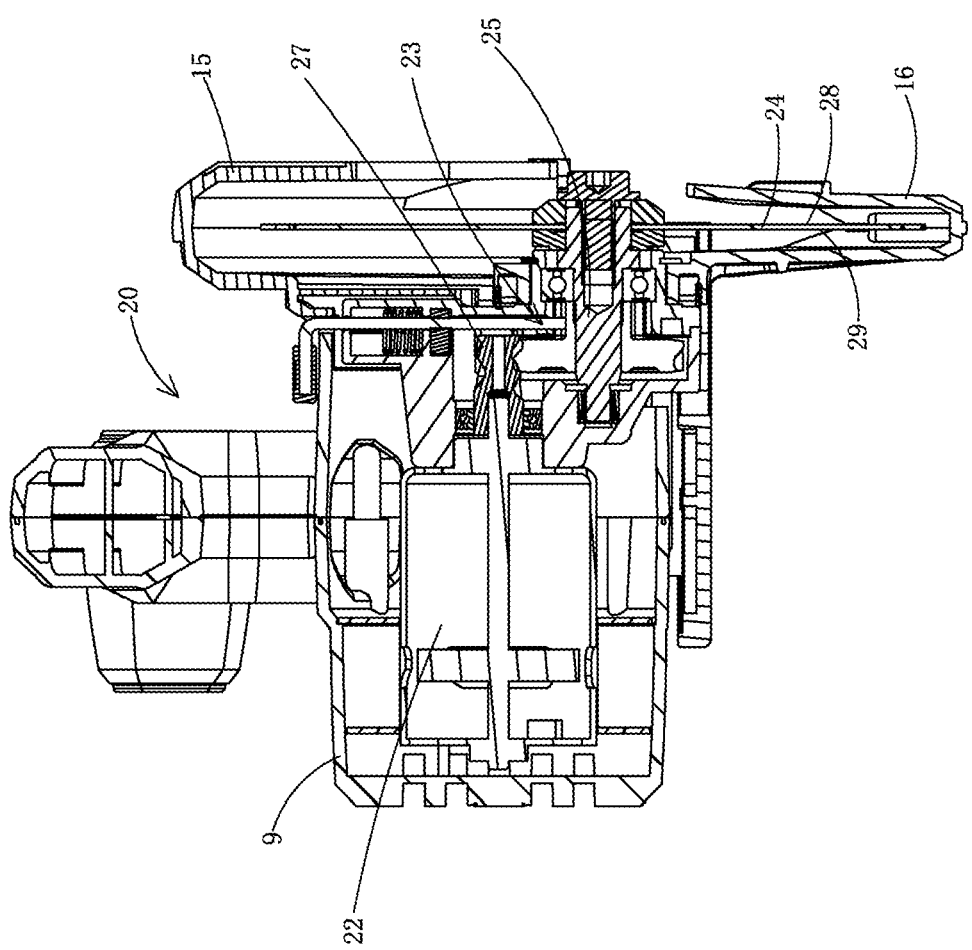
FIG. 2 is a section view of a cutting tool as shown in FIG. 1.
Figure 3:
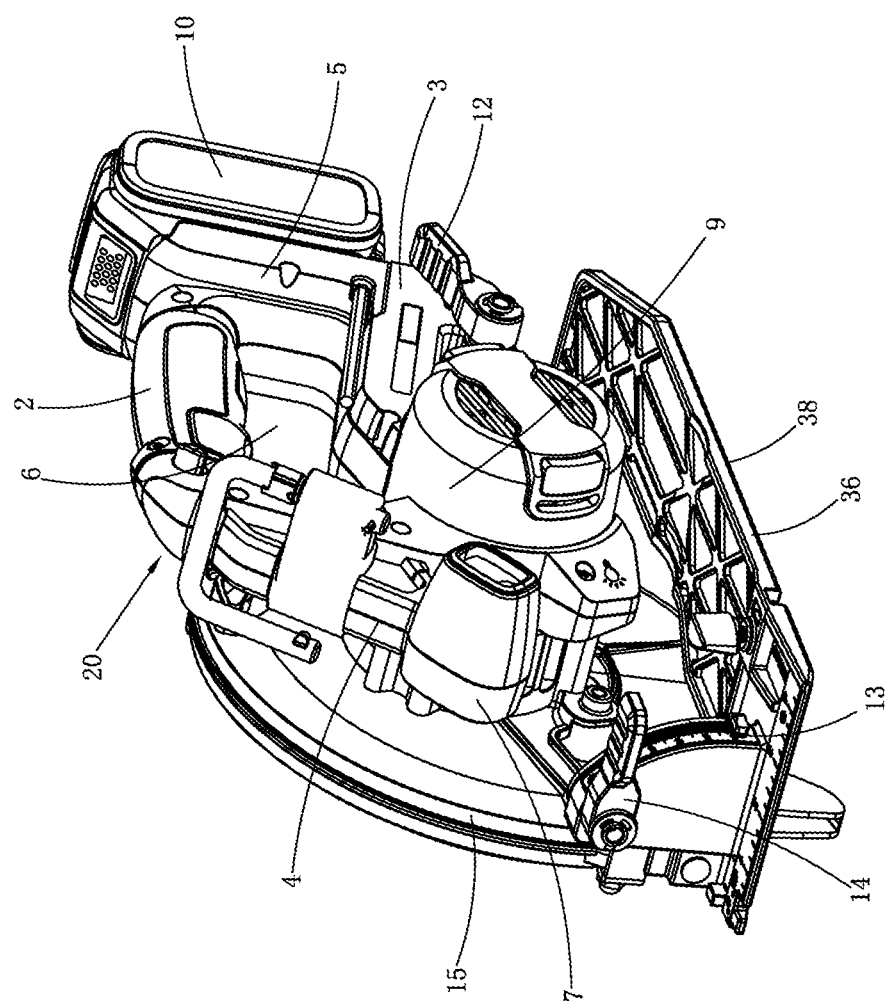
FIG. 3 is a perspective view from the back side of the cutting tool as shown in FIG. 1.
Figure 4:
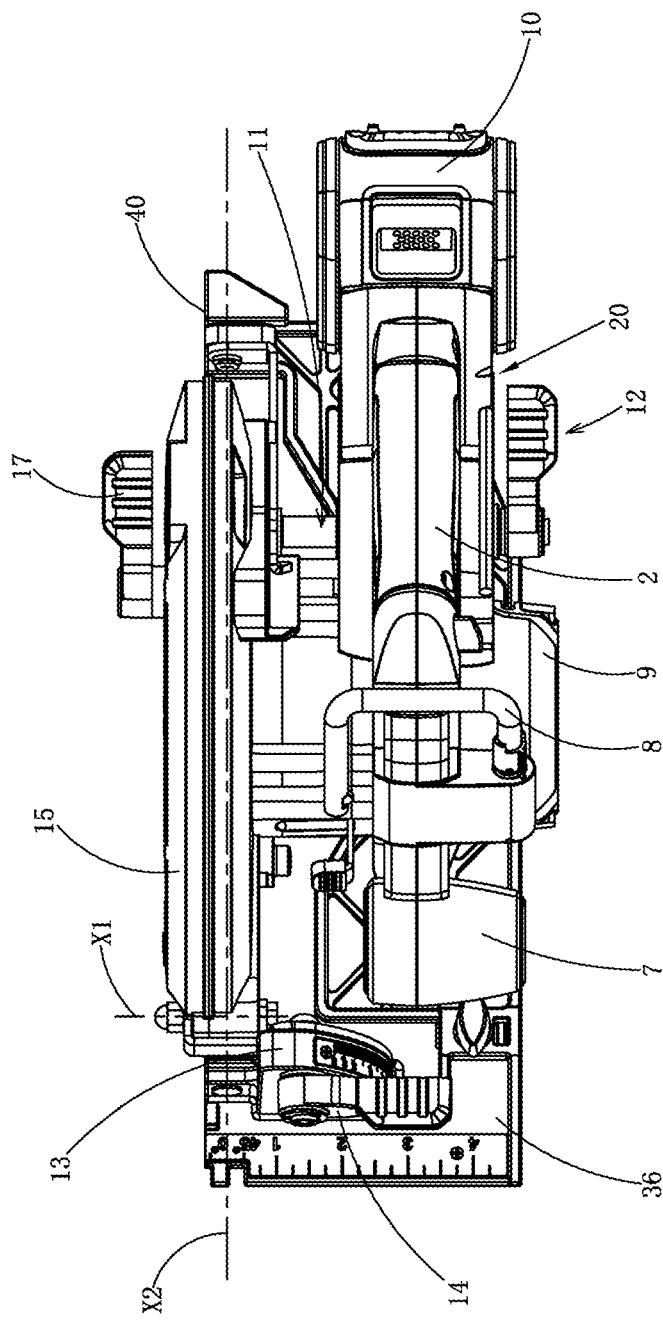
FIG. 4 is a top view of the cutting tool as shown in FIG. 1.

Referring to FIGS. 1 to 3, the cutting tool 1 of the present embodiment comprises a housing 20, a motor 22 contained in the housing 20, a saw blade driven by the motor 22 through a transmission mechanism 23, and a base plate 36 connected to the housing 20.

The housing 20 is used for containing the motor, the transmission mechanism, etc., and a specific structure and shape thereof can be various. In the present embodiment, the housing 20 can be an injection molding part, and consists of two half housings. The whole housing 20 is D-shaped approximately, and by taking an advancing direction in which the saw blade 24 cuts a workpiece as a reference, the housing 20 comprises an upper support 2, a front support 4, a lower support 3 and a back support 5 which are connected in sequence. A holding space 6 for the hand of an operator to extend into and hold is defined by the four supports.

The upper support 2 extends longitudinally to form a strip shape, is used as a main handle for holding, and has a holding part for the operator to hold.

The front support 4 extends longitudinally to form a strip shape, and a plane defined by extending axis of the front support 4 and the upper support 2 is approximately parallel to the saw blade 24. An included angle of being larger than or equal to 90 degrees is formed between the extending axis of the front support 4 and the upper support 2. The extending most front end of the front support 4 is provided with an auxiliary handle 7. The front support 4 is further provided with a hook 8 for hanging the cutting tool 1.

The lower support 3 and the upper support 2 are oppositely disposed approximately, a motor housing 9 for containing the motor is disposed in a junction between the lower support 3 and the front support 4, the motor housing 9 longitudinally extends, and an extending axis thereof is parallel to the saw blade 24.

The back support 5 longitudinally extends to form a strip shape and an included angle of about 90 degrees is formed between the extending axis of the back support 5 and the upper support 2. The back support 5 is provided with a battery pack mounting portion and a direct current battery pack 10 can be mounted on the housing 20 by the mounting portion to provide power for the motor. In the present embodiment, the battery pack mounting portion is provided with a slide rail (not shown) extending along an extending direction of the back support 5, the battery pack 10 is in sliding match with the housing 20 by the slide rail, an extending direction of the slide rail is parallel to the saw blade 24, and therefore, the battery pack 10 is in sliding match with the housing 20 in a direction parallel with the saw blade 24.

As shown in FIG. 2, the saw blade 24 of the present embodiment is a circular saw blade, and is matched on a saw blade shaft 25. Since the saw blade 24 has certain thickness, the saw blade 24 has a plurality of saw blade planes in a thickness direction thereof. Of course, when the saw blade 24 is idealized to be considered to have an extremely small thickness, a plane the saw blade 24 lies is defined as a saw blade plane. In the description below, the saw blade plane is the plane where the saw blade 24 lies when the saw blade 24 is idealized to be considered to have an extremely small thickness. A central plane is the plane where the center of the blade thickness is.

The motor 22 is contained in the motor housing 9 and has a motor shaft 27. A motor axis X of the motor shaft 27 is perpendicular to the saw blade plane. Of course, as understood by those skilled in the art, the motor 22 can also be disposed to be parallel with the saw blade plane, that is, the motor axis X is parallel to the saw blade plane.

The transmission mechanism 23 is approximately positioned between the motor 22 and the saw blade 24 and is used for transmitting power of the motor 22 to the saw blade 24 to drive the saw blade 24 to perform rotation. The transmission mechanism 23 can be gear transmission, and can also be worm and gear, belt transmission, etc. In the present embodiment, the transmission mechanism 23 is a gear transmission mechanism, and comprises a pinion disposed on the motor shaft 27 and a main gear disposed on the saw blade 25.

A cutting plane of the saw blade 24 furthest away from the transmission mechanism 23 is a first lateral cutting plane 28, and a cutting plane closest to the transmission mechanism 23 is a second lateral cutting plane 29. It can be understood that the first lateral cutting plane 28 and the second lateral cutting plane 29 are parallel, and are parallel with the saw blade plane and the middle plane.

Then referring to FIGS. 1 to 4, the base plate 36 has a bottom surface 38 and a saw blade groove 32 for the saw blade 24 to pass through. During work, the bottom surface 38 is abutted against the workpiece, and the saw blade 24 passes through the saw blade groove 32 to perform cutting work.

The base plate 36 is movably matched with the housing 20. In the present embodiment, the base plate 36 is rotatably connected on the housing 20 around a pivot axis X1. The pivot axis X1 is perpendicular to the saw blade plane, such that when the housing 20 drives the saw blade 24 to rotate around the pivot axis X1, a distance that the saw blade 24 extends out of the bottom surface 38 can be changed, thereby changing a cutting depth. A depth setting adjusting mechanism 11 and a depth setting locking mechanism 12 can be disposed between the base plate 36 and the housing 20.

The depth setting adjusting mechanism 11 comprises a longitudinally extending depth setting slide rail (not shown) disposed on one of the base plate 36 and the housing 20 and a depth setting sliding part (not shown) disposed on the other of the base plate 36 and the housing 20 and matched with the depth setting slide rail. The depth setting slide rail can be an arc slide rail, and a circular center corresponding to the arc is positioned on the pivot axis X1. Of course, an extending direction of the depth setting slide rail can also be approximately perpendicular to the bottom surface 38, the depth setting sliding part slides in the depth setting slide rail to adjust a distance that the saw blade 24 extends out of the bottom surface 38, thereby adjusting a cutting depth of the saw blade 24. The extending direction of the depth setting slide rail is approximately perpendicular to the bottom surface 38, which only requests a longitudinally extending direction approximately perpendicular to the bottom surface 38 rather than requesting that the depth setting slide rail extends along a straight line.

The depth setting locking mechanism 12 can enable the depth setting sliding part to be kept in a certain position relative to the slide rail, such that the saw blade 24 is enabled to extend out of the bottom surface 38 by keeping a certain distance, and further a groove of a certain depth is cut in the workpiece. The depth setting locking mechanism 12 can be a conventional structure such as a thread locking mechanism and a cam locking mechanism, which is not specifically repeated.

The base plate 36 is movably matched with the housing 20. In the present embodiment, the base plate 36 is rotatably connected on the housing 20 around a beveling axis X2. The beveling axis X2 is parallel to the bottom surface 38, in this way, when the housing 20 drives the saw blade 24 to rotate around the beveling axis X2, a distance that the saw blade 24 extends out of the bottom surface 38 can be changed, thereby changing a cutting angle to perform bevel angle cutting. A beveling adjusting mechanism 13 and a beveling locking mechanism 14 are further disposed between the base plate 36 and the housing 20.

The beveling adjusting mechanism 13 comprises a longitudinally extending beveling slide rail (not shown) disposed on one of the base plate 36 and the housing 20 and a beveling sliding part (not shown) disposed on the other of the base plate 36 and the housing 20 and in sliding match with the beveling slide rail. An acute or blunt angle is formed between an extending direction of the beveling slide rail and the bottom surface 38, the beveling sliding part slides in the beveling slide rail to adjust an angle of the saw blade plane relative to the bottom surface 38, thereby adjusting a cutting angle of the saw blade 24. The beveling slide rail may be an arc slide rail, and a circular center corresponding to the arc where the guide rail is positioned is positioned on a beveling axis X2.

The beveling locking mechanism 14 can enable the beveling sliding part to be kept in a certain position relative to the beveling slide rail, thereby keeping the saw blade 24 at a certain angle relative to the bottom surface 38 for bevel angle cutting. The beveling locking mechanism 14 can be a conventional mechanism such as a thread locking mechanism and a cam locking mechanism, which is not specifically repeated.

Then referring to FIG. 1, the cutting tool 1 further comprises a fixed cover 15 fixedly connected to the housing 20, the fixed cover 15 covers part of saw teeth of the saw blade 24 on the upper side of the base plate 36, and can prevent harm. While the base plate 36 is connected to the housing 20 by the fixed cover 15.

The cutting tool 1 further comprises a movable cover 16 movably connected to the housing 20, the movable cover 16 covers the other part of saw teeth of the saw blade 24 when the cutting tool 1 is not in use, particularly, the part of saw teeth positioned on one side of the bottom surface 38 of the base plate 36 deviated from the motor 22. Therefore, when the cutting tool 1 is not in use, most part of saw teeth of the saw blade 24 is contained in the fixed cover 15 and the movable cover 16. When the cutting tool 1 is in use, the movable cover 16 abuts against the workpiece and is pushed by the workpiece to rotate to expose the part of saw teeth of the saw blade 24 located on one side of the bottom surface 38 of the base plate 36 deviated from the motor 22, and the saw blade 24 can smoothly cut the workpiece. The movable cover 16 is further provided with a movable cover opening member 17, and when the cutting tool 1 is in use, an operator can also manually push the opening member 17 to rotate the movable cover 16 so as to expose the part of the covered saw teeth.

In the present embodiment, the housing 20, the depth setting adjusting mechanism 11, the depth setting locking mechanism 12, the beveling adjusting mechanism 13 and the beveling locking mechanism 14 are all disposed on the same side of the fixed cover 15, particularly one side of the fixed cover 15 close to the motor 22.

Referring to FIGS. 1 to 5, the base plate 36 has a side surface 40 perpendicular to the bottom surface 38. The side surface 40 is an abutting surface for abutting against the guide device 110, such that the cutting tool 1 can cut a workpiece W under the guide of the guide device 110, and the cutting is more precise and efficient. Of course, the abutting surface 40 is not necessarily perpendicular to the base plate 36 as long as being adaptive to the guide device 110.

The guide device 110 can be made of common plastic in life or a wood straight ruler and has a guide surface 111 which can be adaptive to a cutting line marked on the workpiece W in advance and can guide the cutting tool 1 to move along the cutting line. Of course, the guide device 110 can also be made of other materials having the guide surface 111, for example, a cut building material and other materials capable of serving as the guide surface 111, specifically, for example, a plurality of standard woods of different models sold on the market, and these standard woods have a very smooth guide surface 111, and are a very good source for the guide device 110.

Figure 5:
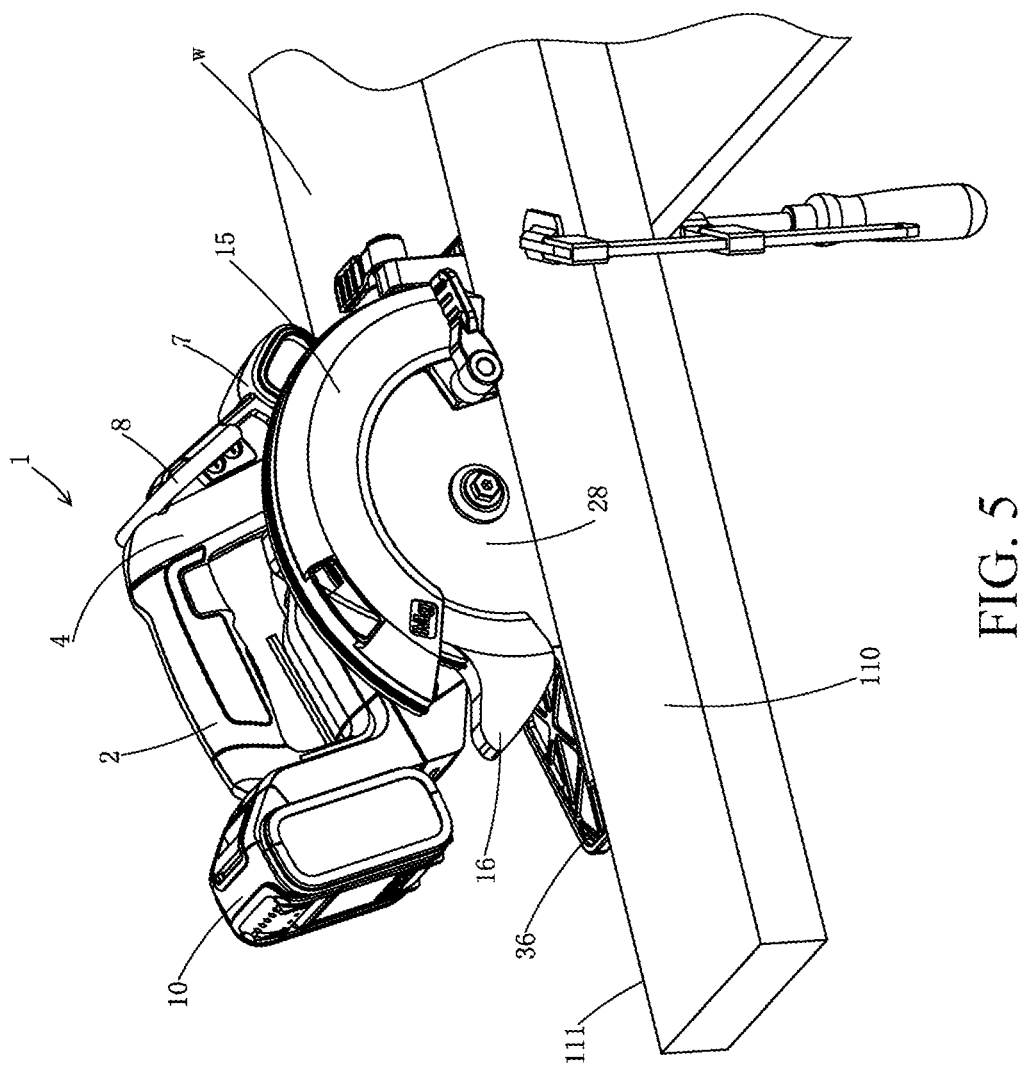
FIG. 5 is a front view of the cutting tool as shown in FIG. 1, and at this point, the cutting tool is in a use state.
Figure 6:
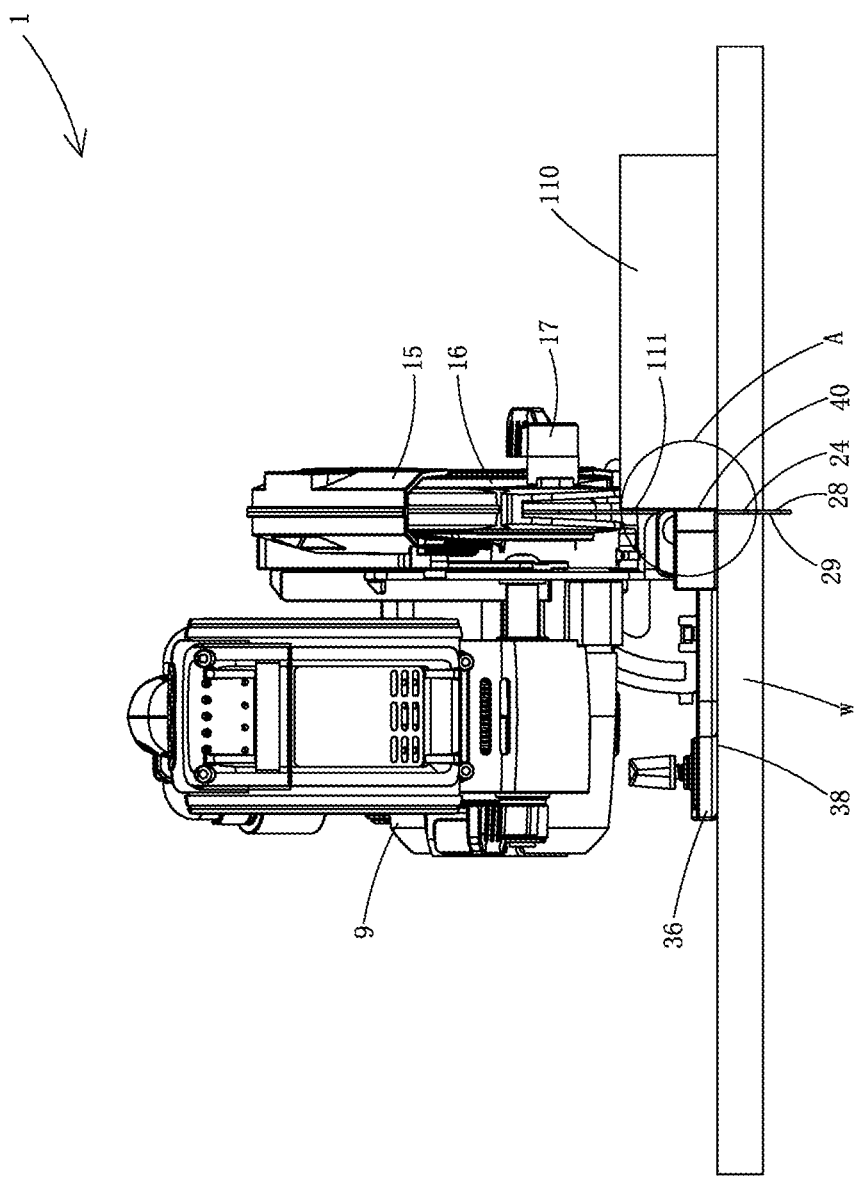
FIG. 6 is a back view of the cutting tool as shown in FIG. 1, and at this point, the cutting tool is in a use state.
Figure 7:
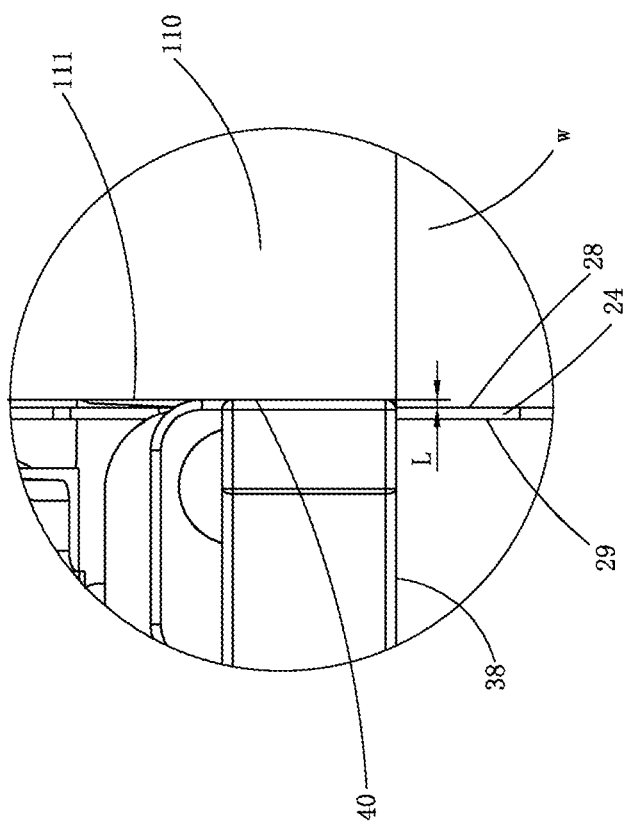
FIG. 7 is an enlarged view of an A part in FIG. 6.

Specifically, referring to FIGS. 5 and 6, when the cutting tool 1 is in use, the bottom surface 38 is abutted against the workpiece W and is supported by the workpiece W, the abutting surface 40 is matched with the guide surface 111 of the guide device 110, that is, the abutting surface 40 abuts against the guide surface 111, the cutting tool 1 slides on the workpiece W along the guide device 110, and the saw blade 24 then can precisely and efficiently cut the workpiece W.

In the present embodiment, projection of the first lateral cutting plane 28 of the saw blade 24 and the abutting surface 40 of the base plate 36 coincides on the bottom surface 38, such that the first lateral cutting plane 28 of the saw blade 24 and the abutting surface 40 of the base plate 36 are coplanar. When the abutting surface 40 and the guide surface 111 are matched, the saw blade 24 can cut according to the cutting lines marked on the workpiece W. Therefore, the cutting tool 1 of the present embodiment is more convenient to use.

Specifically, the operator marks the cutting line on the workpiece W before cutting, and this cutting line can be drawn by ink, and can also be a laser indicator, etc. The guide device 110 has a guide surface 111. During cutting, firstly, the guide surface 111 of the guide device 110 is aligned with the cutting line marked on the workpiece W in advance, then the abutting surface 40 on the base plate 36 of the cutting tool 1 is abutted against the guide surface 111 of the guide device 110, since the first lateral cutting plane 28 of the saw blade 24 and the abutting surface 40 of the base plate 36 are coincided, the first lateral cutting plane 28 of the saw blade 24 also leans against the guide surface 111, a rotary cutting track of the saw blade 24 is the track shown by the cutting line, the operator holds the cutting tool 1 and pushes the cutting tool 1 to advance by the upper support 2 on the housing 20, and the motor 22 is started to drive the saw blade 24 to rotate, thereby finishing cutting.

Therefore, by matching the abutting surface 40 with the guide device 110, there is no need for extra measuring before cutting, there is also no need to reserve a space originally occupied by the base plate between the guide surface 111 and the cutting line, and the cutting can be finished conveniently and quickly. The cutting tool is more convenient to use, and the cutting efficiency is higher. The cutting tool 1 of the present embodiment is simple in structure and lower in cost.

Of course, the coplanarity between the first lateral cutting plane 28 of the saw blade 24 and the abutting surface 40 of the base plate 36 is not only limited to the coplanarity in absolute meaning, and those skilled in the art can conceive of the condition of no absolute coplanarity since the first lateral cutting plane 28 of the saw blade 24 and the abutting surface 40 of the base plate 36 are in parallel and the first lateral cutting plane 28 is closer to the transmission mechanism by a distance relative to the abutting surface 40 caused by reasons of clearances and tolerances in mechanical structures, etc. Or in order to avoid the damage to the guide device 110 during cutting of the saw blade 24, a certain clearance is reserved between the first lateral cutting plane 28 and the guide surface 111, that is, the first lateral cutting plane 28 and the abutting surface 40 are in parallel and a certain distance exists between the first lateral cutting plane 28 and the abutting surface 40, the distance L may be not larger than 3 mm, and the conditions in such distance range all belong to the coplanar range of the present embodiment.

Referring to FIGS. 5 and 6, in a direction perpendicular to the saw blade plane, that is, in the extending direction of the motor 22, the saw blade 24 is positioned between the transmission mechanism 23 and the abutting surface 40 of the base plate 36. Or, a projection of the saw blade 24 on the bottom surface 38 is positioned between the transmission mechanism 23 and a projection of the abutting surface 40 on the bottom surface 38. Or, the saw blade 24 is positioned between the holding part 2 and the abutting surface 40 of the base plate 36 (referring to FIG. 4). In other words, the projection of the first lateral cutting plane 28 of the saw blade 24 on the bottom surface 38 is closer to the transmission mechanism 23 than the projection of the abutting surface 40 of the base plate 36 on the bottom surface 38. Of course, here, under the condition that the first lateral cutting plane 28 of the saw blade 24 and the abutting surface 40 are coplanar, the saw blade 24 also belongs to the condition of being between the transmission mechanism 23 and the abutting surface 40 of the base plate 36.

On the bottom surface 38, the first lateral cutting plane 28 of the saw blade 24 may be positioned between the transmission mechanism and the abutting surface 40, and the distance L between the first lateral cutting plane 28 of the saw blade 24 and the abutting surface 40 is smaller than or equal to 3 mm. The distance L between the first lateral cutting plane 28 of the saw blade 24 and the abutting surface 40 may be between 0.5 mm and 0.8 mm. Therefore, a cutting precision can be ensured sufficiently, and meanwhile, the guide surface 111 is prevented from being damaged due to jittering of the saw blade.

Under another condition, no matter the first lateral cutting plane 28 and the abutting surface 40 are coplanar, or certain clearance exists between the first lateral cutting plane 28 and the abutting surface 40, on the projection of the bottom surface 38 of the base plate 36, a central plane of the saw blade 24 may be always positioned between the transmission mechanism 23 and the abutting surface 40. The use of the cutting tool can also be enabled to be more convenient.

Figure 8:
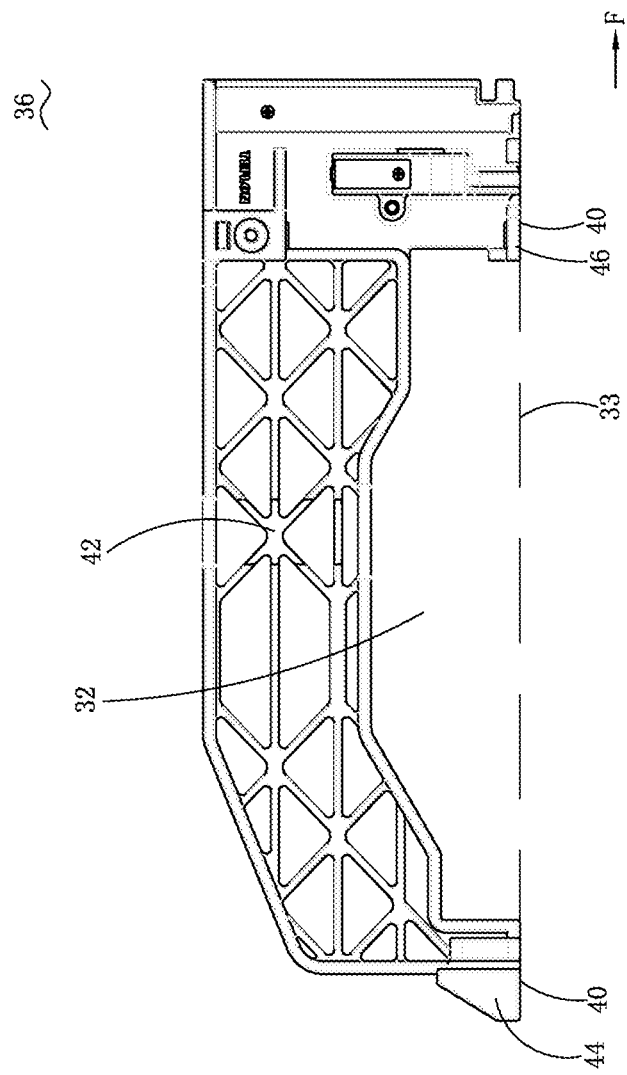
FIG. 8 is a top view of a base plate of the cutting tool as shown in FIG. 1.

In combination with FIGS. 1 and 8, in the present embodiment, the base plate 36 is provided with a saw blade groove 32 for the saw blade 24 to pass through. The saw blade groove 32 is semiclosed, that is, the saw blade groove 32 for the saw blade 24 to pass through in the base plate 36 has an opening 33, such that the saw blade 24 is close to the guide surface 111 on the guide device 110 as much as possible, while the abutting surface 40 is matched with the guide surface 111 to cut the workpiece W. In the present embodiment, the base plate 36 comprises a main body 42 and the side surface 40 as the abutting surface may be directly formed on the main body 42. Specifically, the abutting surface 40 can be on the end surface of one side of the base plate 36 away from the motor 22 or the transmission mechanism 23. The base plate 36 also comprises a first abutting portion 44 and a second abutting portion 46 which are disposed on the main body 42, the two abutting portions are separated by a certain distance in a cutting advancing direction of the saw blade 24, and in the cutting advancing direction F of the saw blade 24, the saw blade 24 is positioned between the first abutting portion 44 and the second abutting portion 46. Therefore, the saw blade 24 is close to the guide surface 111 on the guide device 110 as much as possible. The end surfaces of the first abutting portion 44 and the second abutting portion 46 positioned on one side of the saw blade 24 away from the motor may be coplanar to form the abutting surface 40 of the base plate 36, and part of the abutting surface 40 on the base plate 36 is positioned on the first abutting portion 44 while the other part is positioned on the second abutting portion 46.

That is to say, the abutting surface comprises a front abutting surface disposed on the first abutting portion 44 and a back abutting surface disposed on the second abutting portion 46, or the abutting surface 40 is divided into the front abutting surface and the back abutting surface by the opening 33.

While in order to increase an area of the abutting surface 40 and to enable the supporting to be more stable, the front and back abutting surfaces can be close to the saw blade 24, a distance between the front abutting surface and the saw blade 24 or a distance between the back abutting surface and the saw blade 24 can be 10 mm, and the distance between the abutting surface 40 and the saw blade 24 may be between 3 mm-5 mm. The abutting surface 40 can form a tip nearby the saw blade 24.

Continuously referring to FIGS. 1 and 8, as mentioned above, on the bottom surface 38 of the base plate 36, the first lateral cutting plane 28 of the saw blades 24 may be positioned between the transmission mechanism 23 and the abutting surface 40, and the distance L between the first lateral cutting plane 28 of the saw blade 24 and the abutting surface 40 is smaller than or equal to 3 mm. The first and second abutting portions 44 and 46 can be integrally formed with the main body 42, and in this way, the distance between the first lateral cutting plane 28 and the abutting surface 40 can be ensured by using a machining precision. Of course, the first and second abutting portions 44 and 46 can also be movably connected to the main body 42, thereby adjusting the positions of the first abutting portion 44 and the second abutting portion 46 relative to the main body 42 to ensure that the distance between the first lateral cutting plane 28 of the saw blade 24 and the abutting surface 40 is smaller than or equal to 3 mm. Specifically, the main body 42 and the first abutting portion 44 are movably connected by matching of a strip-shaped chute (or waist-shaped hole) and a pin, wherein an extending direction of the strip-shaped chute is perpendicular to the first lateral cutting plane 28 of the saw blade 24. Of course, the adjusting structure between the first and second abutting portions 44 and 46 and the main body 42 can also be in other manners, for example, threads, etc., and is not repeated specifically.

Since the saw blade groove 32 has an opening 33, the operator can directly touch the saw blade 24 by the opening 33, in order to ensure safety, in the present embodiment, an extending angle of the movable cover 16 in a circumferential direction of the saw blade 24 is larger than or equal to 180 degrees. The extending angle of the movable cover 16 in a circumferential direction of the saw blade 24 may be larger than or equal to 220 degrees and smaller than or equal to 240 degrees. The extending angles of the movable cover 16 and the fixed cover 15 in a circumferential direction of the saw blade 24 when the cutting tool 1 is not in use may be larger than or equal to 300 degrees. The extending angles of the movable cover 16 and the fixed cover 15 in the circumferential direction of the saw blade 24 when the cutting tool 1 is not in use may be larger than or equal to 330 degrees and smaller than or equal to 360 degrees.

FIGS. 9 to 16 show a cutting tool 100 of an example embodiment of the present invention. In the example embodiment, the number of the base plate is only 1. In the present embodiment, referring to FIG. 9, the base plates comprise a first base plate 136 and a second base plate 148 movably connected to the first base plate 136. The first base plate 136 and the second base plate 148 move relatively, such that when the surface of the workpiece is uneven, the first base plate 136 moves relative to the second base plate 148 and the cutting tool can adapt to the uneven surface, such that an applicable range of the cutting tool is enlarged, and operation is more convenient.

The first base plate 136 of the present embodiment is same as the structure of the first base plate 36. Specifically, the first base plate 136 comprises a first bottom surface 138 and a first side surface 140. Here, the first side surface 140 is an abutting surface for abutting against the guide surface 110, and is coplanar with the saw blade plane of a saw blade 124. The first bottom surface 138 may be perpendicular to the first abutting surfaces 140. Of course, the first abutting surface 140 is unnecessarily perpendicular to the first bottom surface 138 as long as being adaptive to the guide device 110. In this way, after the first base plate 136 moves relative to the second base plate 148, the first abutting surface 140 can be exposed to be matched with the guide device 110.

Figure 9:
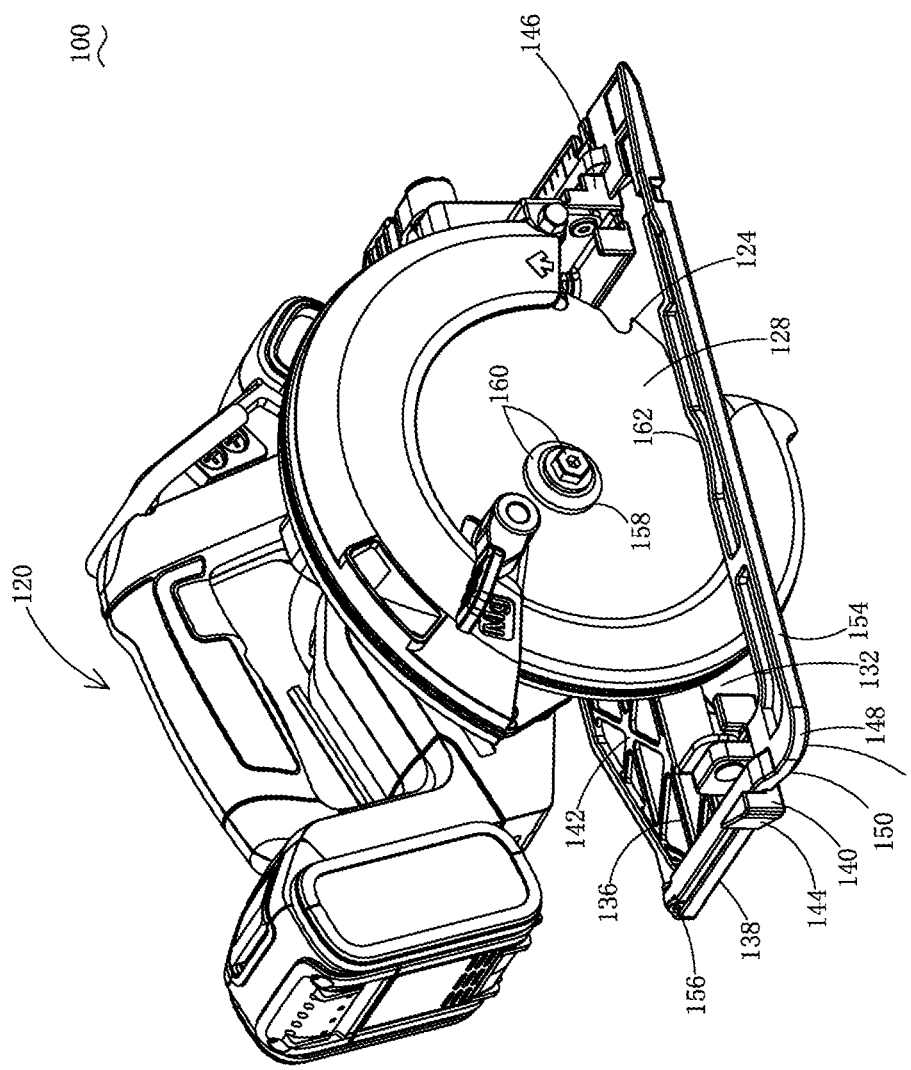
FIG. 9 is a perspective view from the front side of a cutting tool provided by an example embodiment of the present invention, and at this point, a first base plate and a second base plate are in a first matching state.
Figure 10:
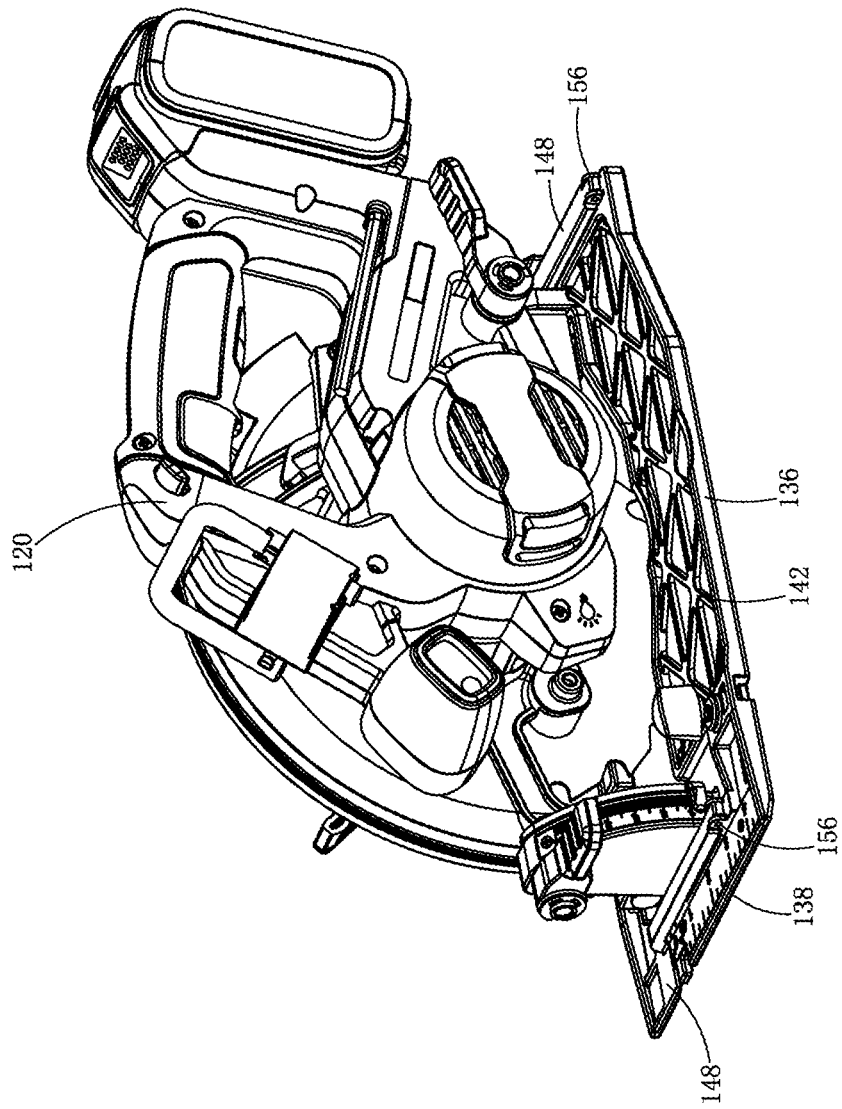
FIG. 10 is a perspective view from the back side of the cutting tool as shown in FIG. 9.
Figure 12:
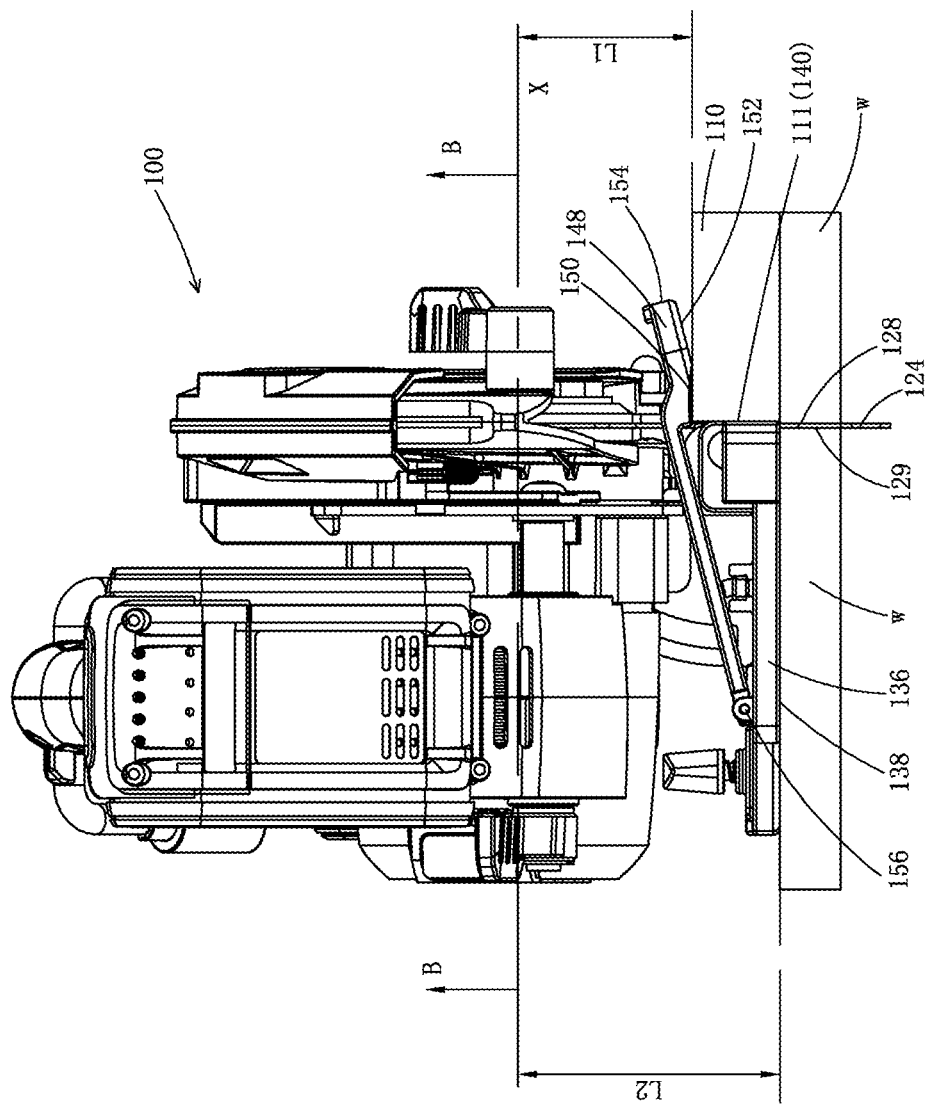
FIGS. 12 and 13 are schematic diagrams of a working state of the cutting tool as shown in FIG. 9, and at this point, two base plates are under the second matching state.

Referring to FIGS. 9 and 12, the second base plate 148 comprises an abutting surface 150, a second bottom surface 152 and a second side surface 154 which are disposed in sequence. The second side surface 154 is a side surface of the second base plate 148 away from the first base plate 136. The second side surface 154 may be perpendicular to the second bottom surface 152. Of course, the second side surface 154 is unnecessarily perpendicular to the second bottom surface 152 as long as being adaptive to the guide device 110.

A connecting mechanism is disposed between the first base plate 136 and the second base plate 148, such that the first bottom surface 138 has a first position (referring to FIGS. 9 and 10) coplanar with the second bottom surface 152 and a second position (referring to FIGS. 11 and 12) non-coplanar with the second bottom surface 152.

In the present embodiment, the connecting mechanism is a pivoting connection mechanism. Specifically, referring to FIGS. 9 to 11, the first base plate 136 and the second base plate 148 are rotatably connected by a pivot 156. In the present embodiment, the axis of the pivot 156 is parallel to a first lateral cutting plane 128 of the saw blade 124. The position where the pivot 156 is disposed on the first base plate 136 is one end of the first base plates 136 away from the first lateral cutting plane 128 of the saw blade 124. In the present embodiment, the connecting mechanism comprises two pivoting connecting mechanisms, that is, the two pivots 156 are respectively disposed on the two end portions of the first base plate 136 away from the first lateral cutting plane 128 of the saw blade 124 and along a feeding direction of the saw blade 124, such that the switching of the first base plate 136 and the second base plates 148 between the two positions is more stable.

In the present embodiment, the cutting tool 100 further comprises an elastic member (not shown) applying a force to the second base plate 148 to keep the second bottom surface 152 to be flush or coplanar with the first bottom surface 138. Since in the first position, the second base plate 148 closes the opening of the saw blade groove 132 of the first base plate 136, the saw blade 124 is positioned in the closed saw blade groove 132, and it can be ensured that a user is prevented from touching saw teeth when the saw blade 124 is not in use, therefore, the cutting tool is safer.

Figure 13:
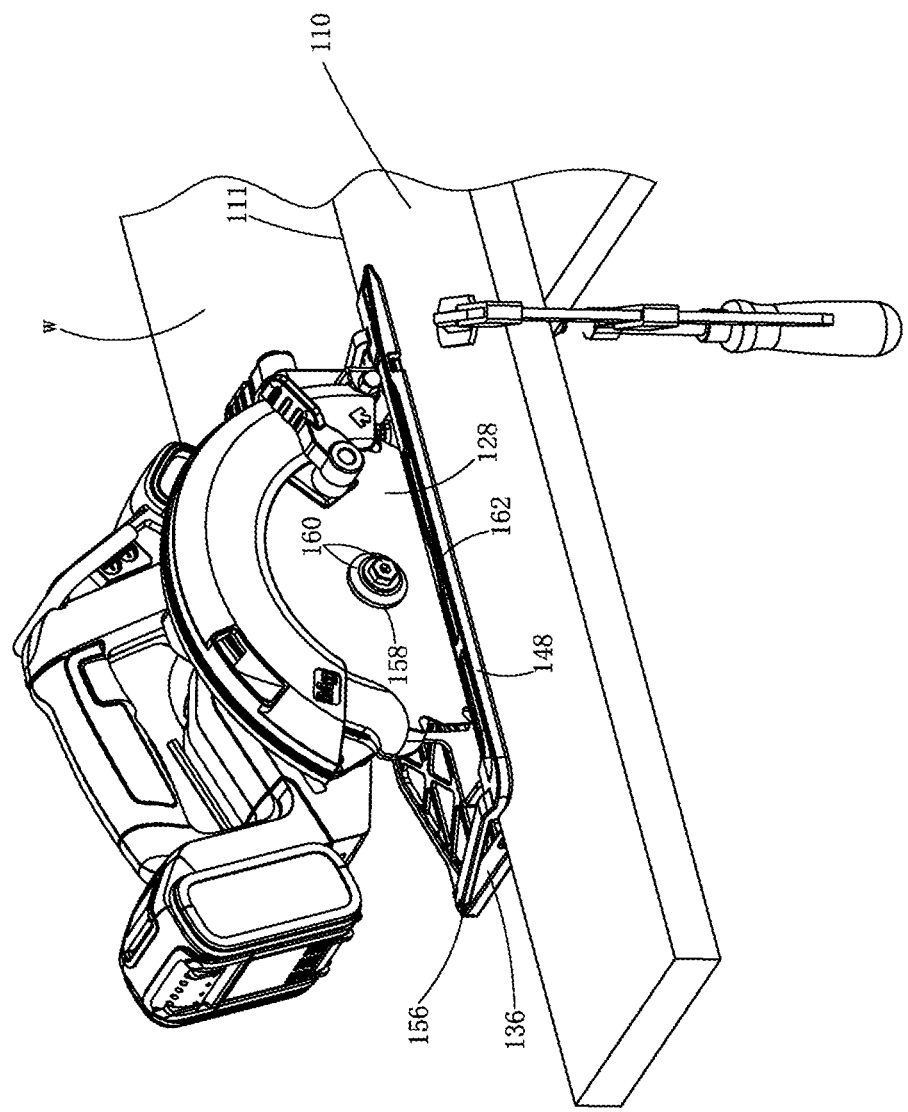

Referring to FIGS. 12 and 13, the cutting tool 100 of the present embodiment is under a use state, the first bottom surface 138 is supported by the workpiece W, the first side surface 140 is abutted against the guide surface 111 of the guide device 110, the cutting tool 100 slides along the workpiece W and the guide device 110, and then the saw blade 124 can cut the workpiece W.

In the present embodiment, the first abutting surface 140 and the saw blade plane of the saw blade 124 are coplanar. Specifically, the first lateral cutting plane 128 of the saw blade 124 and the first abutting surface 140 are coincided. Or projection of the first lateral cutting plane 128 of the saw blade 124 and the first abutting surface 140 of the first base plate 136 coincides on the first bottom surface 138, such that the first lateral cutting plane 128 of the saw blade 124 and the first abutting surface 140 are coplanar.

Therefore, the cutting tool 100 of the present embodiment is more convenient to use. Specifically, the operator generally marks the cutting line on the workpiece W before cutting, and this cutting line can be drawn by ink, can also be a laser indicator, etc. The guide device 110 has a guide surface 111. During cutting, referring to FIGS. 12 and 13, firstly, the guide surface 111 of the guide device 110 is aligned with the cutting line marked on the workpiece W in advance, then the second base plate 148 is staggered relative to the first base plate 136 to expose the first abutting surface 140, then the first abutting surface 140 is abutted against the guide surface 111 of the guide device 110, since the first lateral cutting plane 128 of the saw blade 124 and the first abutting surface 140 of the first base plate 136 are coplanar, the first lateral cutting plane 128 of the saw blade 124 also leans against the guide surface 111, a rotary cutting track of the saw blade 124 is the track shown by the cutting line, and the cutting can be finished by moving the cutting tool 100.

Therefore, by matching the first base plate 136 with the guide device 110, there is no need for extra measuring before cutting, there is also no need to reserve a space originally occupied by the base plate between the guide surface 111 and the cutting line, and the cutting can be finished conveniently and quickly. The cutting tool is more convenient to use, the cutting is convenient, and the cutting efficiency is higher. The cutting tool 100 of the present embodiment is simple in structure and lower in cost.

Of course, the coplanarity between the first lateral cutting plane 128 of the saw blade 124 and the first abutting surface 140 of the first base plate 136 is not only limited to the coplanarity in absolute meaning, and those skilled in the art can conceive of the condition of no absolute coplanarity since the first lateral cutting plane 128 and the abutting surface 140 are in parallel and the first lateral cutting plane 128 is closer to the transmission mechanism by a distance relative to the first abutting surface 140 caused by reasons of clearances and tolerances in mechanical structures, etc., and such conditions all belong to the coplanar range of the present embodiment.

Figure 14:
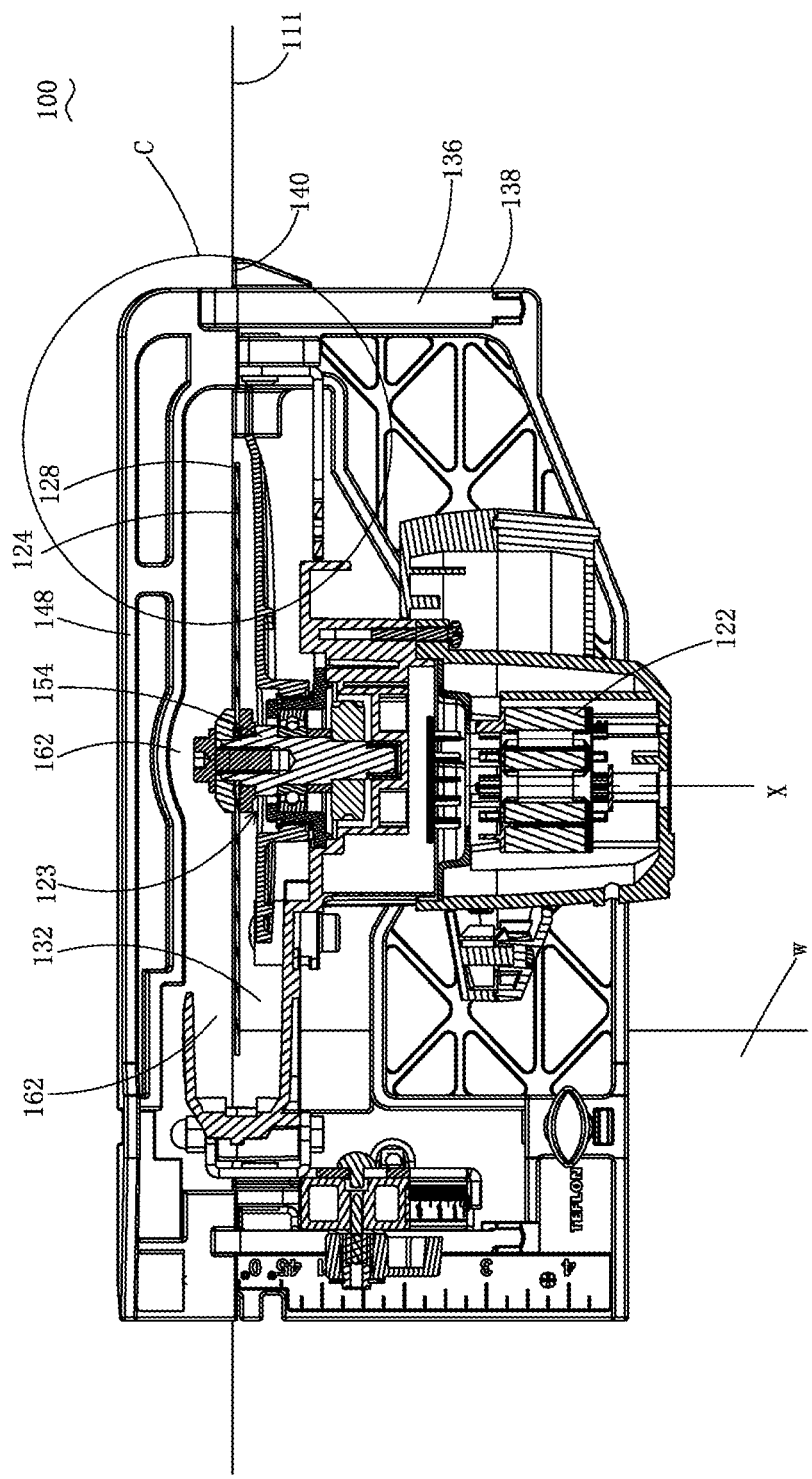
FIG. 14 is a section view of the cutting tool as shown in FIG. 12 along a B-B direction, wherein a guide device is additionally shown.
Figure 15:
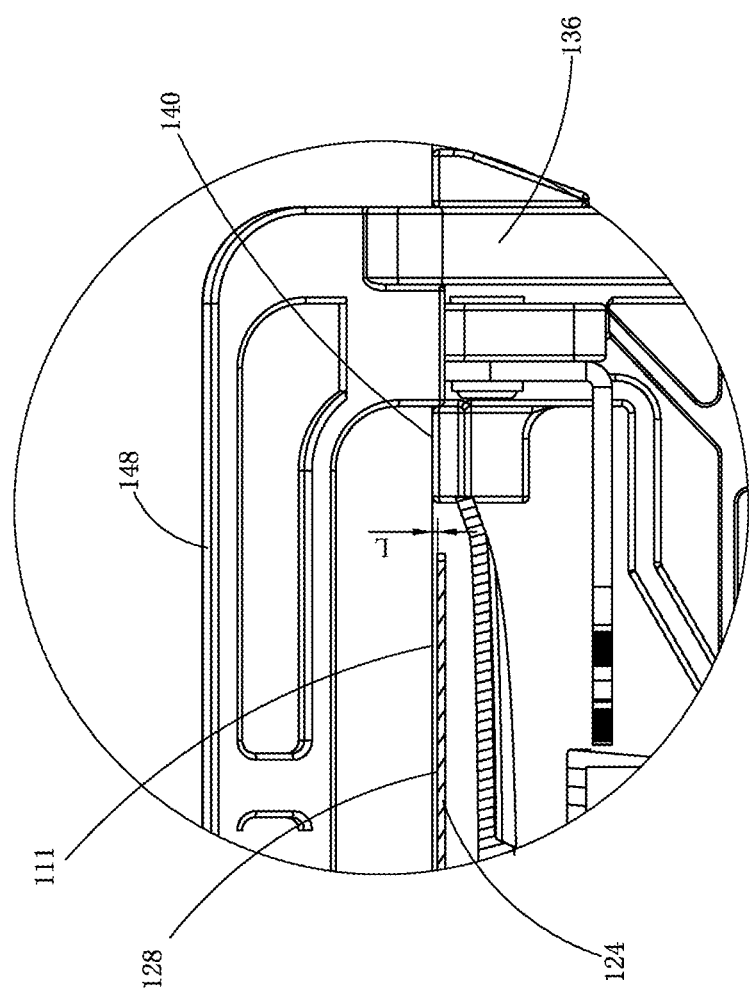
FIG. 15 is a local enlarged view of a C position in FIG. 14.

Referring to FIGS. 14 and 15, that is to say, on a projection of the first bottom surface 138, the first lateral cutting plane 128 of the saw blade 124 is positioned between the transmission mechanism 123 and the first abutting surface 140 of the first base plate 136. That is to say, on the projection of the first bottom surface 138, the saw blade plane is positioned between the transmission mechanism 123 and the first abutting surface 140. On the projection of the first bottom surface 138, the first lateral cutting plane 128 of the saw blade 124 may be positioned between the transmission mechanism 123 and the first abutting surface 140 of the first base plate 136, and a distance L between the first lateral cutting plane 128 of the saw blade 124 and the first abutting surface 140 of the first base plate 136 is smaller than or equal to 3 mm. The L between the first lateral cutting plane 128 of the saw blade 124 and the first abutting surface 140 of the first base plate 136 may be between 0.5 mm-0.8 mm. Therefore, a certain clearance is reserved between the first lateral cutting plane 128 and the first abutting surface 140, thereby preventing the guide device 110 from being damaged by the saw blade 124 during cutting, while meeting the precision requirements of cutting.

a damage to the guide device 110 during cutting of the saw blade 124 can be avoided, and the precision requirements of cutting can be met.

Back to FIG. 9, in the present embodiment, a saw blade groove 132 for the saw blade 124 to pass through in the first base plate 136 is semiclosed, that is, the saw groove 132 for the saw blade 124 to pass through in the first base plate 136 has an opening, therefore, the saw blade plane of the saw blade 124 is flush with the guide surface 111. Specifically, the first base plate 136 comprises a main body 142 and a first abutting portion 144 and a second abutting portion 146 which are connected to the main body 142, and the two abutting portions are separated by a certain distance in a cutting advancing direction of the saw blade 124. Part of the first abutting surface 140 on the first base plate 136 may be positioned on the first abutting portion 144 while the other part is positioned on the second abutting portion 146.

In the present embodiment, the main body 142 can be integrally formed with the first abutting portion 144 and the second abutting portion 146, and the first side surface 140 as the abutting surface can be directly formed on the end surfaces of one sides of the first abutting portions 144 and the second abutting portion 146 away from the housing 120.

As mentioned above, on the projection of the bottom surface 138, the first lateral cutting plane 128 of the saw blades 124 may be positioned between the transmission mechanism 123 and the first abutting surface 140 of the base plate 136, and the distance L between the first lateral cutting plane 128 of the saw blade 124 and the abutting surface 140 is smaller than or equal to 3 mm. In order to ensure such a distance, the first and second abutting portions 144 and 146 can be movably connected on the first base plate 136. The positions of the first abutting portion 144 and the second abutting portion 146 relative to the main body 142 are adjusted to ensure that the distance L between the first lateral cutting plane 128 of the saw blade 124 and the first side surface 140 of the first base plate 136 is smaller than or equal to 3 mm. Specifically, the main body 142 and the first abutting portion 144 are movably connected by matching of a strip-shaped chute (or waist-shaped hole) and a pin, wherein an extending direction of the strip-shaped chute is perpendicular to the first lateral cutting plane 128 of the saw blade 124. The main body 142 and the second abutting portion 146 can also be movably connected by the matching of the strip-shaped chute and the pin. Those skilled in the art can conceive that the main body 142 and the first and second abutting portions 144 and 146 can also be tuned by other movable mechanisms, which are not repeated specifically.

Figure 11:
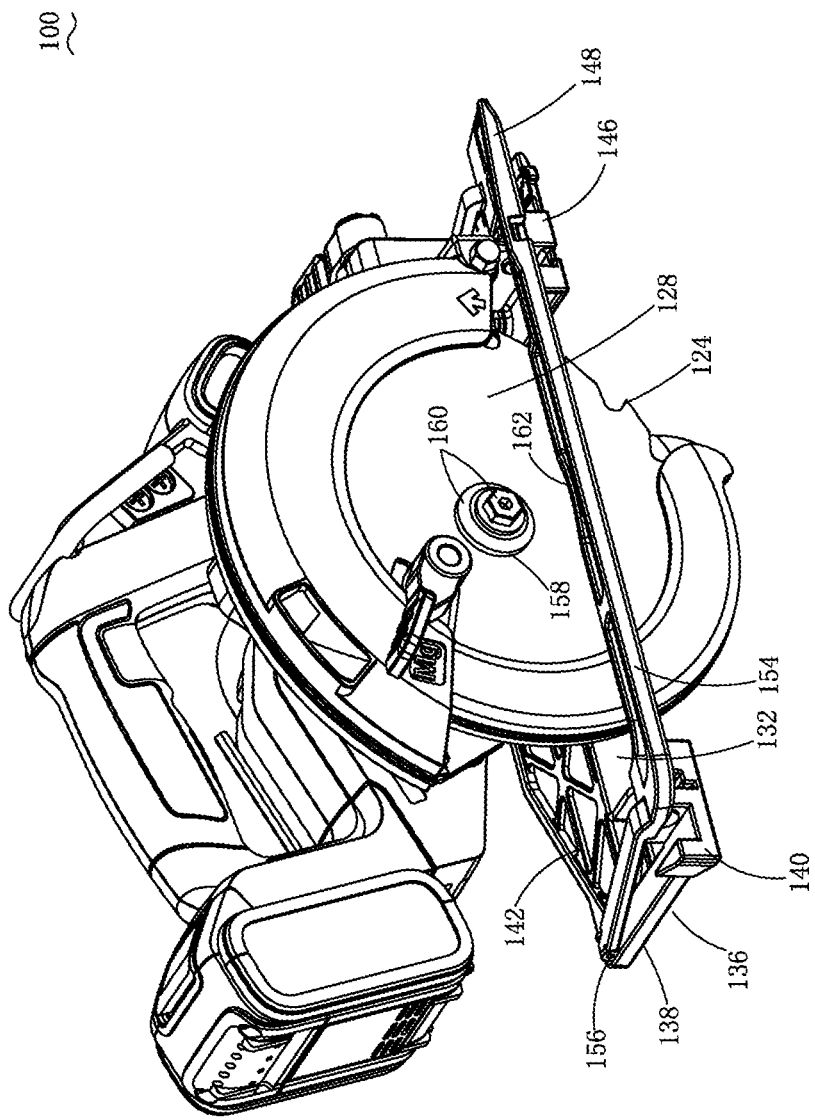
FIG. 11 is another perspective view from the front side of the cutting tool as shown in FIG. 9 in a same direction, and at this point, the first base plate and the second base plate are in a second matching state.
Figure 16:
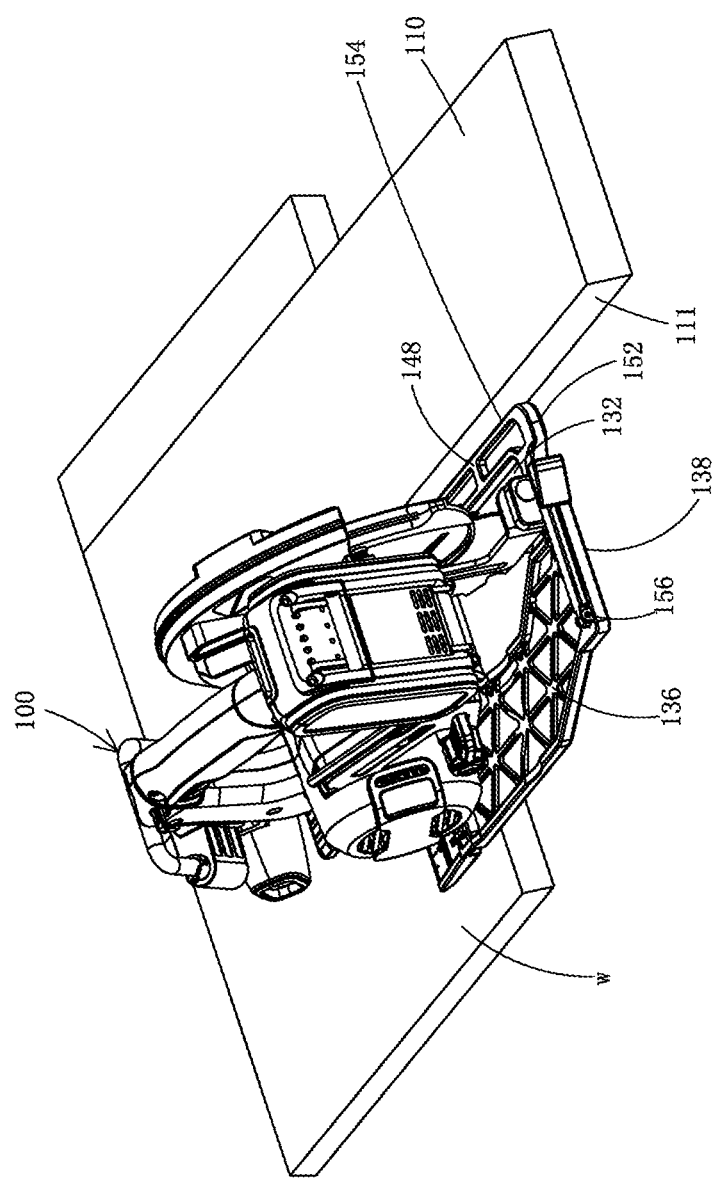
FIG. 16 is a schematic diagram of a working state of the cutting tool as shown in FIG. 9, and at this point, two base plates are under the first matching state.

The second base plate 148 and the first base plate 136 can be switched between two different matching states due to the movable connection between them, and as shown in FIGS. 9 and 16, in the first matching state, the first bottom surface 138 of the first base plate 136 and the second bottom surface 152 of the second base plate 148 are flush; as shown in FIGS. 11 to 13, in the second matching state, the first bottom surface 138 of the first base plate 136 and a second bottom surface 152 of the second base plate 148 are staggered to expose the abutting surface 140. In the present embodiment, in the second matching state, the first bottom surface 138 and an abutting surface 150 are parallel while the second bottom surface 152 is inclined. In the second matching state, the second bottom surface 152 of the second base plate 148 may be close to the motor relative to the first bottom surface 138 of the first base plate 136. That is, under the second matching state, a distance L1 between the abutting surface 150 of the second base plate 148 and a motor axis X is smaller than a distance L2 between the first bottom surface 138 of the first base plate 136 and the motor axis X. That is to say, the second base plate 148 upwards rotates relative to the first base plate 136.

The second base plate 148 is movably connected to the first base plate 136, such that the cutting tool 100 can be switched between two different working states. As shown in FIGS. 9 and 16, under the first working state, the first bottom surface 138 of the first base plate 136 and the second bottom surface 152 of the second base plate 148 are coplanar and are abutted against the workpiece W in common, and the second side surface 154 of the second base plate 148 is abutted against the guide surface 111 on the guide device 110. As shown in FIGS. 12 and 13, under the second working state, the first bottom surface 138 of the first base plate 136 is abutted against the workpiece W, and the first abutting surface 140 of the first base plate 136 is abutted against the guide surface 111 on the guide device 110. The abutting surface 150 on the second base plate 148 may be abutted against the upper surface of the guide device 110 away from the workpiece W to apply certain pressure to the guide device 110 to ensure a cutting precision.

Therefore, under the first working state, the second side surface 154 of the second base plate 148 closes the saw blade groove of the first base plate 136, at this point, the saw blade 124 is positioned in the closed saw blade groove formed by the first base plate 136 and the second base plate 148 together, the second side surface 154 on the second base plate 148 away from the transmission mechanism relative to the first abutting surface 140 of the first base plate 136 is abutted against the guide surface 111 on the guide device 110, traditional cutting can be realized, and a conventional use habit of the use is met. Under the second working state, the first abutting surface 140 on the first base plate 36 approximately flush with the first lateral cutting plane 128 of the saw blade 124 is abutted against the guide surface 111 on the guide device 11 to realize quick cutting.

Therefore, the cutting tool 100 of the present embodiment can realize traditional cutting, and can also realize quick cutting, while the second base plate 148 can move relative to the first base plates 136 to be more adaptive to an uneven surface, thereby being greatly convenient for the user to operate the cutting tool 100.

In combination with FIGS. 9 and 14, in the present embodiment, the cutting tool 100 comprises a fixing mechanism 158 fixing the saw blade 124 relative to a saw blade shaft 125. The fixing mechanism 158 has a locking part 160 positioned on one side of the first lateral cutting plane 128 away from the housing 120, the second base plate 148 is provided with a notch 162, on a plane parallel to the first bottom surface 138, the area of the notch 162 is larger than that of the locking part 160, therefore, when the cutting tool 100 is in use, the locking part 160 of the fixing mechanism 158 can pass through the notch 162, such that the saw blade 124 can be fed more in a direction toward the first bottom surface 136, and the second base plate 148 is prevented from interfering with the fixing mechanism 158 to affect a cutting depth of the cutting tool 100.

FIGS. 17 to 22 show a cutting tool 200 of an example embodiment of the present invention.

The same part between the cutting tool 200 and the cutting tool 100 is not repeated any more, and a difference between the cutting tool 200 and the cutting tool 100 is described emphatically.

In the example embodiment, the second base plate 148 and the first base plate 136 are connected by two sets of connecting mechanisms separated by a certain distance, and each set of connecting mechanism only comprises one pivot 156. By the connecting mechanisms, the second base plate 148 can rotate relative to the first base plate 136, and the switching of the first bottom surface 138 between a first position coplanar with the second bottom surface 152 and a second position non-coplanar with the second bottom surface 152 can be realized.

Figure 17:
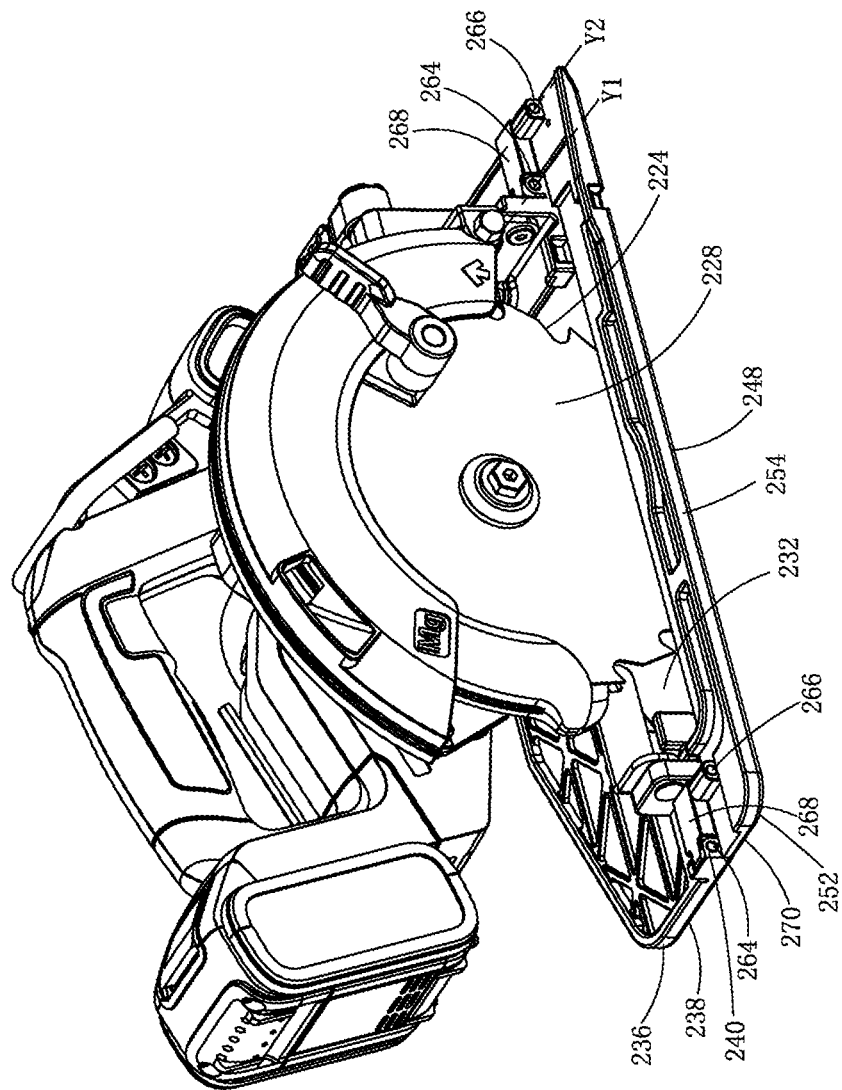
FIG. 17 is a perspective view from the front side of a cutting tool provided by an example embodiment of the present invention, and at this point, the first base plate and the second base plate are in the first matching state.
Figure 18:
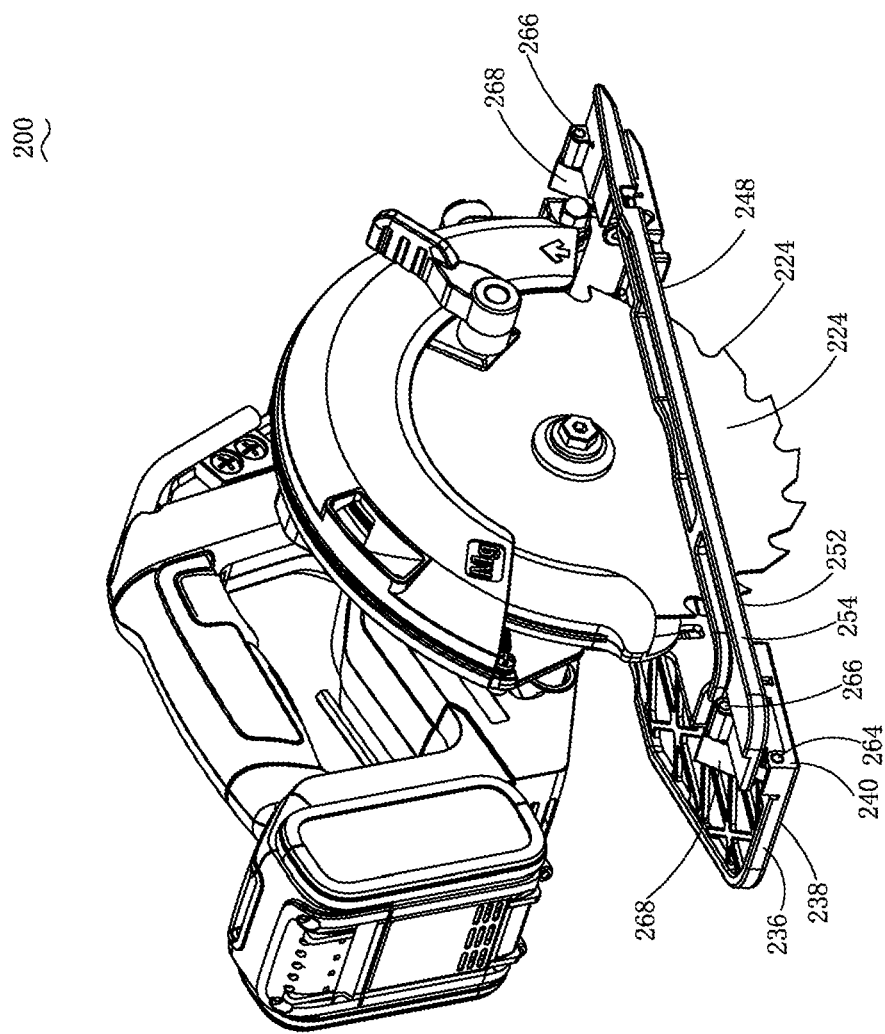
FIG. 18 is a perspective view from the back side of the cutting tool as shown in FIG. 17, and at this point, the first base plate and the second base plate are in the second matching state.

Referring to FIGS. 17 and 18, the second base plate 248 and the first base plates 236 are still connected by two sets of same connecting mechanisms separated by a certain distance. In the example embodiment, the second base plate 248 can translate relative to the first base plate 236 by the connecting mechanism, thereby realizing the switching of a first bottom surface 238 between a first position coplanar with a second bottom surface 252 and a second position non-coplanar with the second bottom surface 252. The connecting mechanism positioned in the back side of a feeding direction of the saw blade is taken as an example for description.

The connecting mechanism comprises a first pivot 264 in pivoting connection with the first base plate 236, a second pivot 266 in pivoting connection with the second base plate 248 and a swing arm 268 connected to the first pivot 264 and the second pivot 266 at the same time. In this way, one end of the swing arm 268 is in pivoting connection with the first base plate around a first pivot axis Y1 of the first pivot 264, and the other end of the swing arm 268 is in pivoting connection with the second base plate around a second pivot axis Y2 of the second pivot.

The first pivot axis Y1 of the first pivot 264 is perpendicular to the first lateral cutting plane 228 of the saw blade 224, that is, the first pivot axis Y1 is also perpendicular to the first side surface 240 of the first base plate 236. Here, same as the above embodiment, the first side surface 240 is an abutting surface abutted against the guide device 110. A relative position relation between the first abutting surface 240 and the saw blade plane or the saw blade 224 is same as that of the first abutting surface 140 and is not repeated here.

The first pivot 264 is disposed on the end part of the first base plate 236 close to the second base plate 248. The end surface of the first pivot 264 close to the second base plate 248 does not exceed the first abutting surface 240 of the first base plate 236. The end surface of the first pivot 264 close to the second base plate 248 and the first abutting surface 240 of the first base plate 236 may be coplanar, which can prevent the second base plate 248 from interfering with the first base plate 236. The end surface of the swing arm 268 close to the second base plate 248 does not exceed the first abutting surface 240 of the first base plate 236. The end surface of the swing arm 268 close to the second base plate 248 and the first abutting surface 240 of the first base plate 236 may be coplanar, which can prevent the second base plate 248 from interfering with the first base plate 236.

The second pivot 266 is parallel to the first pivot 264, and the second pivot axis Y2 thereof is perpendicular to the first abutting surface 240. The second pivot axis Y2 of the second pivot 266 is perpendicular to the first lateral cutting plane 228 of the saw blade 224. The second pivot 266 is disposed on the end part of the second base plate 248 close to the first base plate 236, and is fixedly connected to the swing arm 268.

In order to enable the relative movement between the first and second base plates 236 and 248 to be more smooth, one of the first and second base plates 236 and 248 is provide with a waist-shaped hole, such that one of the axis of the first pivot 264 and that of the second pivot 266 can move in such waist-shaped hole.

An elastic member (not shown) is disposed between the first base plate 236 and the second base plate 248, and the elastic member provides an elastic force promoting the first bottom surface 238 to move to a direction coplanar with the second bottom surface 252. The elastic force may be smaller than the weight of the cutting tool, in this way, in the cutting process, the operator can enable the first base plate 236 and the second base plate 248 to movably move without labor, and cutting is performed smoothly. Of course, the elastic member can also be suitable for other embodiments.

Figure 19:
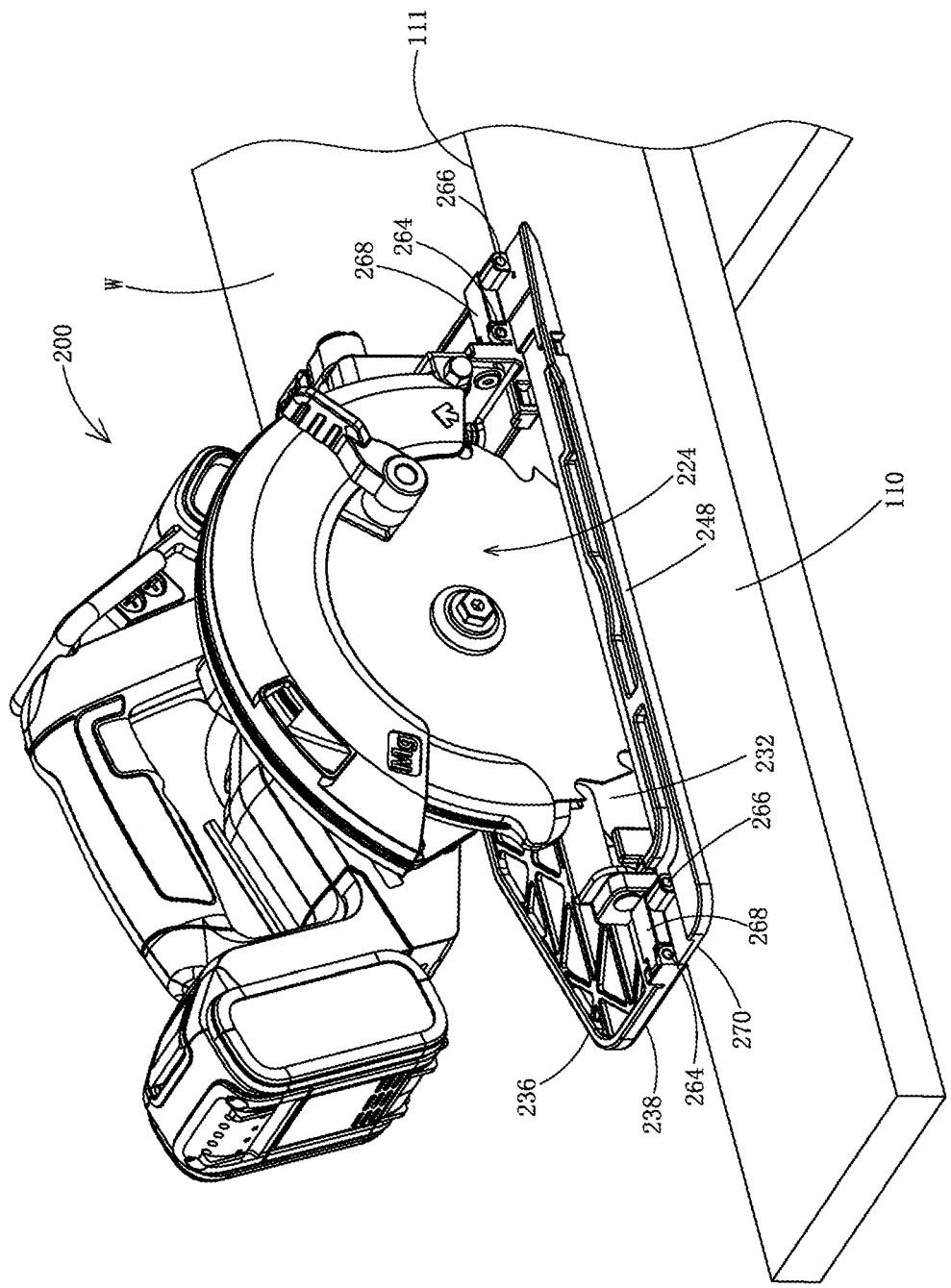
FIGS. 19 to 22 are schematic diagrams of a working state change of the cutting tool as shown in FIG. 17, and at this point, two base plates are to be used under the second matching state.

Due to movable connection between the second base plate 248 and the first base plate 236, the second base plate 248 and the first base plate 236 can be switched between two different matching states, as shown in FIG. 17, in the first matching state, the first bottom surface 238 of the first base plate 236 and the second bottom surface 252 of the second base plate 248 are flush; and as shown in FIGS. 18 and 19, in the second matching state, the first bottom surface 238 of the first base plate 236 and the second bottom surface 252 of the second base plate 248 are staggered and non-coplanar.

In the first matching state, the first bottom surface 238 and the second bottom surface 252 are flush, and an operation mode and cutting capacity of the cutting tool 200 are all equal to those of a conventional electric circular saw; in the second matching state, the first bottom surface 238 and the second bottom surface 252 are staggered, and the cutting tool can adapt to an uneven surface; in addition, since the first bottom surface 238 and the second bottom surface 252 are staggered, the first abutting surface 240 can be exposed to be matched with the guide device 110, thereby performing guide cutting. Or in other words, the first abutting surface 240 can be exposed to be matched with the guide surface 111 of the guide device 110, and the first bottom surface 238 and the second bottom surface 252 are non-coplanar.

Under the first matching state, the second base plate 248 may be abutted against the first abutting surface 240 of the first base plate 236, such that the first abutting surface 240 cannot slide along the guide device. Under the first matching state, the second base plate 248 may close the opening of the saw blade groove 232 of the first base plate 236, such that the saw blade 224 cannot be closest to the guide device 110 to slide along the guide device.

Figure 22:
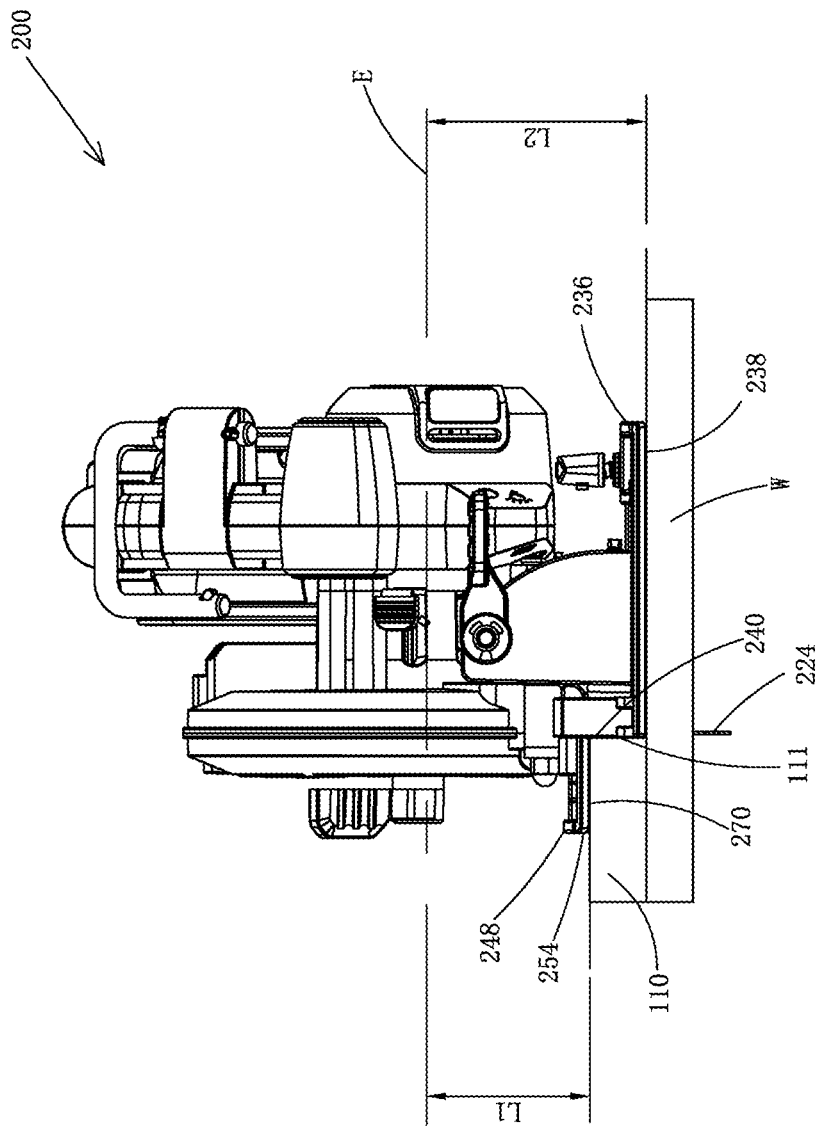

In addition, In the example embodiment, the abutting surface of the second base plate 248 and the second bottom surface 252 are coplanar, and the two are merged to be called as an abutting bottom surface 270. As shown in FIG. 22, under the second matching state, the abutting bottom surface 270 of the second base plate 248 is close to the motor (not shown) relative to the first bottom surface 238 of the first base plate 236. That is, a distance L1 between the abutting surface 270 of the second base plate 248 and a motor axis X is smaller than a distance L2 between the first bottom surface 238 of the first base plate 236 and the motor axis X.

The cutting tool 200 of the example embodiment is same as the cutting tool 100, which can both realize the traditional cutting and quick cutting.

FIGS. 19 to 22 show state changes of the cutting tool 200 when the cutting tool performs quick cutting.

Figure 20:
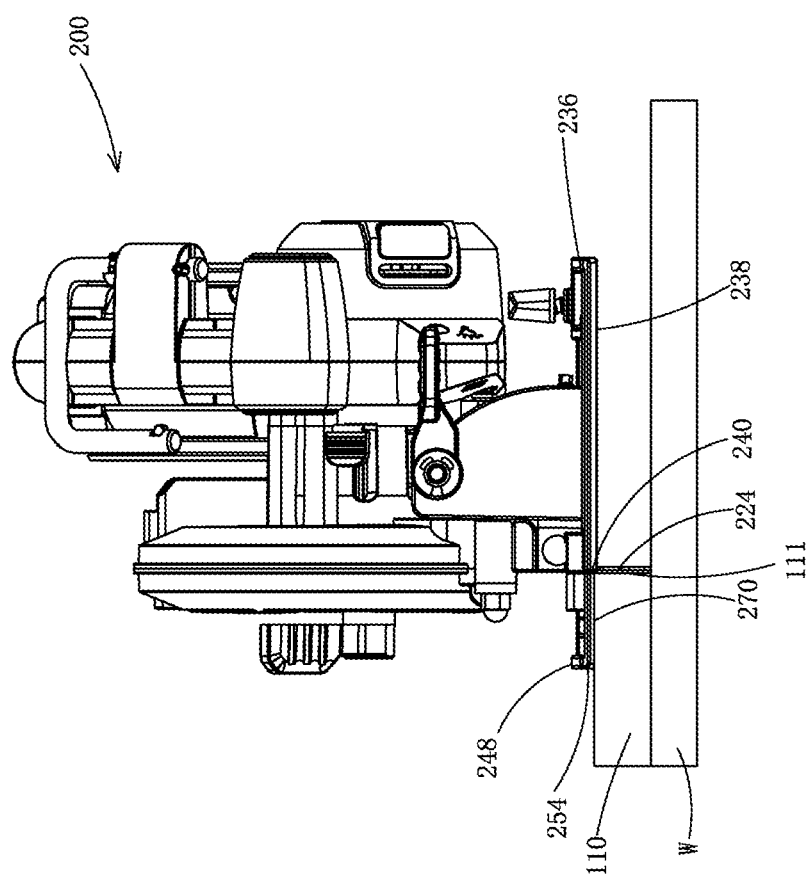

As shown in FIGS. 19 and 20, the abutting bottom surface 270 of the second base plate 248 is pressed against the guide device 110 when the operator prepares to cut a workpiece, and the saw blade 224 passes through the saw blade groove 232 to be close to the guide surface 111 of the guide device 110.

Figure 21:
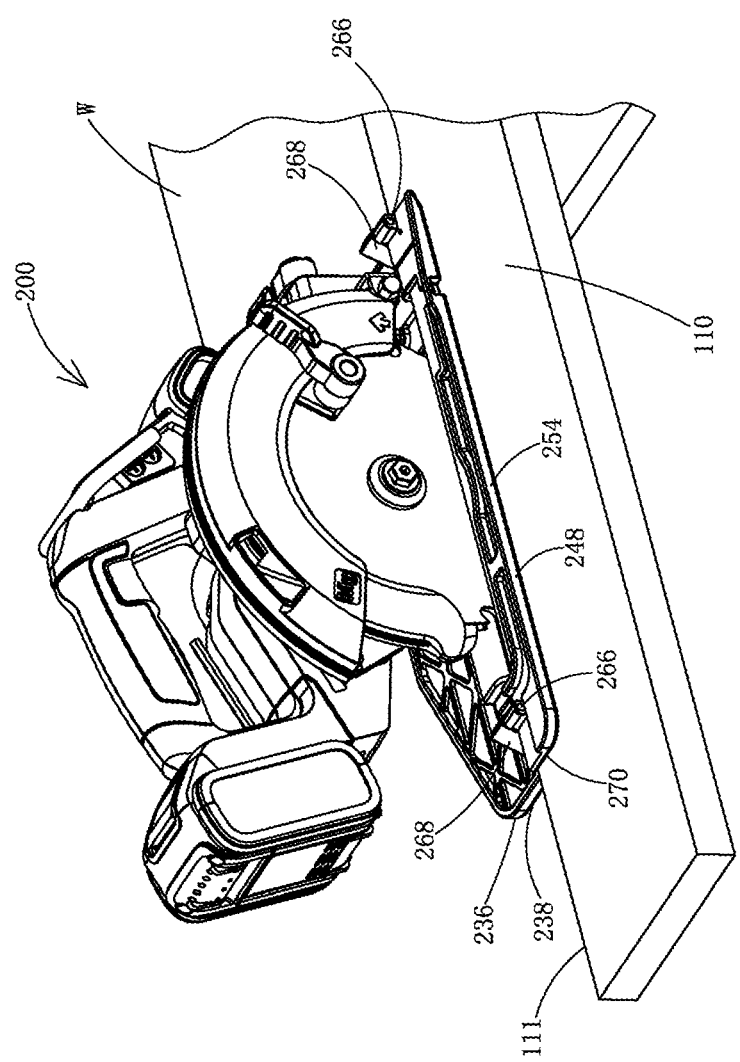

In combination with FIGS. 21 and 22, afterwards, the operator presses the cutting tool 200 down, since the first base plate 236 and the second base plate 248 are movably connected by the above connecting mechanism, and the second base plate 248 is abutted against the guide device 110, the cutting tool 200 is pressed down to enable the first base plate 236 to move to the workpiece W till the first bottom surface 238 of the first base plate 236 is abutted against the workpiece W, at this point, if the first abutting surface 240 of the first base plate 236 is not abutted against the guide surface 111 of the guide device, the operator can properly move the cutting tool 200 to enable the first abutting surface 240 of the first base plate 236 to be abutted against the guide surface 111 of the guide device 110, and after the first abutting surface 240 is abutted against the guide surface 111 of the guide device 110, the saw blade 224 is in a position closest to the guide device 110, the operator starts the motor and pushes the cutting tool 200 to move forwards to cut the workpiece W.

Therefore, by matching the first base plate 236 with the guide device 110, there is no need for extra measuring before cutting, there is also no need to reserve a space originally occupied by the base plate between the guide surface 111 and the cutting line, and the cutting can be finished conveniently and quickly. The cutting tool is more convenient to use, and the cutting efficiency is higher.

The traditional cutting is the cutting when the second base plates 248 and the first base plate 236 are in the first matching state as shown in FIG. 17, at this point, the first bottom surface 238 of the first base plate 236 and the abutting bottom surface 270 of the second base plate 248 are coplanar and are abutted against the workpiece, the second side surface 254 of the second base plate 248 away from the first base plate 236 is abutted against the guide device, and the cutting device 200 slides forwards such that the saw blade driven by the motor cuts the workpiece, which is not repeated.

FIGS. 23 to 26 show a cutting tool 300 provided by an example embodiment of the present invention.

In the cutting tool provided in the example embodiment, the connecting mechanism between the first base plate 336 and the second base plate 348 is a parallel four-connecting rod mechanism. In this way, the second base plate 348 can translate relative to the first base plates 236 by the parallel four-connecting rod mechanism, and the switching of the first bottom surface 338 between the first position coplanar with the second bottom surface 352 and the second position non-coplanar with the second bottom surface 352 can be realized. Besides, the first base plate 336 and the second base plate 348 relatively move to expose the first abutting surface 340 of the first base plate 336 which is matched with the guide surface 111 of the guide device 110. Or in other words, the first abutting surface 340 is exposed to be matched with the guide surface 111 of the guide device 110, and the first bottom surface 338 and the second bottom surface 352 are non-coplanar.

Here, the relative position relation between the first abutting surface 340 and the saw blade plane or the saw blade 324 is same as that of the first abutting surface 140 and is not repeated here.

Figure 23:
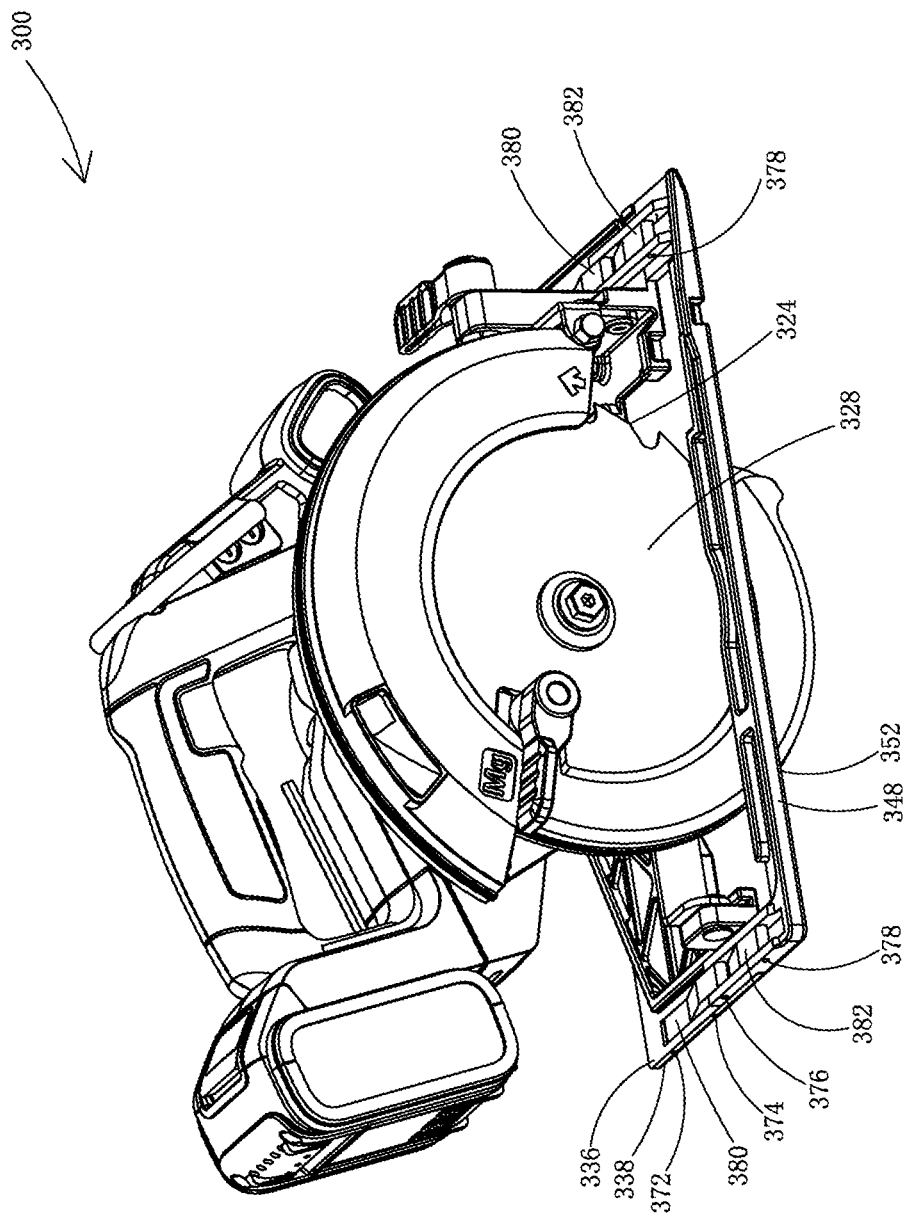
FIG. 23 is a perspective view from the front side of a cutting tool provided by an example embodiment of the present invention, and at this point, the first base plate and the second base plate are in the first matching state.
Figure 26:
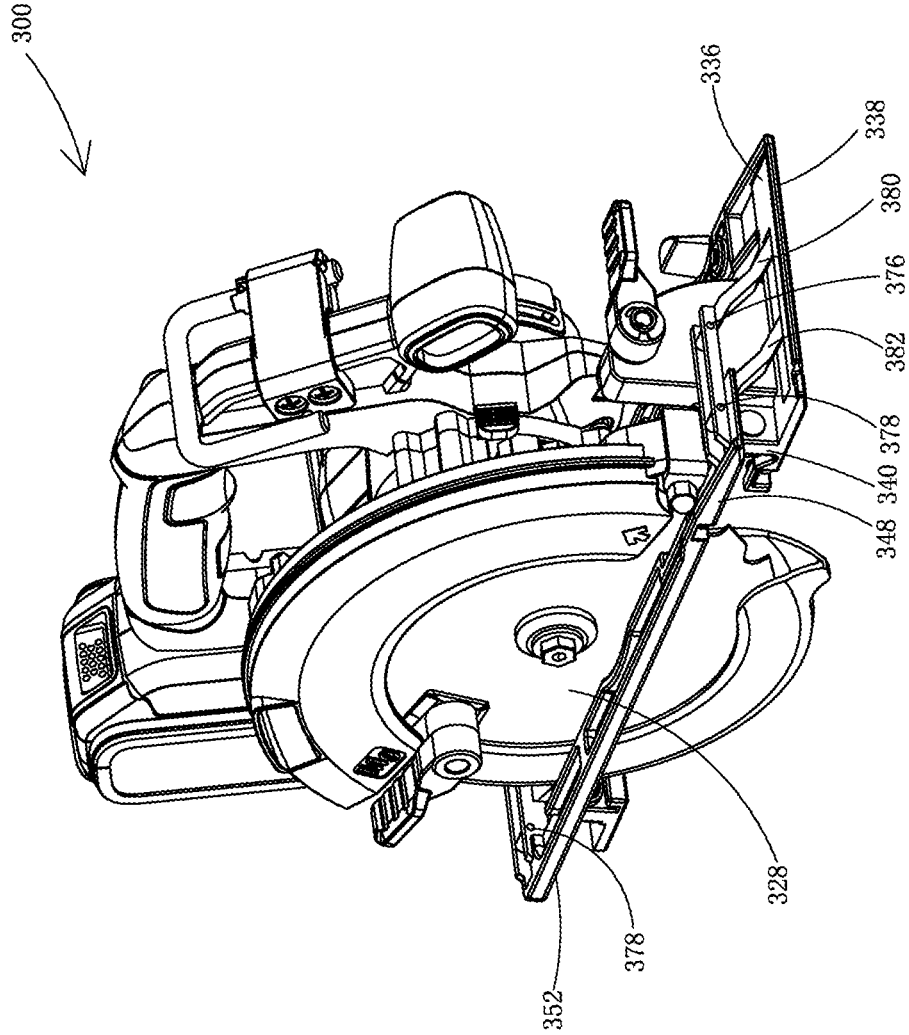
FIG. 26 is a perspective view from the right side of the cutting tool as shown in FIG. 24, and at this point, the first base plate and the second base plate are in the second matching state.

Referring to FIGS. 23 and 26, the connecting mechanism comprises a first rotary shaft 372 and a second rotary shaft 374 disposed on the first base plate 336, a third rotary shaft 376 and a fourth rotary shaft 378 disposed on the second base plate 348, a first connecting rod 380 in pivoting connection with the first rotary shaft 372 and the third rotary shaft 376, and a second connecting rod 382 in pivoting connection with the second rotary shaft 374 and the fourth rotary shaft 378.

The first rotary shaft 372 and the second rotary shaft 374 are in parallel and are separated by a certain distance. The first rotary shaft 372 is parallel to the first lateral cutting plane 328 of the saw blade 324. The second rotary shaft 374 is parallel to the first lateral cutting plane 328 of the saw blade 324. The first rotary shaft 372 is parallel to a feeding direction of the saw blade 342 on the workpiece.

The third rotary shaft 376 and the fourth rotary shaft 378 are in parallel and are separated by a certain distance. The third rotary shaft 376 is parallel to the first lateral cutting plane 328 of the saw blade 324. The fourth rotary shaft 378 is parallel to the first lateral cutting plane 328 of the saw blade 324. The third rotary shaft 376 is parallel to a feeding direction of the saw blade 342 on the workpiece.

The first connecting rod 380 and the second connecting rod 382 are in parallel and are separated by a certain distance. The first connecting rod 380 and the second connecting rod 382 are same in length and shape.

Figure 24:
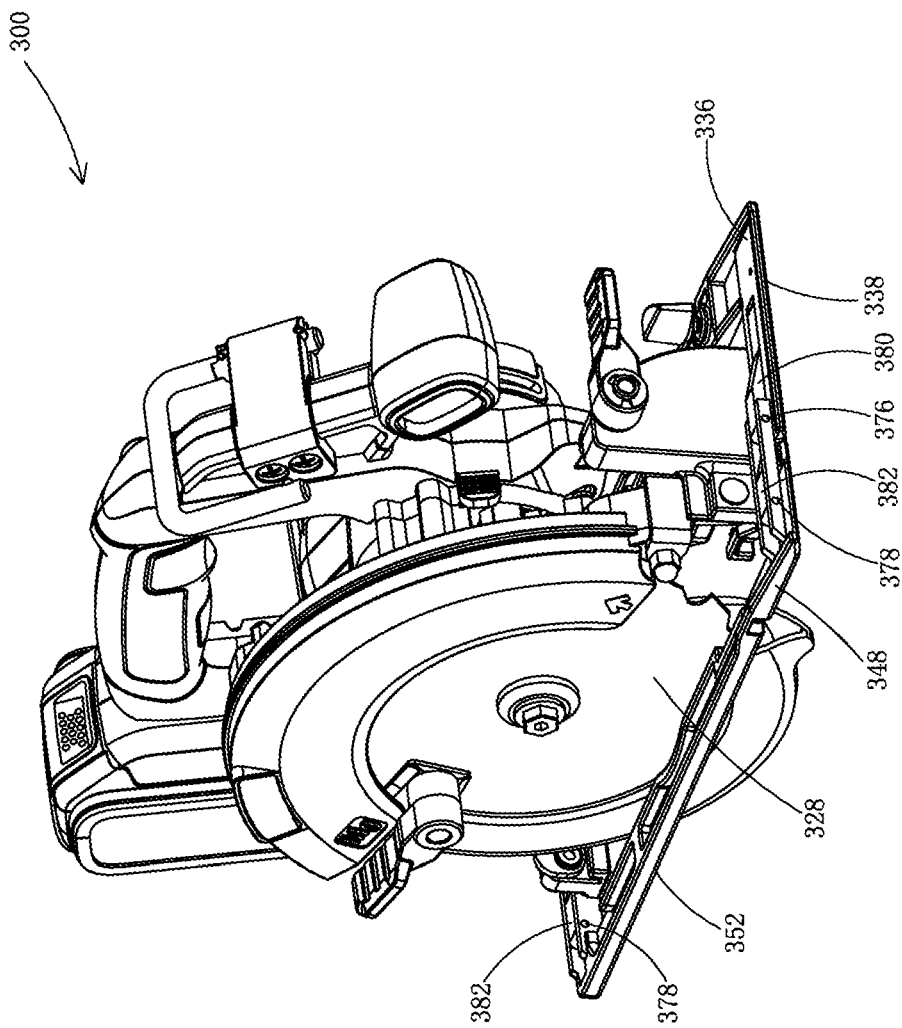
FIG. 24 is a perspective view from the right side of the cutting tool as shown in FIG. 23.

Referring to FIGS. 23 and 24, at this point, the first bottom surface 338 of the first base plate 336 and the second bottom surface 352 of the second base plate 348 are coplanar and can be abutted against the workpiece, and the cutting tool 300 realizes traditional cutting.

Figure 25:
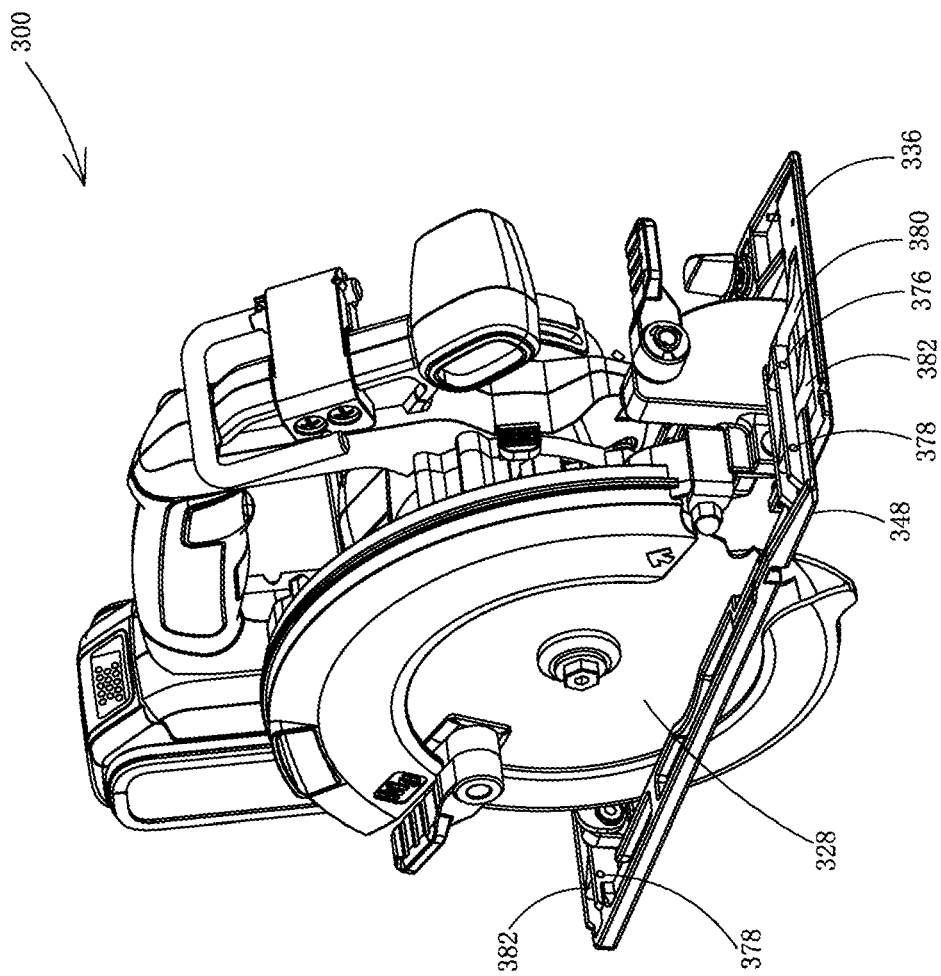
FIG. 25 is a perspective view from the right side of the cutting tool as shown in FIG. 24, and at this point, the cutting tool is under a middle state from the first matching state to the second matching state.

Referring to FIGS. 25 and 26, the operator presses the second bottom surface 352 of the second base plate 348 on the guide device 110 (not shown), afterwards, the operator presses the cutting tool 300 down, since the first base plate 336 and the second base plate 348 are movably connected by the parallel four-connecting rod mechanism, and the second base plate 348 is abutted against the guide device 110, the cutting tool 300 is pressed down to enable the first base plate 336 to move to the workpiece W till the first bottom surface 338 of the first base plate 336 is abutted against the workpiece W (not shown), the operator can properly move the cutting tool 300 to enable the first abutting surface 340 to be abutted against the guide surface 111 of the guide device 110, and in this way, convenient and quick cutting can be realized.

Figure 27:
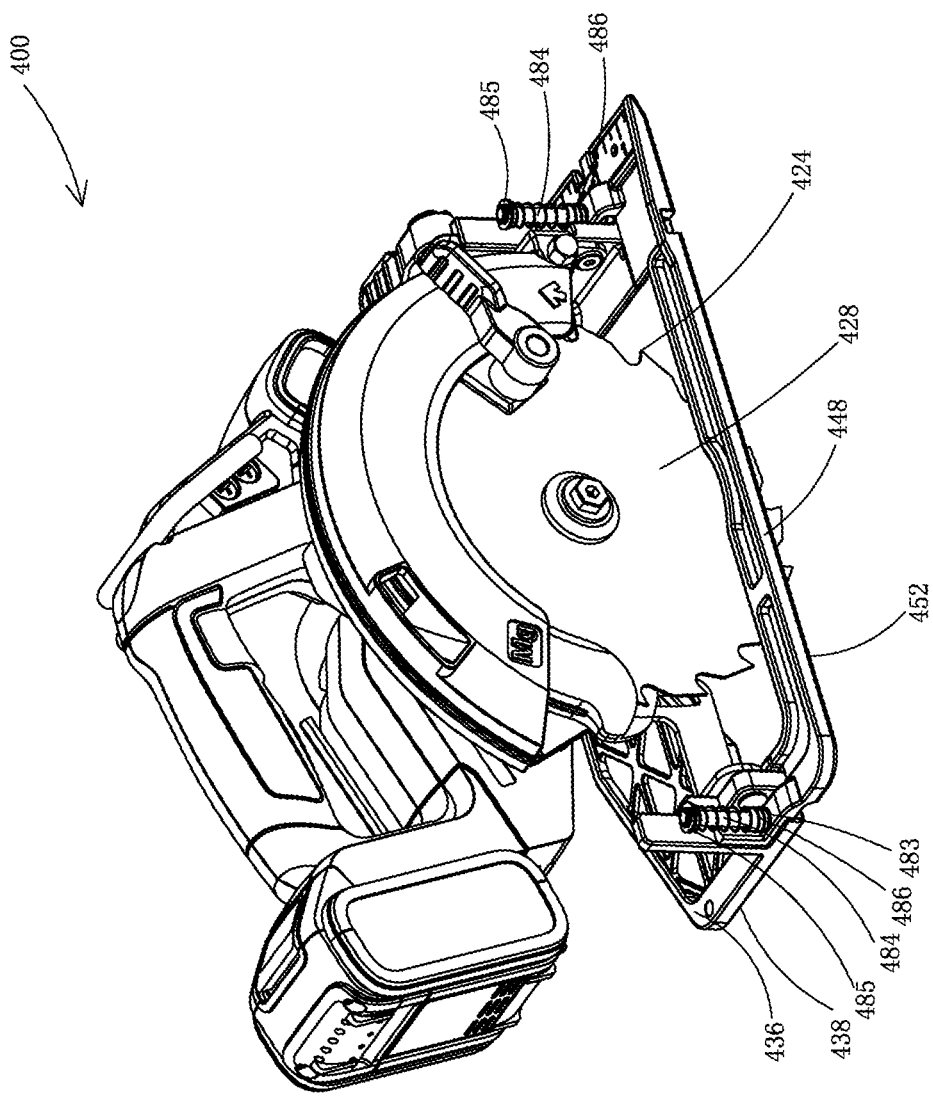
FIG. 27 is a perspective view from the front side of a cutting tool provided by an example embodiment of the present invention, and at this point, the first base plate and the second base plate are in the first matching state.
Figure 28:
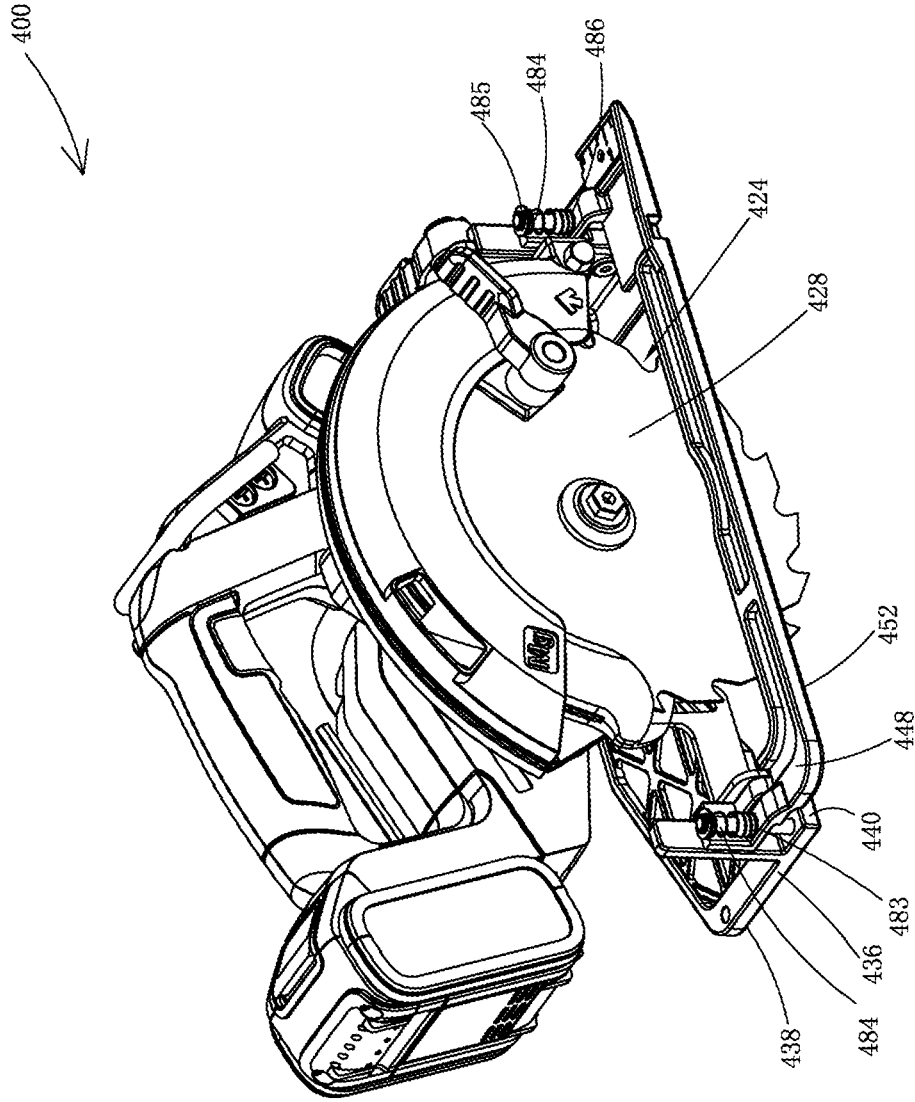
FIG. 28 is a perspective view from the front side of the cutting tool as shown in FIG. 27, and at this point, the cutting tool is under a middle state from the first matching state to the second matching state.
Figure 29:
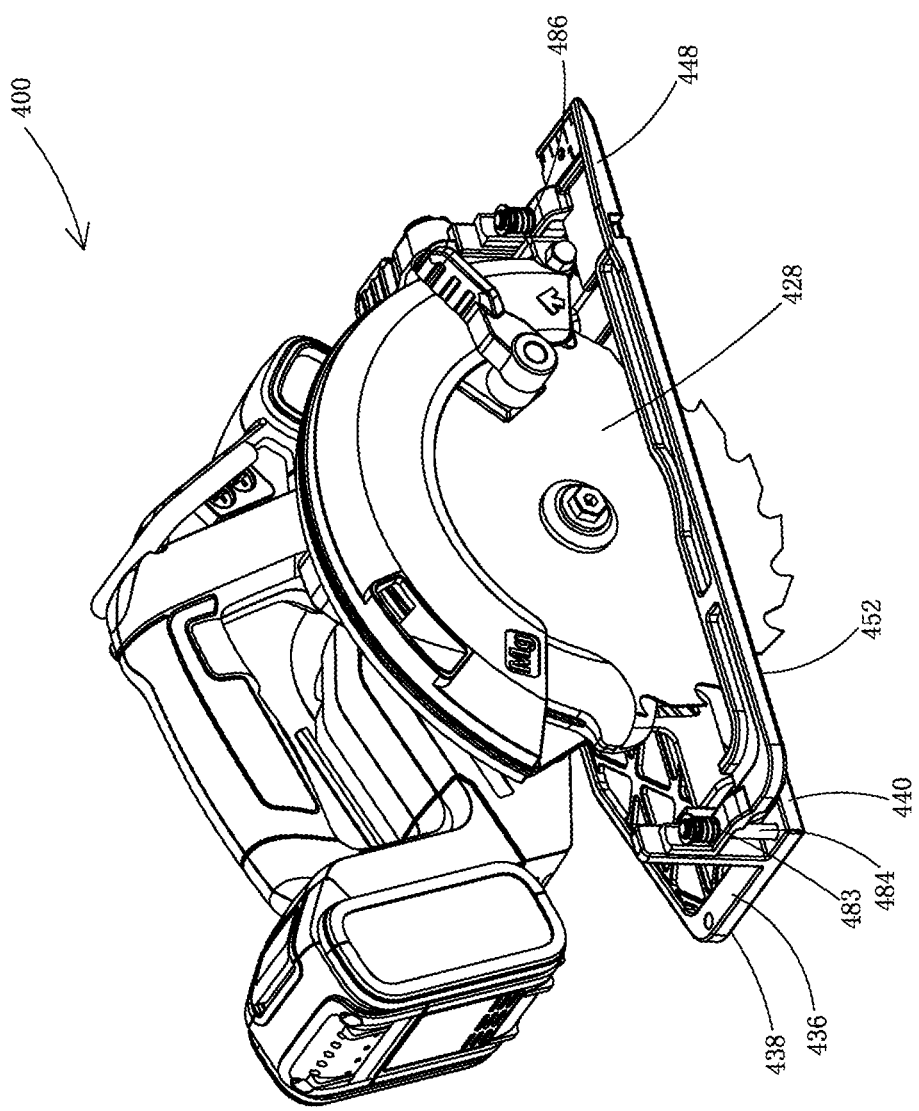
FIG. 29 is a perspective view from the front side of the cutting tool as shown in FIG. 27, and at this point, the first base plate and the second base plate are in the second matching state.

FIGS. 27 to 29 show a cutting tool 400 provided by an example embodiment of the present invention.

In the cutting tool 400 provided by the example embodiment, the connecting mechanism between the first base plate 436 and the second base plate 448 is a linear slide rail mechanism. In this way, the second base plate 448 can translate relative to the first base plate 436 by the linear slide rail mechanism, and the switching of the first bottom surface 438 between a first position coplanar with the second bottom surface 452 and a second position non-coplanar with the second bottom surface 452 can be realized. Besides, the first base plate 436 and the second base plate 448 relatively move to expose a first abutting surface 440 of the first base plate 436, which is matched with the guide surface 111 of the guide device 110. Or in other words, the first abutting surface 440 is exposed to be matched with the guide surface 111 of the guide device 110, and the first bottom surface 438 and the second bottom surface 452 are non-coplanar.

Here, the relative position relation between the first abutting surface 440 and the saw blade plane or the saw blade 424 is same as that of the first abutting surface 140 and is not repeated here.

Referring to FIGS. 27 to 29, the connecting mechanism comprises a linear slide rail 484 disposed on the first base plate 436 and a sliding matching-connecting member disposed on the second base plate 448 and the sliding matching-connecting member is matched with the linear slide rail 484. Of course, the linear slide rails 484 can also be disposed on the second base plates 448, while the sliding matching-connecting member is disposed on the first base plate 436.

The linear slide rail 484 is fixedly disposed on the first base plate 436, and an extending direction of the linear slide rail 484 is perpendicular to the first bottom surface 438 of the first base plate 436.

The sliding matching-connecting member is a through hole 483 disposed in the second base plate 448 and the sliding matching-connecting member is matched with an outer profile of the linear slide rail 484. The linear side rail 484 passes through the through hole, and then the switching of the first bottom surface 438 between a first position coplanar with the second bottom surface 452 and a second position non-coplanar with the second bottom surface 452 can be realized.

Referring to FIG. 28, the cutting tool 400 also comprises an elastic member 486 applying a force to the second base plate 448. One end of the linear slide rail 484 is fixed with the first base plate 436, the other end is provided with an end cover 485, and the elastic member 486 is disposed between the end cover 485 and the second base plate 448. The elastic member 486 promotes the second base plate 452 to have a movement trend to be coplanar with the first bottom surface 438.

FIGS. 30 to 33 show a cutting tool 500 provided by an example embodiment of the present invention.

Figure 30:
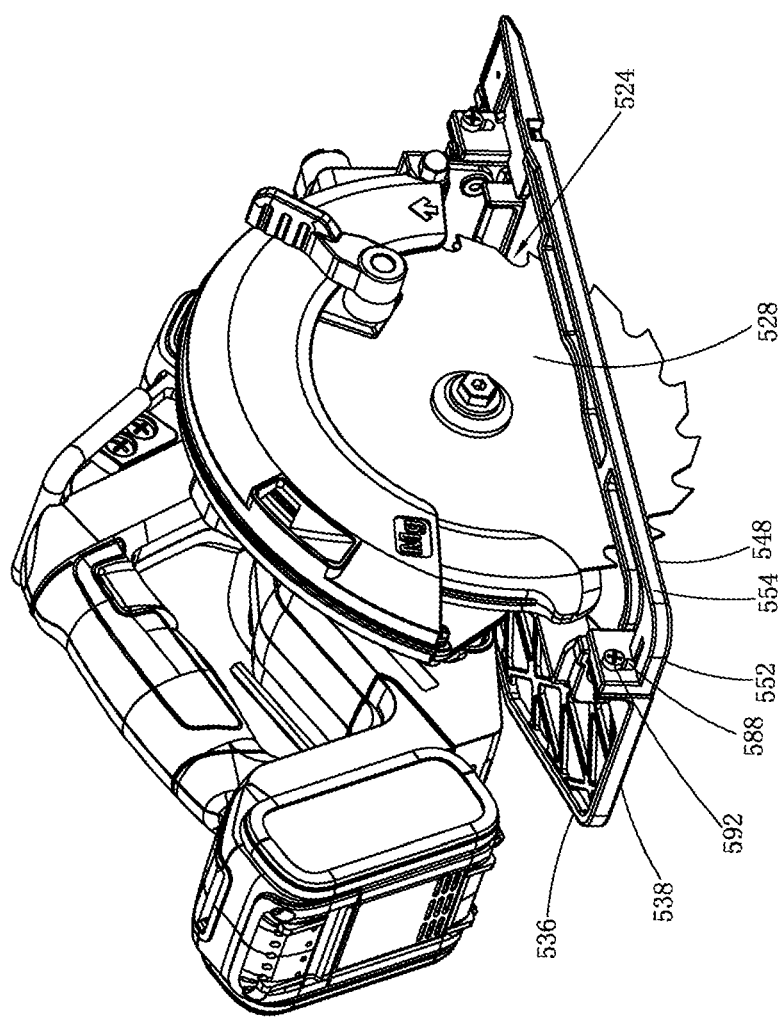
FIG. 30 is a perspective view from the front side of a cutting tool provided by an example embodiment of the present invention, and at this point, the first base plate and the second base plate are in the first matching state.
Figure 31:
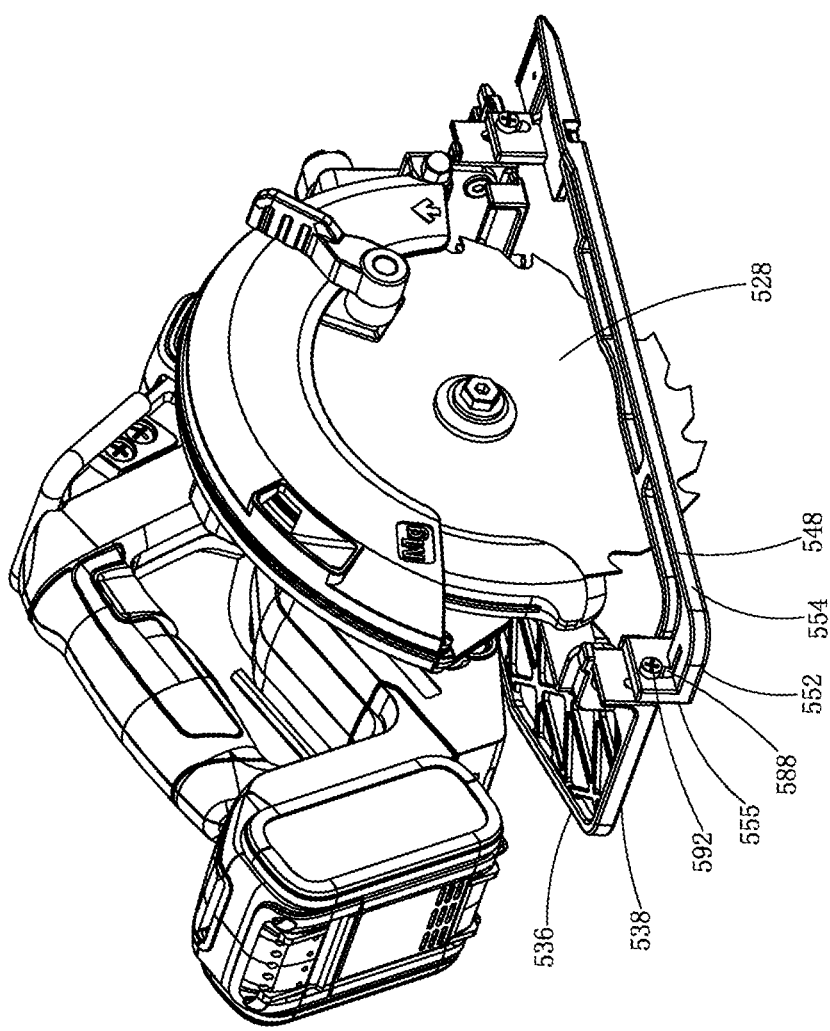
FIG. 31 is a perspective view from the front side of the cutting tool as shown in FIG. 30, and at this point, the first base plate and the second base plate are in the second matching state.

The cutting tool can be switched between two different matching states by means of the movable connection between a second base plate 548 and a first base plate 536, as shown in FIG. 30. Under the first matching state, the first bottom surface 538 of the first base plate 536 and the second bottom surface 552 of the second base plate 548 are flush; and as shown in FIG. 31, under the second matching state, the first bottom surface 538 of the first base plate 536 and the second bottom surface 552 of the second base plate 548 are staggered. Under the second matching state, the second bottom surface 552 of the second base plate 548 may be away from the motor relative to the first bottom surface 538 of the first base plate 536. That is, a distance between the second bottom surface 552 of the second base plate 548 and the motor axis X is bigger than the distance between the first bottom surface 538 of the first base plate 536 and the motor axis X.

Figure 32:
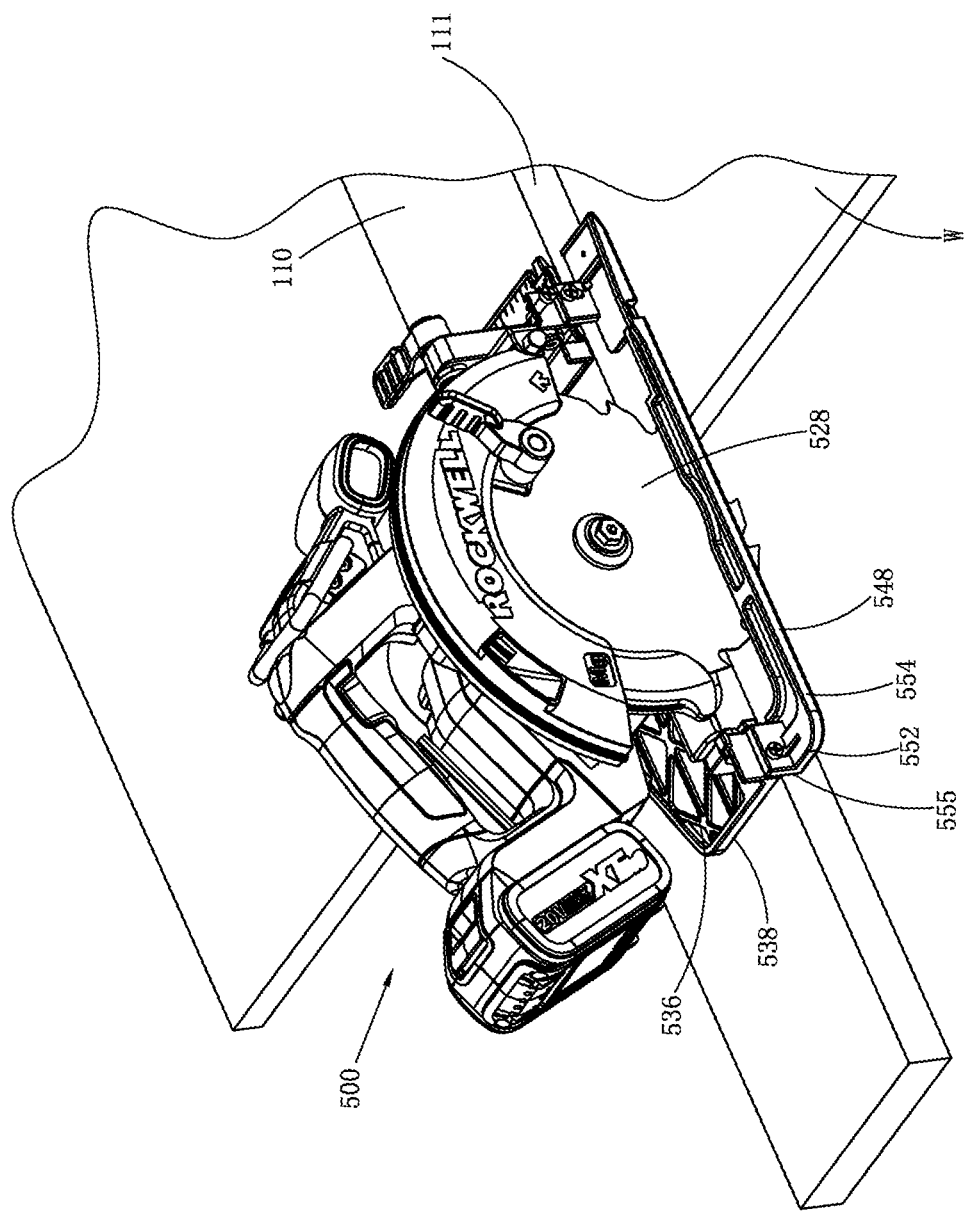
FIG. 32 is a front view of a use state of the cutting tool as shown in FIG. 30, and at this point, the two base plates are under the second matching state.
Figure 33:
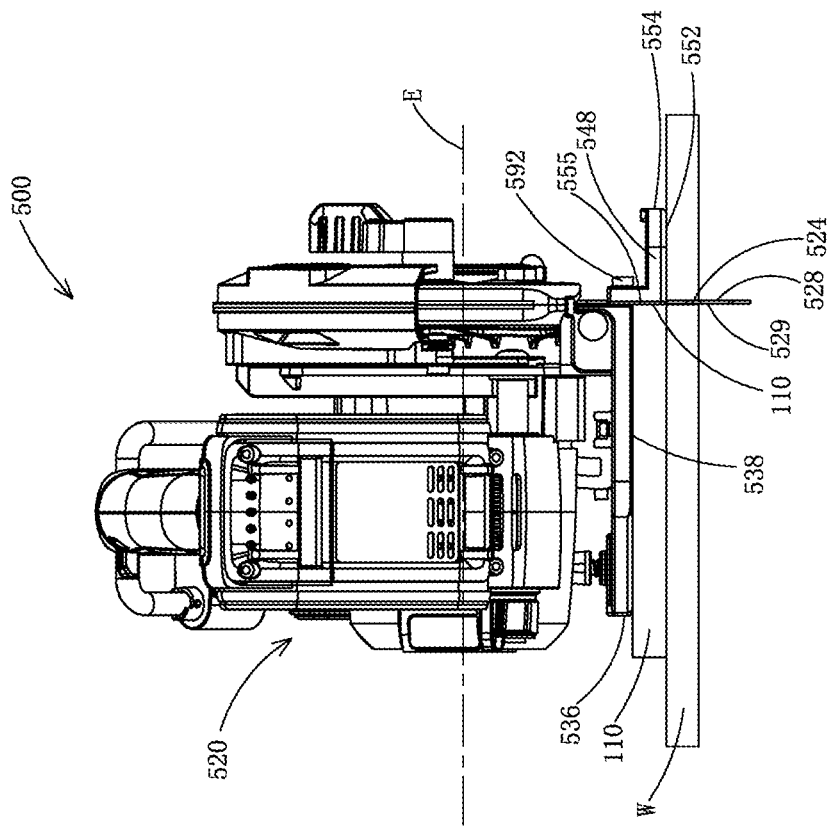
FIG. 33 is a back view of a use state of the cutting tool as shown in FIG. 32, and at this point, the two base plates are under the second matching state.

The cutting tool can be switched between two different working states by means of the movable connection between the second base plate 548 and the first base plate 536. As shown in FIGS. 32 and 33, under the second working state, the first bottom surface 538 of the first base plate 536 is abutted against the guide device 110, and a third side surface 555 of the second base plate 548 close to the first base plate 536 is abutted against the guide surface 111 on the guide device 110. As shown in FIG. 30, under the first working state, the first bottom surface 538 of the first base plate 536 and the second bottom surface 552 of the second base plate 548 are coplanar and are abutted against the workpiece together, and the second side surface 554 of the second base plate 548 away from the first base plate 536 is abutted against the guide surface 111 on the guide device 110.

The third side surface 555 of the second base plate 548 close to the first base plate 536 may be flush with the saw blade plane of the saw blade 524. The third side surface 555 is a second abutting surface abutted against the guide device 110. The distance between the second abutting surface 555 of the second base plate 548 and the saw blade plane of the saw blade 524 may be smaller than or equal to 3 mm. The distance between the second abutting surface 555 of the second base plate 548 and the saw blade plane of the saw blade 524 may be between 0.5 mm-0.8 mm. More The distance between the third side surface 555 of the second base plate 548 close to the first base plate 536 and a central plane of the saw blade 524 may be between 0.5 mm and 0.8 mm. The saw blade plane of the saw blade closest to the transmission mechanism is defined as a second lateral cutting plane 529, and the distance between the second lateral cutting plane 529 and the first lateral cutting plane 528 is the thickness of the saw blade. Or in other words, the second abutting surface 555 of the second base plate 548 and the second lateral cutting plane 529 of the saw blade 524 are flush. The distance between the second abutting surface 555 of the second base plate 548 and the second lateral cutting plane 529 of the saw blade 524 may be smaller than or equal to 3 mm. The distance between the second abutting surface 555 of the second base plate 548 and the second lateral cutting plane 529 of the saw blade 524 may be between 0.5 mm-0.8 mm. On a projection of the second bottom surface 552 of the second base plate 548, the second lateral cutting plane 529 is away from the housing 520 relative to the second abutting surface 555.

Therefore, when the second abutting surface 555 of the second base plate 548 is abutted against the guide device 110, the saw blade plane of the saw blade 524 or the second lateral cutting plane 529 of the saw blade 524 is very close to the guide device 110, a cutting track of the saw blade 524 is the track of a cutting line on the workpiece W aligned with the guide surface 111 of the guide device 110, the operator can conveniently and quickly finish cutting without a need to perform extra measuring before cutting and without a need to reserve a space originally occupied by the base plate between the guide surface 111 and the cutting line. The cutting tool is more convenient to use. The cutting is convenient, and then the cutting efficiency is higher. Besides, the cutting tool 500 of the present embodiment is simple in structure, and lower in cost.

Referring to FIGS. 30 and 31, in the present embodiment, the second base plate 548 and the first base plate 536 are switched between the first matching state and the second matching state by a sliding matching-connecting mechanism, the sliding matching-connecting mechanism comprises a sliding guiding member 588 and a sliding fixing member 592, when the fixing member 592 is loosed, the second base plate 548 can slide relative to the first base plate 536, and when the sliding fixing member 592 is fixed, the second base plate 548 is fixed relative to the first base plate 536. In the present embodiment, the sliding guiding member 588 comprises chutes disposed in the first base plate 536 and the second base plate 548, and the sliding fixing member 592 comprises bolts (not shown) passing through the chutes of the first base plate 536 and the second base plate 548 and nuts matched with the nuts. Of course, the sliding guiding member 588 can also be a chute disposed in one of the first base plate 536 and the second base plate 548, and the sliding fixing member comprises a threaded hole disposed in the other of the first base plate 536 and the second base plate 548 and a screw matched with the threaded hole. An extending direction of the chute may be perpendicular to the first bottom surface 538 of the first base plate 536 or the second bottom surface 552 of the second base plate 548. Of course, those skilled in the art can conceive that the extending direction of the chute is not limited to be perpendicular to the first bottom surface, and can also be disposed obliquely. In addition, the sliding fixing member is also not limited to a threaded locking mechanism, and can also be a cam locking mechanism, etc.

Those skilled in the art can conceive that the second base plate 548 and the first base plate 536 can realize movable matching therebetween by a pivoting matching mechanism, a parallel four-connecting rod mechanism, etc., thereby enabling the third side surface 555 of the second base plate 548 close to the first base plate 536 to be abutted against the guide device 110 to guide the cutting on the workpiece, which is not repeated. All inventive concepts similar to the present embodiment belong to a protective scope of the present invention.

Figure 34:
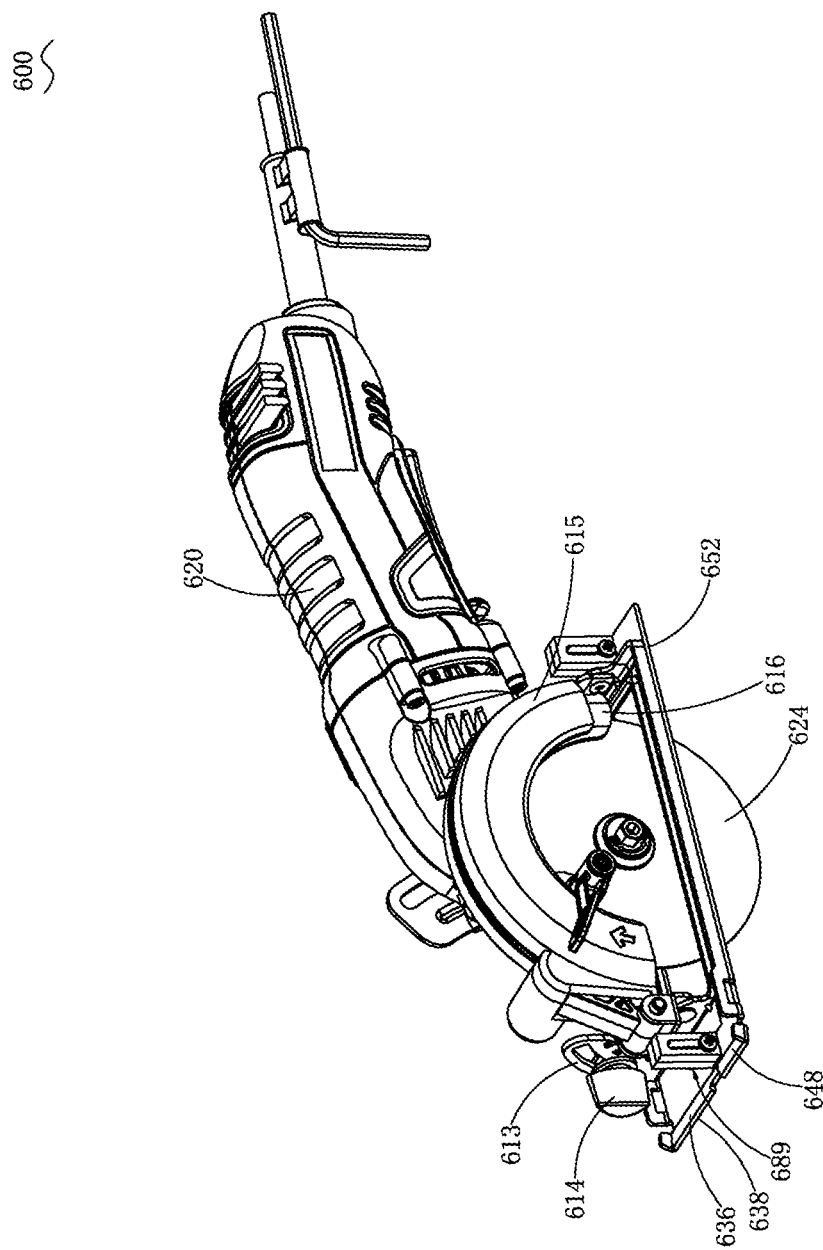
FIG. 34 is a perspective view from the front side of a cutting tool provided by an example embodiment of the present invention, and at this point, the first base plate and the second base plate are in the first matching state.
Figure 35:
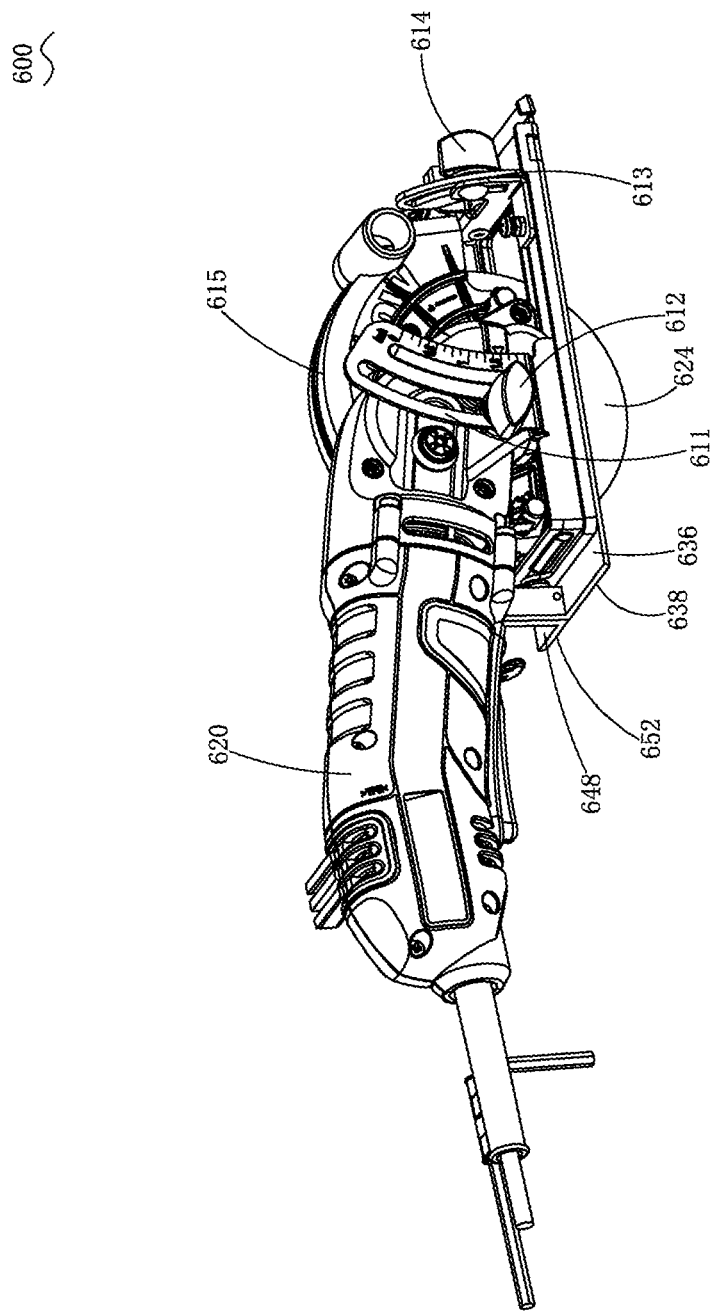
FIG. 35 is a perspective view from the back side of the cutting tool as shown in FIG. 34.
Figure 36:
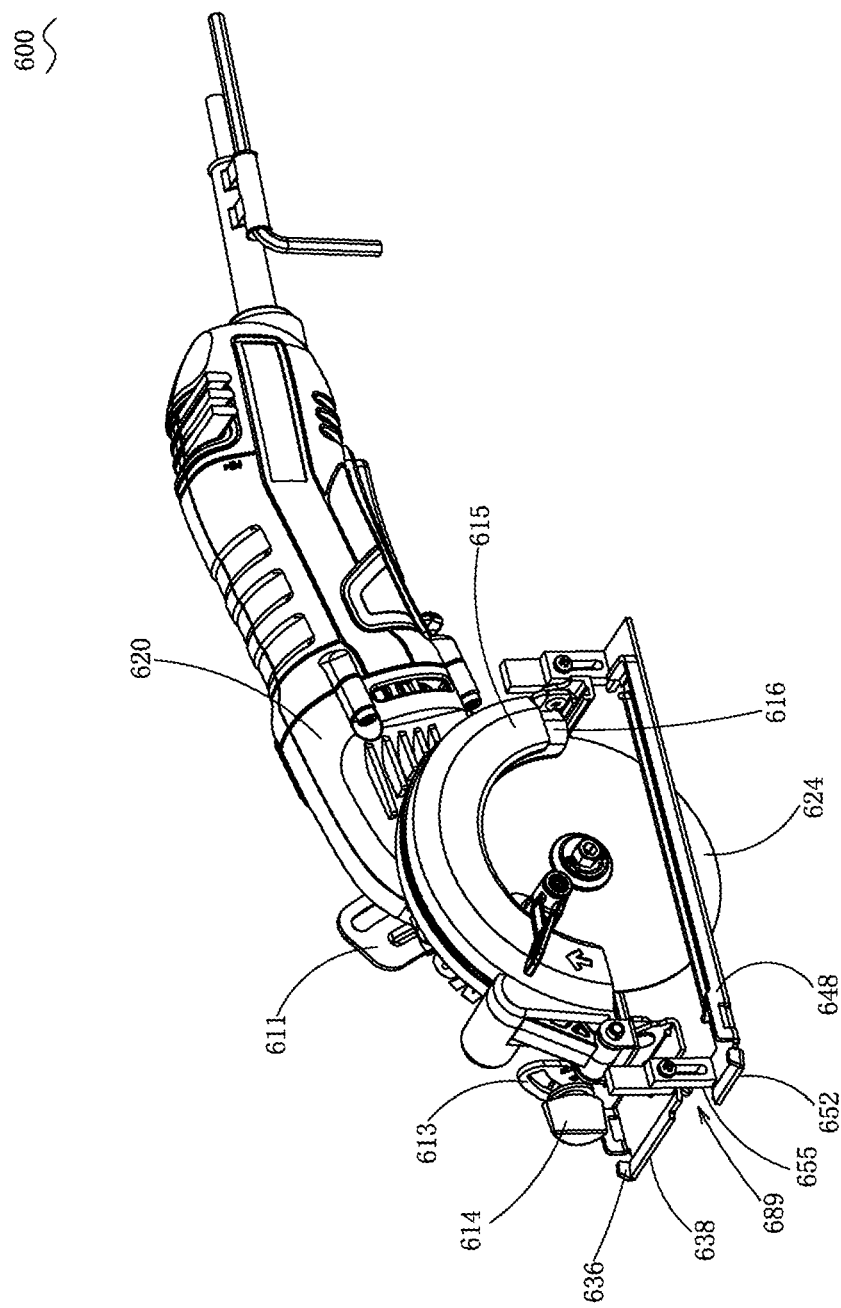
FIG. 36 is another perspective view from the front side of the cutting tool as shown in FIG. 34, and at this point, the first base plate and the second base plate are in the second matching state.

FIGS. 34 to 36 show a cutting tool 600 provided by an example embodiment of the present invention.

The main difference between the cutting tool 600 and the cutting tool 500 is layout of the housing, the motor, etc., of the cutting tool.

The cutting tool 500 is same as the cutting tool 1 in integral layout, and a housing thereof comprises an upper support, a front support, a lower support and a back support which are connected in sequence, and a motor housing in a junction between the front support and the lower support.

Referring to FIGS. 34 and 35, in the example embodiment, the whole housing 620 longitudinally extends, and contains a motor and a transmission mechanism therein. The transmission mechanism is approximately disposed between the motor and the saw blade 624, and is used for transmitting power of the motor to the saw blade 624 to drive the saw blade 624 to perform rotation. The longitudinally extending direction of the housing 620 is parallel to an axis of the motor, and the axis of the motor is perpendicular to the axis of the saw blade shaft. A central line of the housing 620 and the axis of the motor may be collinear.

The cutting tool of the example embodiment also comprises a fixed cover 615 fixedly connected to the housing 620 and a movable cover 616 movably connected to the housing 620, and the fixed cover 615 and the movable cover 616 play the same roles as the forgoing embodiments and are not repeated.

The cutting tool of the example embodiment also comprises a depth setting mechanism 611, a depth setting locking mechanism 612, a beveling adjusting mechanism 613 and a beveling locking mechanism 614 which are disposed on one side of the fixed cover 615, and their general structures and actions are same as the foregoing embodiments and are not repeated.

Referring to FIGS. 34 and 35, the base plates of the cutting tool of the example embodiment also comprise a first base plate 636 and a second base plate 648 movably connected to the first base plate 636, the first base plate 636 and the second base plate 648 are switched between a first matching state and a second matching state by a sliding matching-connecting mechanism 689, thereby enabling the cutting tool to be switched between a first working state and a second working state, and realizing the switching of the first bottom surface 638 between a first position coplanar with the second bottom surface 652 and a second position non-coplanar with the second bottom surface 652. Besides, the first base plate 636 ad the second base plate 648 relatively move to expose the second abutting surface 655 of the second base plate which is matched with the guide surface 111 of the guide device 110. Or in other words, the second abutting surface 655 is exposed to match with the guide surface 111 of the guide device 110, and the first bottom surface 638 and the second bottom surface 652 are non-coplanar.

Here, a relative position relation between the second abutting surface 655 and the saw blade plane or the saw blade 624 is same as that of the second abutting surface 555 and is not repeated here.

Those skilled in the art can conceive that the connecting mechanism of the base plate 636 and the second base plate 648 can adopt the foregoing connecting mechanism or other connecting mechanisms, and all technical solutions similar to the example embodiment should be covered in the protection scope of the present invention.

Figure 37:
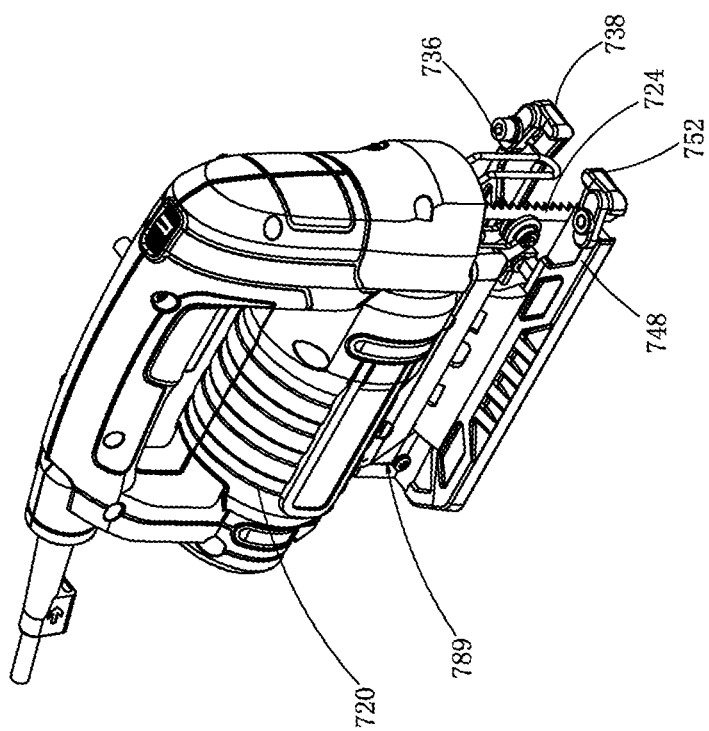
FIG. 37 is a perspective view from the front side of a cutting tool provided by an example embodiment of the present invention, and at this point, the first base plate and the second base plate are in the first matching state.
Figure 38:
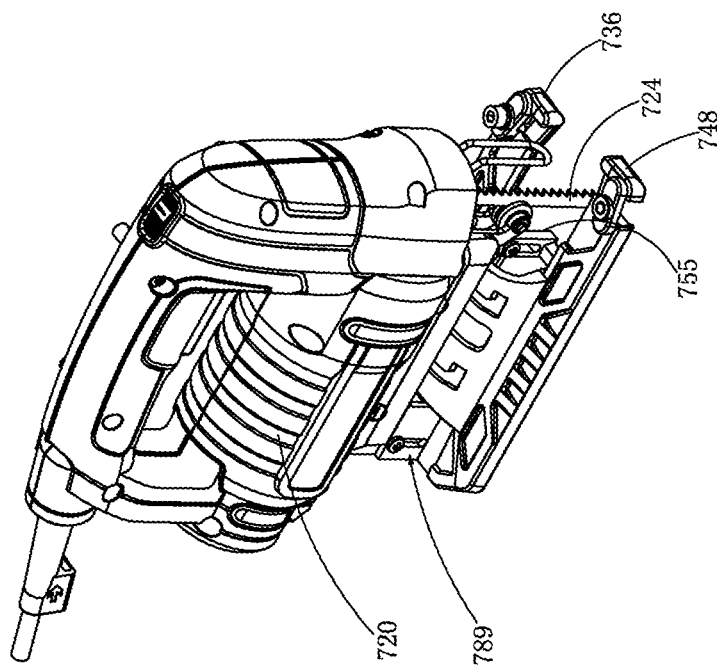
FIG. 38 is another perspective view from the front side of the cutting tool as shown in FIG. 37, and at this point, the first base plate and the second base plate are in the second matching state.
Figure 39:
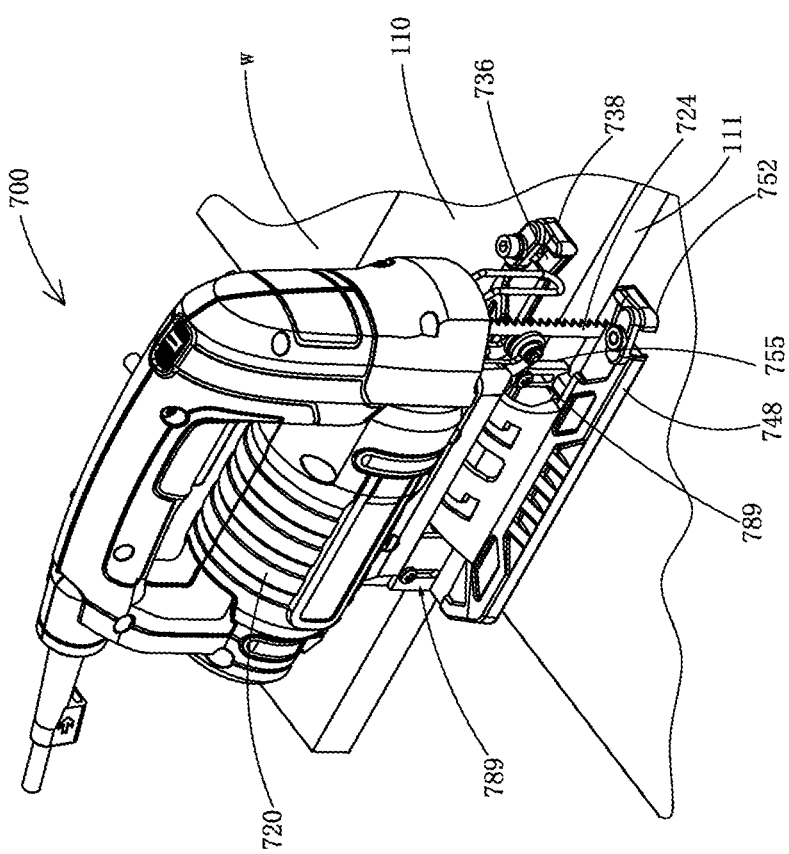
FIG. 39 is a perspective view from the front side of a use state of the cutting tool as shown in FIG. 38, and at this point, the two base plates are under the second matching state.

FIGS. 37 to 39 show a cutting tool 700 provided by an example embodiment of the present invention.

The saw blade of the example embodiment is a longitudinally extending hack saw and is driven to reciprocate by the motor through the transmission mechanism, and the cutting tool is a jig saw.

Referring to FIGS. 37 and 38, the jig saw comprises a housing 720, a motor and a reciprocation driving mechanism contained in the housing 720 and a hack saw 724 driven by the reciprocation driving mechanism to linearly reciprocate.

Referring to FIGS. 37 to 39, the base plates of the cutting tool of the example embodiment also comprise a first base plate 736 and a second base plate 748 movably connected to the first base plate 736, the first base plate 736 and the second base plate 748 are switched between the first matching state as shown in FIG. 37 and the second matching state as shown in FIG. 39 by a sliding matching-connecting mechanism 789, such that the cutting tool can be switched between the first working state and the second working state. The switching of the first bottom surface 738 between a first position coplanar with the second bottom surface 752 and a second position non-coplanar with the second bottom surface 752 can be realized. Besides, the first base plate 736 and the second base plate 748 relatively move to expose the second abutting surface 755 of the second base plate 748, which is matched with the guide surface 111 of the guide device 110. Or, in other words, the second abutting surface 755 is exposed to be matched with the guide surface 111 of the guide device 110, and the first bottom surface 738 and the second bottom surface 752 are non-coplanar.

Here, a relative position relation between the second abutting surface 755 and the saw blade plane or the saw blade 724 is same as that of the second abutting surface 555 and is not repeated here.

A use state under the first matching state is a conventional use state of the jig saw, and a use state under the second matching state is a quick cutting state under guidance of the guide device as shown in FIG. 39.

Those skilled in the art can conceive that the connecting mechanism of the base plate 736 and the second base plate 748 can adopt the foregoing connecting mechanism, or other connecting mechanisms, and all technical solutions similar to the example embodiment should be covered in the protection scope of the present invention.

Figure 40:
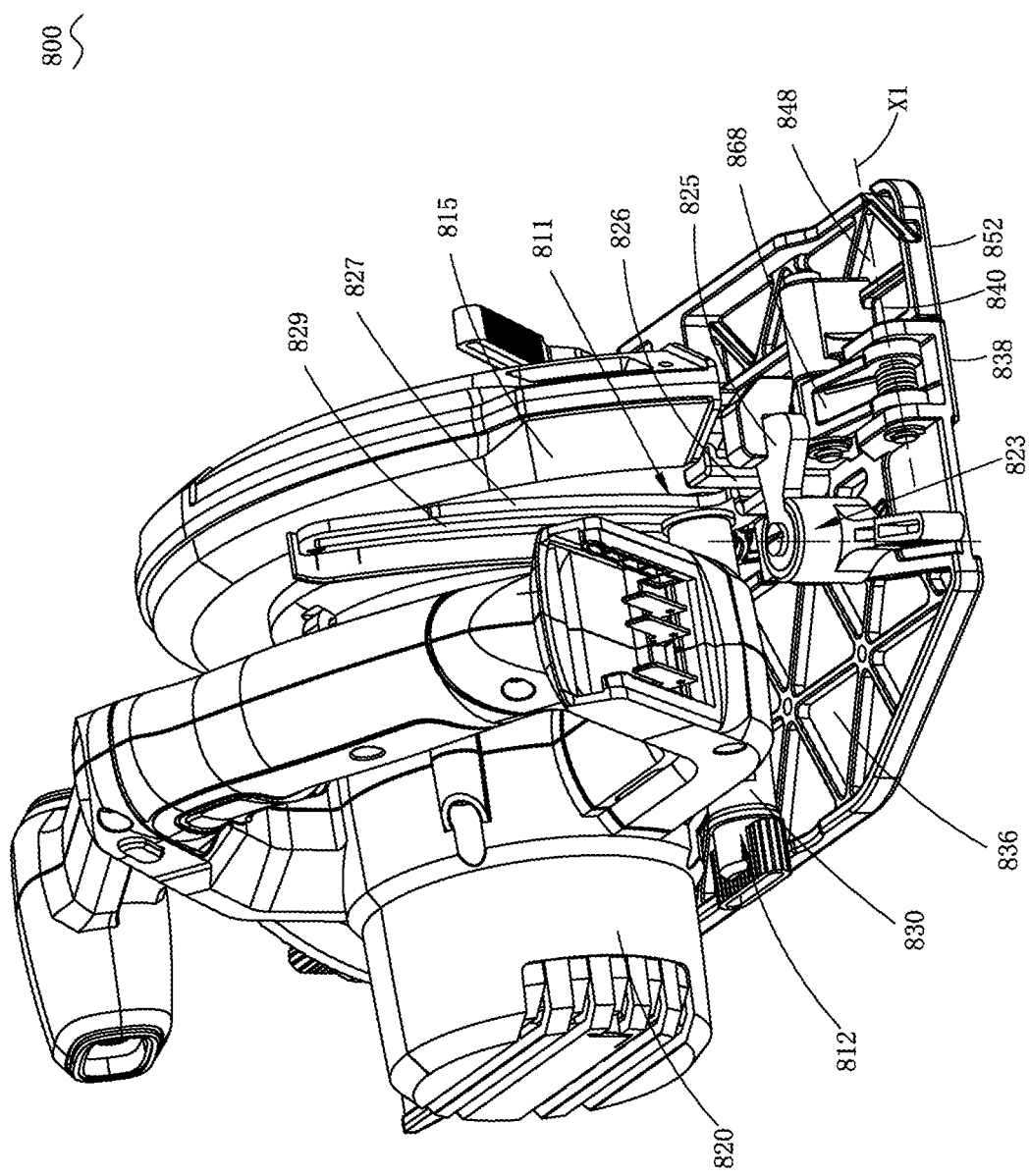
FIG. 40 is a space schematic diagram of a cutting tool provided by an example embodiment of the present invention, and at this point, the cutting tool is under a first mode.
Figure 48:
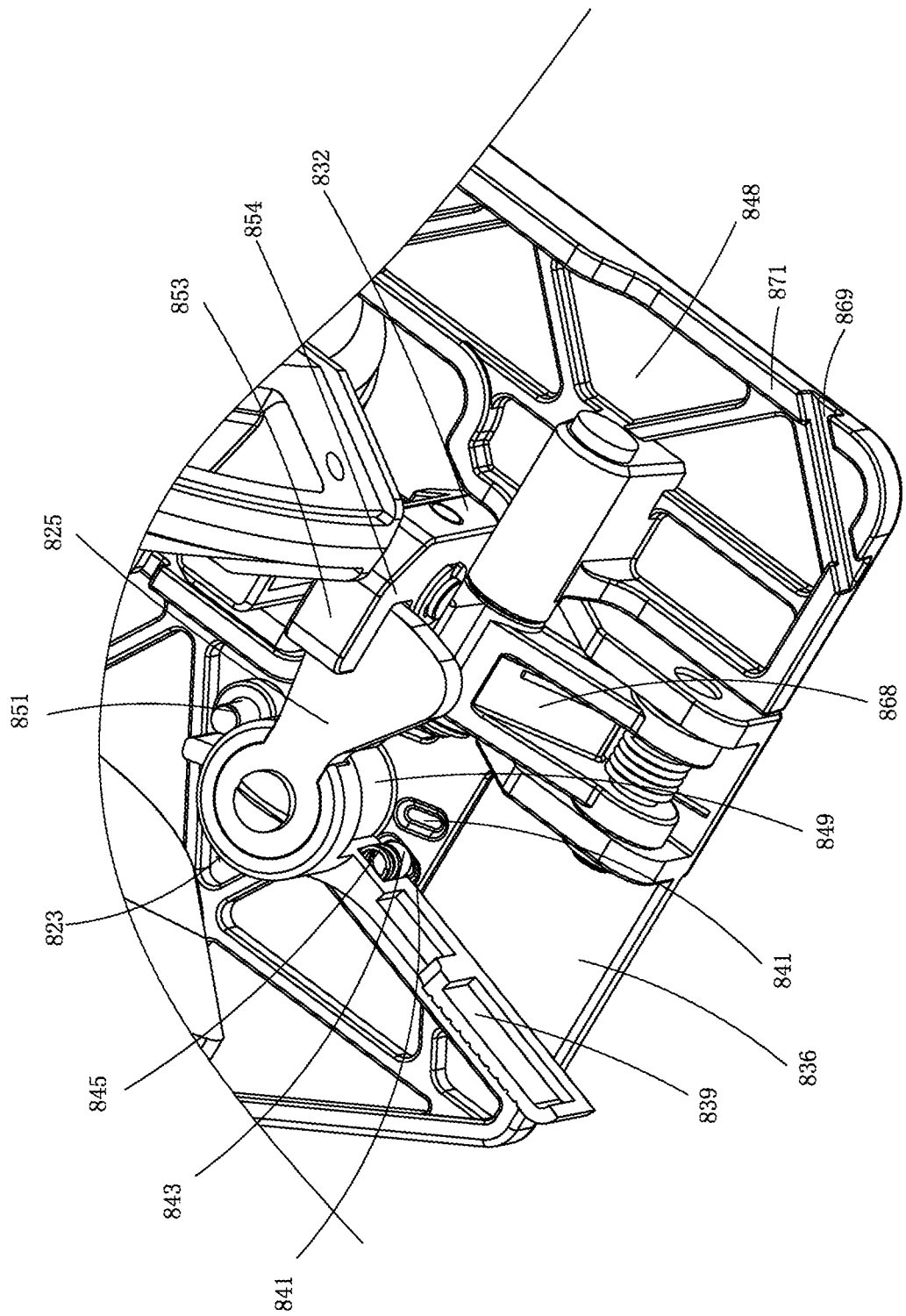
FIG. 48 is a local enlarged view of a mode switching mechanism of the cutting tool as shown in FIG. 40.

FIGS. 40 and 48 show a cutting tool 800 provided by an example embodiment of the present invention.

The cutting tool 800 of the present embodiment is similar to the cutting tool 200 of the, the same parts are not repeated, and a difference between the cutting tool 800 of the present embodiment and the cutting tool 200 is described emphatically.

Figure 41:
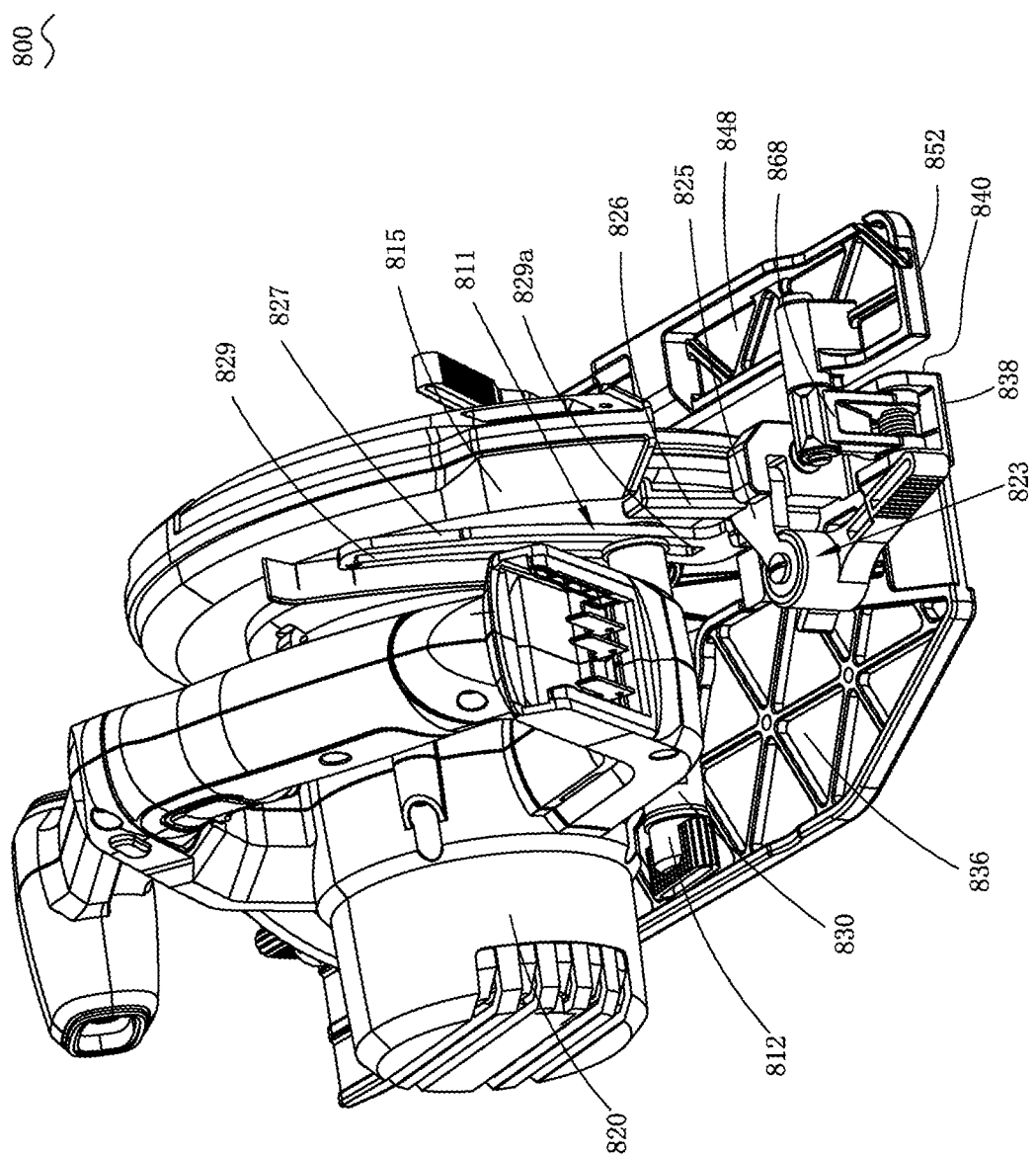
FIG. 41 is a space schematic diagram of the cutting tool as shown in FIG. 40, and at this point, the cutting tool is under a second mode.

Referring to FIGS. 40 and 41, in the present embodiment, the cutting tool 800 also comprises a mode switching mechanism 823. The mode switching mechanism 823 is mainly used for the switching between a first mode where first and second base plates 836 and 848 are relatively fixed, and a second mode where the first and second base plates 836 and 848 can relatively move. In the first mode, the mode switching mechanism 823 stops the relative moving between the first base plate 836 and the second base plate 848, i.e., when the cutting tool is in the first mode, the first base plate 836 and the second base plate 848 are relatively fixed, and a first bottom surface 838 and a second bottom surface 852 are kept flush, are not staggered and can be abutted against the workpiece together. In the second mode, the mode switching mechanism 823 allows the first base plate 836 and the second base plate 848 to relatively move, i.e., when the cutting tool is in the second mode of the cutting tool, the first base plate 836 and the second base plate 848 relatively move, such that the first bottom surface 838 and the second bottom surface 852 are staggered to expose the abutting surface, the abutting surface and the guide device work together so that the cutting tool can perform precise cutting together.

The mode switching mechanism 823 comprises a stopping member 825 movably connected to one of the first base plate 836 and the second base plate 848 and a stopping matching portion selectively matched with the stopping member 825. The stopping member 825 is matched with the stopping matching portion to prevent relative movement between the first base plate 836 and the second base plate 848; and if the stopping member 825 is dis-matched with the stopping matching member, then the first base plate 836 and the second base plate 848 are allowed to relatively move.

In the present embodiment, the stopping member 825 is rotatably connected on the first base plate 836 and has at least two positions, and in the first position, the stopping member 825 prevents relative movement between the first base plate 836 and the second base plate 848. That is to say, the cutting tool is in the first mode, relative positions of the first base plate 836 and the second base plate 848 are fixed, the first bottom surface 838 and the second bottom surface 852 are kept flush and are abutted against the workpiece together, and the cutting tool performs cutting of a traditional electric circular saw. In the second position, the stopping member 852 allows the first base plate 836 and the second base plate 848 to relatively move. At this point, the cutting tool is in the second mode, the first bottom surface 838 and the second bottom surface 852 can be staggered to expose the abutting surface, the exposed abutting surface and the guide device work together so that the cutting tool can perform precise cutting. Of course, as understood by those skilled in the art, the stopping member 852 can also be slidably connected on one of the first base plate and the second base plate, which can also realize the present embodiment.

Specifically, referring to FIG. 40, the stopping member 825 is rotatably connected on the first base plate 836 around an axis perpendicular to the first bottom surface 838. In the present embodiment, the stopping matching portion is part of the swing arm 868, the stopping member 825 is in contact with the swing arm 868 and is used for stopping the swing arm 868 from rotating relative to the first base plate 836 (also referring to FIG. 43). Of course, as understood by those skilled in the art, the stopping matching portion is not limited to part of the swing arm, and can also be part of the second base plate or the two pivots, or bulges disposed on these parts, etc., as long as the relative movement between the first and second base plates 836 and 848 is prevented, therefore, the first base plate 838 and the second bottom surface 852 are coplanar always. That is to say, when the stopping member 825 is in such position, the first bottom surface 838 and the second bottom surface 852 are always kept flush and cannot be mutually staggered.

Figure 44:
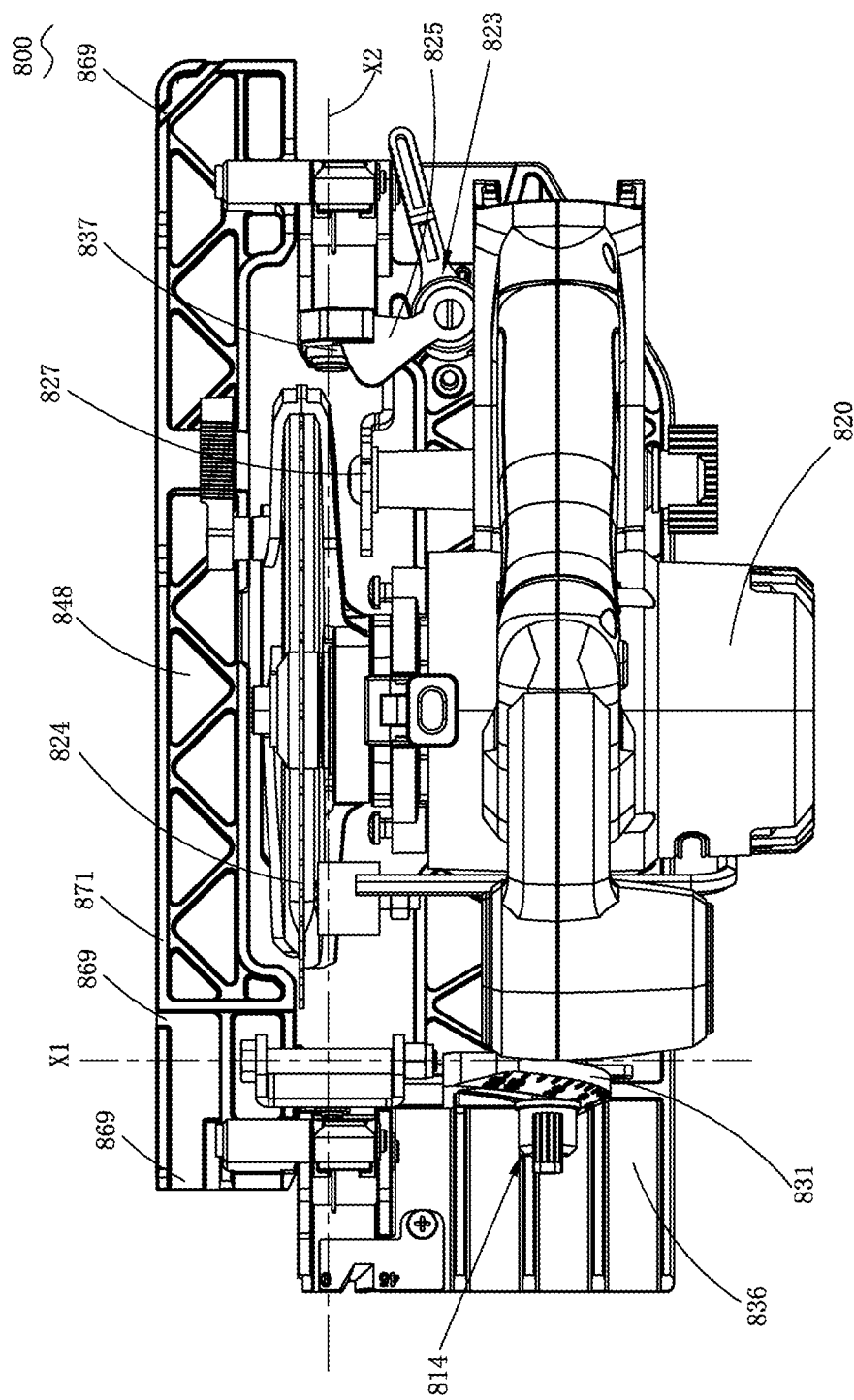
FIG. 44 is a top view of the cutting tool as shown in FIG. 40, and at this point, the cutting tool is under the second mode and with a hidden fixed cover.

When the stopping member 825 moves to the second position, as shown in FIGS. 41 and 44, the stopping member 825 and the swing arm 868 are staggered, the stopping for the swing arm 868 is removed, the swing arm 868 is allowed to rotate relative to the first base plate 836, therefore, the first bottom surface 836 and the second bottom surface 852 can be staggered and are non-coplanar. That is to say, in the second mode, the first base plate 836 and the second base plate 848 can generate relative movement, such that the first bottom surface 838 and the second bottom surface 852 can be mutually staggered to expose the abutting surface. In the present embodiment, the abutting surface is the first side surface 840 of the first base plate 836. In this way, the abutting surface 840 and the guide device can play a role of precise cutting together. The relation between the first abutting surface 840 and the saw blade 824 is same as the first abutting surface 240, and is not repeated here.

Figure 43:
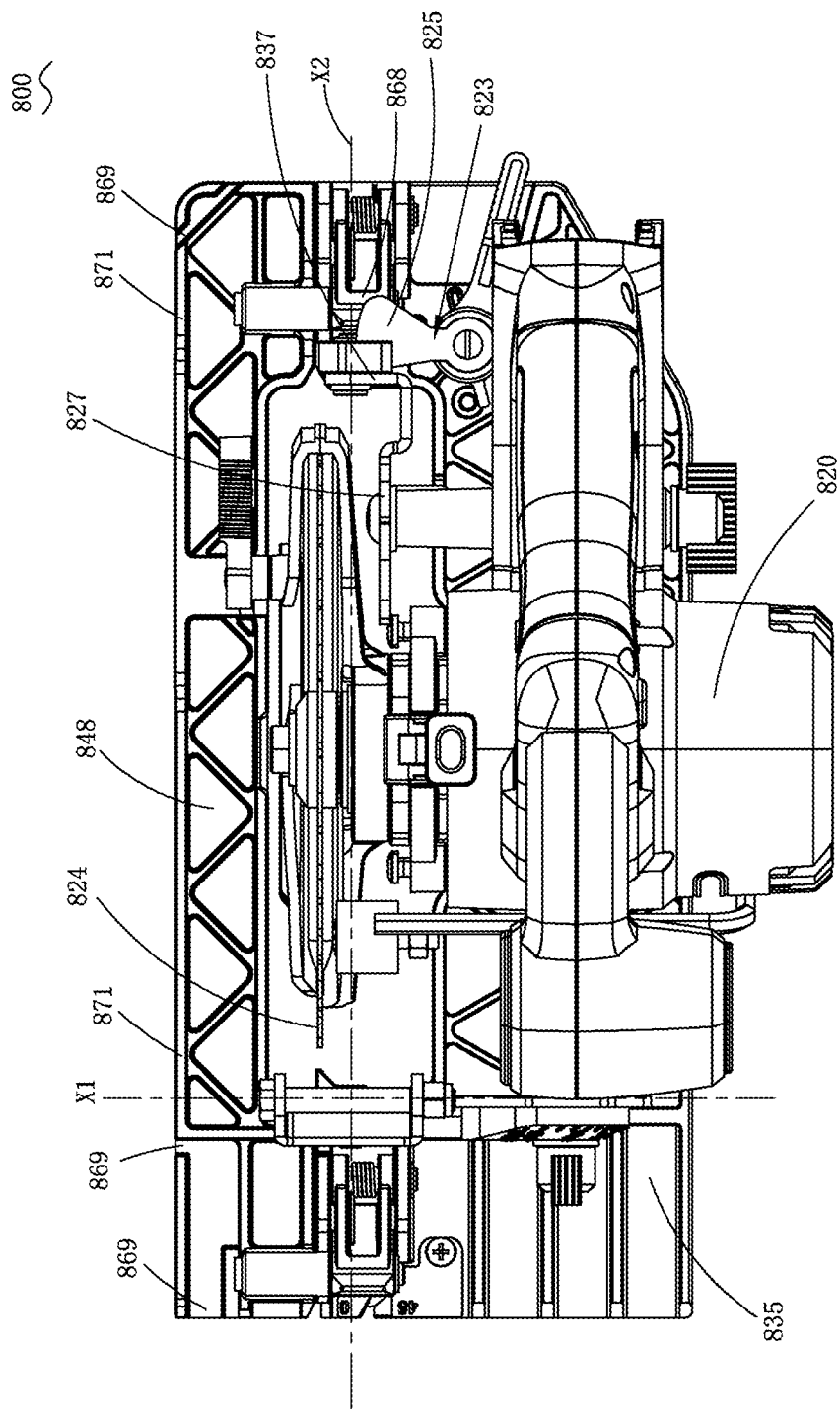
FIG. 43 is a top view of the cutting tool as shown in FIG. 40, and at this point, the cutting tool is under the first mode and with a hidden fixed cover.

The cutting tool 800 has a depth setting adjusting mechanism for changing a cutting depth. A distance that the saw blade 824 can extend out of the first bottom surface 838 is a cutting depth of the cutting tool 800, while a maximal distance that the saw blade 824 can extend out of the first bottom surface 838 is a maximal cutting depth of the cutting tool 800. The depth setting adjusting mechanism can enable the housing 820, the saw blade 824, and the fixed cover 815 to rotate around a pivot axis X1 perpendicular to the saw blade 824 relative to the base plate 836 (as shown in FIGS. 43 and 44), such that the distance that the saw blade extends out of the first bottom surface 838 can be changed. The depth setting locking mechanism 812 is mounted for locking.

Referring to FIGS. 40 and 41, the depth setting adjusting mechanism 811 comprises a depth setting support 827 connected on the first base plate 836 and a depth setting matching portion 830 disposed on the housing 820. The depth setting support 827 is provided with a depth setting chute 829. The depth setting chute 829 is an arc chute, and the circular center corresponding to an arc where the depth setting chute 829 is positioned is positioned on the pivot axis X1.

The depth setting locking mechanism 812 is used for locking relative positions of the depth setting matching portion 830 and the depth setting chute 829, thereby locking the position of the housing 820 relative to the first base plate 836, and also locking the distance that the saw blade 824 extends out of the first bottom surface 838, i.e., a cutting depth of the cutting tool 800. In the present embodiment, the depth setting locking mechanism 812 comprises a knob (provided with internal threads) and a bolt matched with the threads of the knob. The bolt passes through the depth setting chute 829 and the depth setting matching portion 830 to be matched with the knob. By operating the knob, the movement or fixing of the housing 820 relative to the first base plate 836 is realized.

In order to conveniently observe the cutting depth, the fixed cover 815 is provided with scale bars (not shown) for marking the cutting depths in a position close to the depth setting chute 829, and the depth setting matching portion 830 is provided with an indicating device (not shown). Once the knob is screwed up, the bolt slides in the depth setting chute 829, such that the housing 820, the fixed cover 815, the depth setting matching portion 830 and the saw blade 824 move relative to the first base plate 836 around the pivot axis X1 to change the cutting depth of the saw blade 824. At this point, a cutting depth of the cutting tool can be observed by the indicating device. Once the expected depth is reached, the knob can be screwed down to lock the saw blade 824 in an expected position for cutting. Of course, the depth setting locking mechanism 812 is not only limited to the bolt and nut, and can also be a locking mechanism such as a cam.

Further, referring to FIGS. 40 and 41, in the present embodiment, the mode switching mechanism 823 also comprises a depth limiting portion 826 disposed on the fixed cover 815. The depth limiting portion 826 is used under the second mode and is matched with the stopping member 825 to limit a maximal cutting depth of the cutting tool 800. That is to say, the maximal cutting depths allowed by the cutting tool 800 under the first and second modes are different.

Referring to FIG. 40, when the mode switching mechanism 823 is in the first mode, the depth limiting portion 826 and the stopping member 825 are not abutted against each other, and the maximal cutting depth of the cutting tool 800 is determined by a lowermost end 829a of the depth setting chute 829 (see FIG. 40). That is to say, under the first mode, when the cutting depth determined when the bolt is on the lowermost end of the depth setting chute 829 is a first maximal cutting depth, at this point, under such mode, the distance that the saw blade 824 extends out of the first bottom surface 838 is maximal. Referring to FIG. 41, when the mode switching mechanism 823 is in the second mode, the depth limiting portion 826 and the stopping member 825 are abutted against each other to limit the maximal cutting depth. Specifically, when the cutting depth is adjusted under the second mode, with downward movement of the depth setting matching portion 830 relative to the depth setting chute 829, the depth limiting portion 826 also downwards moves along with the fixed cover 815, when the depth limiting portion 826 moves to be abutted against the stopping member 825, the depth setting matching portion 830 cannot continue to move downwards relative to the depth setting chute 829, and at this point, the distance that the saw blade 824 extends out of the first bottom surface 838 is the maximal cutting depth of the cutting tool 800 under the second mode, i.e., a second maximal cutting depth. In the present embodiment, the second maximal cutting depth is smaller than the first maximal cutting depth. Of course, the depth limiting portion 826 is unnecessarily disposed on the fixed cover 815, and can be disposed on other parts of the cutting tool, for example on the housing 820 as long as being abutted against the stopping member 825 when the cutting depth is adjusted under the second mode, such that the distance that the saw blade 824 extends out of the first bottom surface 838 is prevented from being further increased to limit the maximal cutting depth under the second mode.

The role of disposing the depth limiting portion 826 is specifically described hereinafter. Firstly, it should be pointed out that the cutting depth of the saw blade 824 is determined by the distance that the saw blade 824 extends out of the first base plate 836, while the maximal distance that the saw blade 824 extends out of the first base plate 836 will be affected by a fastener fixing the saw blade 824 on an output shaft. While when the user cuts by using the second mode, the second base plate 848 will be abutted against the guide device to upwards float, the guide surface of the guide device is close to the saw blade 824, in this way, when under the second mode, the maximal cutting depth will also be affected by a thickness of the guide device, therefore, if the maximal cutting depth under the second mode is not limited, when the cutting is performed with the first maximal cutting depth, the guiding cannot be finished successfully since the fastener pressing the saw blade 824 will interfere with the guide device. Another manner for avoiding such condition is to directly reduce the maximal cutting depth under the first mode, the guide action of the tool will not be affected when the cutting is performed with the first maximal cutting depth under the second mode, but due to such arrangement, the actual maximal cutting depth that can be achieved under the first mode is not fully used. Therefore, the depth limiting portion 826 is disposed such that the guide function during the maximal cutting depth under the second mode is not affected while the actual maximal cutting depth under the first node can be fully used.

Further, in the present embodiment, the scale bars of the cutting tool 800 disposed on the fixed cover 815 can display the first maximal cutting depth and the second maximal cutting depth. Specifically, in the present embodiment, the depth scale bars differentiate the first maximal cutting depth and the second maximal cutting depth by different colors. Of course, the first maximal cutting depth and the second maximal cutting depth can be differentiated in a manner of adopting different scale lines or directly using characters. Due to such arrangement, the user can be reminded of the maximal cutting depth that the cutting tool 800 can reach under the second mode, and repeated debugging caused by a fact that the user considers that the first maximal cutting depth can be achieved too under the second mode by mistake is avoided.

Figure 42:
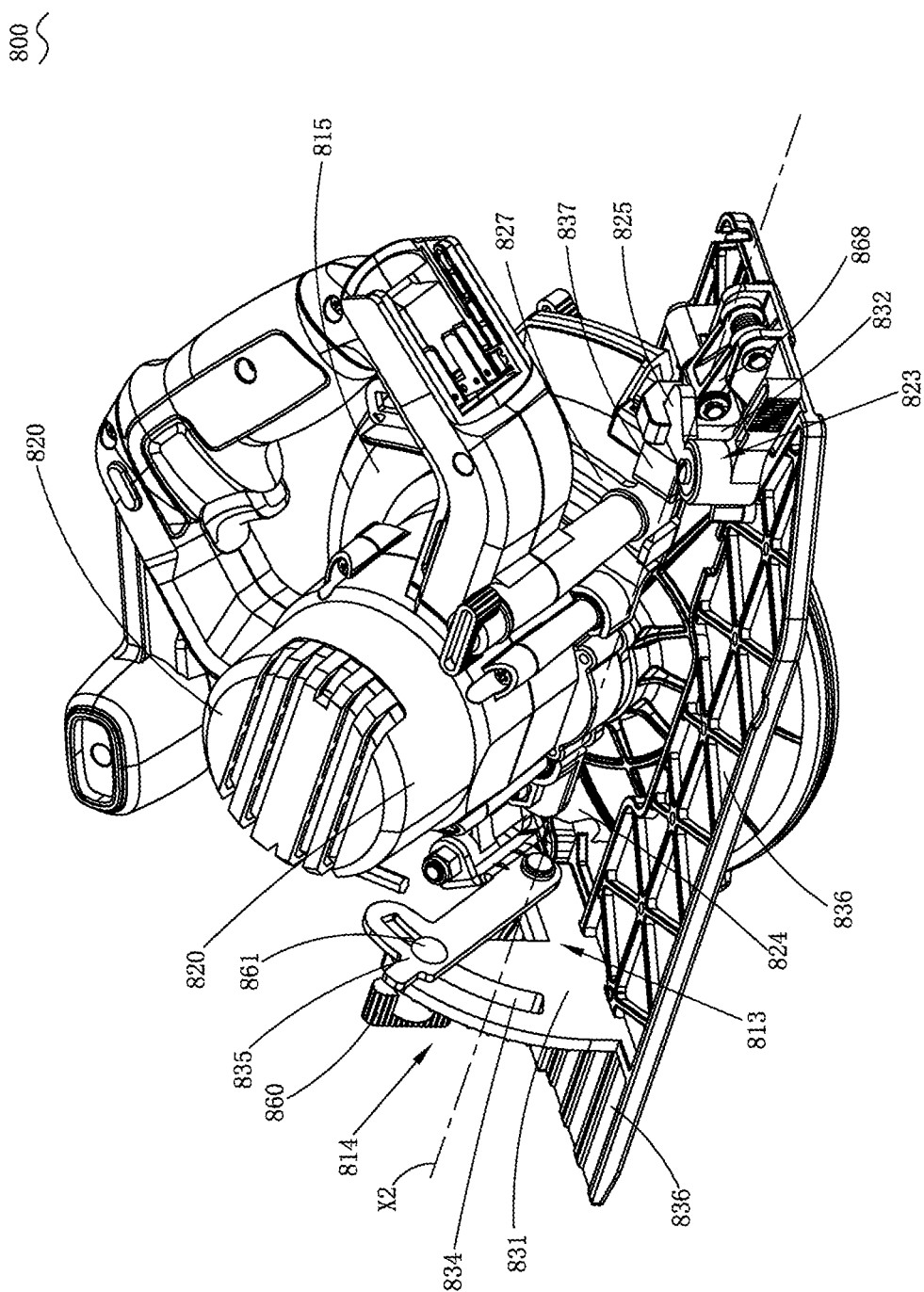
FIG. 42 is a space schematic diagram of the cutting tool as shown in FIG. 40, and at this point, the cutting tool is under a beveling state.

Referring to FIG. 42, the cutting tool 800 is further provided with a beveling adjusting structure 813 for changing a cutting angle. The beveling adjusting structure can enable the housing 820, the fixed cover 815 and the saw blade 824 to pivot around a beveling axis X2 together, thereby changing an inclined angle of the saw blade 824 relative to the first bottom surface 838 for bevel angle cutting. The beveling axis X2 is parallel to the first bottom surface 838 of the first base plate 836. The cutting tool 800 is also provided with a beveling locking mechanism 814 for locking a relative position of the housing 820 relative to the first base plate 836. The inclined angle of the saw blade 824 relative to the first bottom surface 838 is also locked.

Specifically, the beveling adjusting mechanism 813 comprises a beveling front support 831 and a beveling back support 832 which are fixedly disposed on the first base plate 836. The fixed cover 815 is rotatably connected on the beveling front support 831 and the beveling back support 832 around the beveling axis X2, wherein the beveling front and back supports 831 and 832 can be integrally formed with the first base plate 836.

The beveling front support 831 is provided with a beveling guide groove 834, which is an arc guide groove, and a circular center of an arc where the beveling guide groove 834 is positioned is positioned on the beveling axis X2.

The beveling adjusting mechanism 813 also comprises a beveling matching portion 835, and the fixed cover 815 is rotatably connected to the beveling matching portion 835 around the pivot axis X1. The beveling matching portion 835 is further provided with an arc groove, which is matched with the beveling guide groove 834 for use and can reduce a length of the beveling guide groove 834.

The front end of the fixed cover 815 is also rotatably connected to the beveling front support 831 around the beveling axis X2 by the beveling matching portion 835 (referring to FIG. 43). The back end of the fixed cover 815 is also rotatably connected to the beveling back support 832 around the beveling axis X2 by the depth setting support 827.

Figure 45:
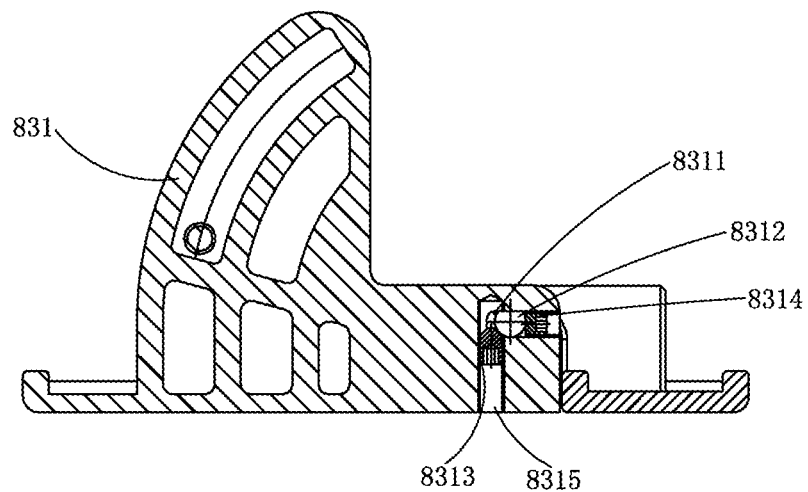
FIG. 45 is a local section view of the cutting tool as shown in FIG. 40.

Specifically, referring to FIG. 45, the beveling front support 831 is provided with a positioning hole 8311, a positioning pin 8312 enables the beveling matching portion 835 to be rotatably connected on the beveling front support 831 around the beveling axis X2 by the positioning hole 8311 and a hole in the beveling matching portion 835. Similarly, the beveling back support 832 is provided with a positioning hole, the positioning pin enables the depth setting support 827 to be rotatably connected on the beveling back support 832 around the beveling axis X2 by the positioning hole and a hole in the depth setting support 827, in this way, the fixed cover 815 can rotate around the beveling axis X2 relative to the first base plate 836, thereby changing an inclined angle of the saw blade 824 relative to the first bottom surface 838, and further performing bevel angle cutting.

In order ensure a parallelism of the saw blade 824, and enable the outer side surface of the saw blade 824 to be basically flush with the abutting surface 840, the positioning hole of the beveling front support 831 is configured to be a waist-shaped hole, the positioning pin 8312 can move in the waist-shaped hole 8311, and a locking structure for locking the positioning pin 8312 is also disposed. An extending direction of the waist-shaped hole 8311 is perpendicular to the beveling axis X2, such that not only is the parallelism of the saw blade 824 ensured, but also the position of the saw blade 824 relative to the abutting surface 840 can be adjusted. The positioning hole in the beveling back support 832 may be also a waist-shaped hole, in this way, the front and back can be both adjusted, and further the parallelism of the saw blade 824 is ensured.

The locking structure comprises a positioning screw 8313 and a fastening screw 8314, after mounted, the extending directions of the positioning screw 8313 and the fastening screw 8314 are perpendicularly disposed. The positioning screw 8313 is provided with a conical surface in contact with the positioning pin 8312, and positions the positioning pin 8312 by the first base plate 836 and a threaded hole 8315 in the beveling front support 831. The fastening screw 8314 is in contact with the positioning pin 8312 by a plane, one end of the waist-shaped hole 8311 is provided with threads, and the fastening screw 8314 and the threads in the waist-shaped hole 8314 are matched to lock the positioning pin 8312.

The positioning pin 8312 may be at least provided with a positioning surface in contact with the inner surface of the waist-shaped hole 8311, such that it is convenient for the positioning pin 8312 to slide in the waist-shaped hole 8311 and the locking structure to lock the positioning pin 8312.

Figure 46:
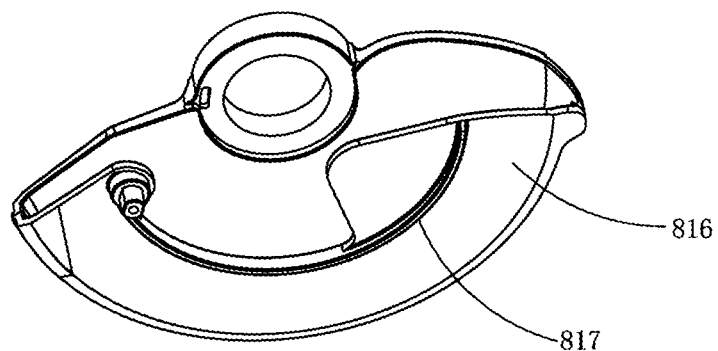
FIG. 46 is a space schematic diagram of a movable cover of the cutting tool as shown in FIG. 40.
Figure 47:
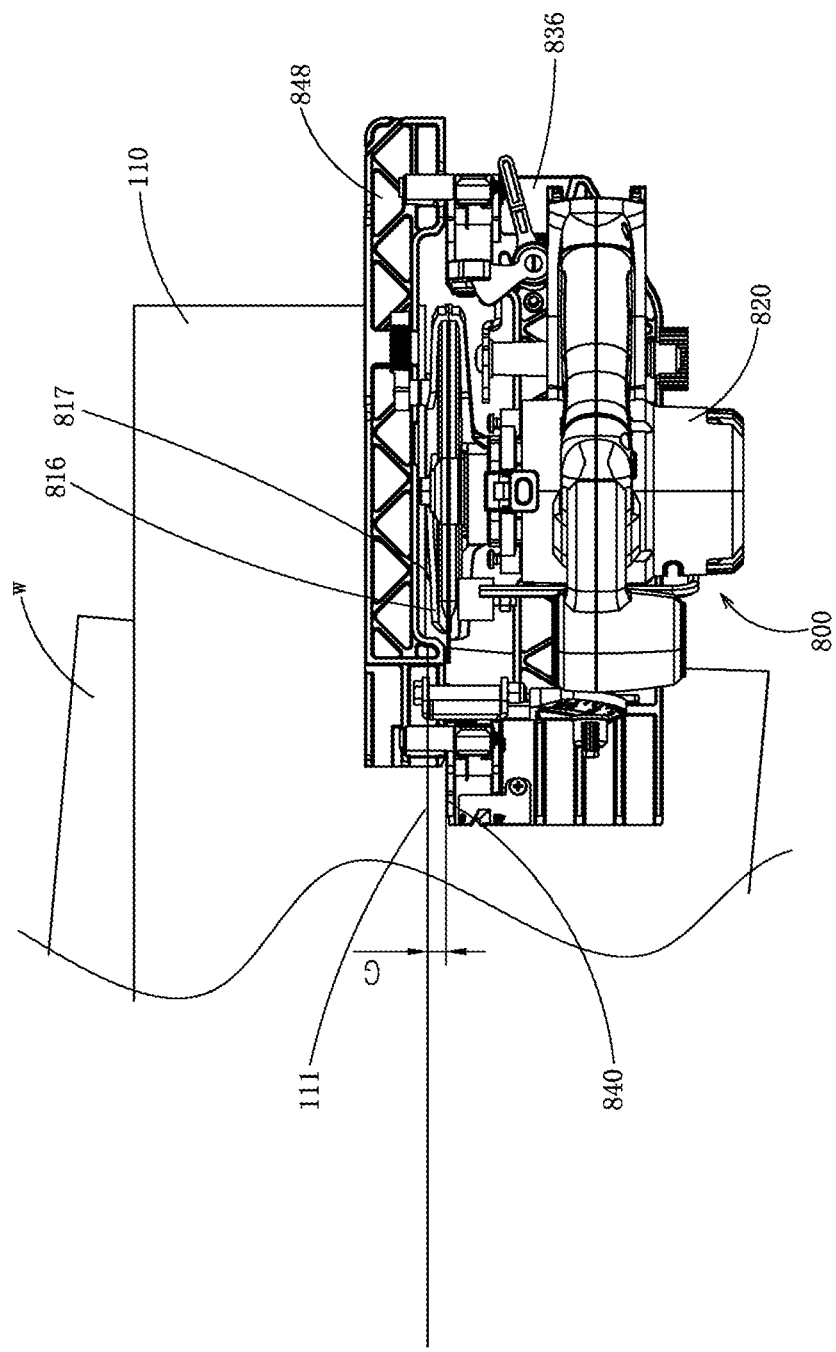
FIG. 47 is a schematic diagram when the cutting tool as shown in FIG. 40 cuts a workpiece.

In order to smoothly cut, before the motor is started, generally the movable cover 816 is opened at first, in order to prevent the operator from not opening the movable cover 816 in advance, the cutting tool is also provided with a warning device. Specifically, referring to FIGS. 46 and 47, the warning device comprises a flange 817 disposed on the movable cover 816. The flange 817 is disposed on one side of the movable cover 816 away from the housing 820, that is, one side facing the second base plate 848. If the movable cover is not opened, during operation, the flange 817 is abutted against the guide surface 111 of the guide device 110, while the first abutting surface 840 cannot be abutted against the guide surface 110, and a certain distance G exists between the first abutting surface 840 and the guide surface 111. In this way, the operator is reminded that the movable cover 816 is not opened.

Referring to FIG. 42, the beveling locking mechanism 814 is used for locking a position of the housing 820 relative to the first base plate 836. The beveling locking mechanism 814 comprises a knob 860, (provided with internal threads) and a bolt 861 matched with the threads of the knob 860. The bolt 861 passes through the arc groove in the beveling matching portion 835 and the beveling guide groove 834 to be matched with the knob 860. By operating the knob 860, the movement or fixing of the fixed cover 815 relative to the first base plate 836 is realized.

In order to conveniently observe the cutting angle, the beveling front support 831 is provided with scales marking the cutting angle in a position close to the beveling guide groove 834, and an indicating device is disposed on the beveling matching portion 835. Once the knob 860 is screwed up, the bolt 861 slides in the beveling guide groove 834 and the arc groove, such that the housing 820, the fixed cover 815, the beveling matching portion 835 and the saw blade 824 move around the beveling axis X2 relative to the first base plate 836 to change the cutting angle of the saw blade 824. At this point, the cutting angle of the cutting tool 800 can be observed by the indicating device disposed on the beveling matching portion 835. Once the expected position is reached, the knob 860 can be screwed down to lock the saw blade 824 in an expected position for cutting.

Continuously referring to FIGS. 41 to 43, the mode switching mechanism 823 further comprises a beveling limiting portion 837. The beveling limiting portion 837 is used for being matched with the stopping member 825 under the second mode to limit the cutting tool 800 to perform bevel angle cutting. That is to say, the bevel angle cutting is not suggested for the cutting tool 800 under the second mode.

In the present embodiment, the beveling limiting portion 837 is part of the depth setting support 827, or part of the depth setting support 827 forms the beveling limiting portion. Referring to FIGS. 42 and 43, when the mode switching mechanism 823 is in the first mode, the beveling limiting portion 837 will not be abutted against the stopping member 825. When the angle of the saw blade needs to be adjusted, the stopping member 825 will not stop parts capable of rotating relative to the base plate in the adjusting process. Therefore under the first mode, the cutting tool 800 can adjust a beveling angle, that is to say, an inclined angle between the saw blade 824 and the first bottom surface 838 can be adjusted. Referring to FIG. 44, when the mode switching mechanism 823 is in the second mode, the stopping member 825 is abutted against the beveling limiting portion 837, such that the saw blade 824, the fixed cover 815, the housing 820 and the depth setting support 827 of the cutting tool 800 cannot rotate around the pivot axis X2 relative to the first base plate 836. In the present embodiment, the stopping member 825 stops the saw blade from being inclined relative to the first bottom surface by stopping the depth setting support 827, of course, the saw blade 824 can also be stopped from being inclined relative to the first bottom surface 838 by stopping other parts which need to rotate around the pivot axis X2 relative to the first base plate 836 when adjusted to beveling, for example, stopping the housing 820, the fixed cover 815, etc. That is to say, the beveling limiting portion 837 is unnecessarily disposed on the depth setting support 827, and can also be disposed on other parts such as the housing 820 and the fixed cover 815, which rotate around the pivot axis X2 relative to the first base plate 836. When the cutting tool 800 is in the second mode, if the beveling is allowed, the saw blade 824 will cut the guide device, and the second base plate 848 will also interfere with the fixed cover 815 in a floating process, therefore, when in the second mode, the beveling is limited. Or in other words, during beveling, a guide function of the base plate is unavailable. Therefore, in order to prevent misoperation of the user, the beveling may be limited in the second mode.

In the present embodiment, by matching and dis-matching different parts on the stopping member 825 with the stopping matching portion (swing arm 868), the depth limiting portion and the beveling limiting portion, mode switching, depth limiting and beveling limiting can be realized. As understood by those skilled in the art, the corresponding parts matched with the stopping matching portion (the swing arm 868), the depth limiting portion and the beveling limiting portion can also be set into single parts to realize an inventive concept of the present embodiment.

Referring to FIG. 44, the mode switching mechanism 823 comprises a switching handle 839 rotatably connected to the first base plate 836. The switching handle 839 can move between a first position and a second position relative to the first base plate 836. The switching handle 839 in the FIG. 48 is partially sectioned to show a connecting manner between the switching handle 839 and the first base plate 836. In the present embodiment, the switching handle 839 and the stopping member 825 are fixedly connected. Of course in other embodiments, the switching handle 839 and the stopping member 825 can also be integrally disposed. In the present embodiment, the first base plate 836 is provided with a convex shaft 849, the switching handle 839 is rotatably connected to the convex shaft 849, and the switching handle 839 is connected to the convex shaft 849 by a fastening screw along a direction of a rotary axis of the switching handle 839.

A positioning mechanism is disposed between the switching handle 839 and the first base plate 836, and it is convenient for quickly positioning the switching handle in a corresponding position. In the present embodiment, the positioning mechanism comprises a positioning dent 841 disposed in the first base plate 836, a positioning member 843 disposed on the switching handle 839 and a positioning spring 845, by matching the positioning member 843 with the positioning dent 841, the switching handle 839 is positioned in a specific position relative to the first base plate 836. In the present embodiment, two positioning dents 841 are disposed and respectively correspond to the first and second positions of the switching handle 839. As shown in FIG. 40, at this point, the switching handle 839 is in the first position, the stopping member 825 is abutted against the swing arm 868, and the cutting tool 800 is in the first mode; as shown in FIG. 41, as understood by those skilled in the art, if the switching handle 839 is moved to the second position, the switching handle 839 drives the stopping member 825 to rotate to remove abutting connection with the swing arm 868, the first base plate 836 and the second base plate 848 can relatively move, the cutting tool 800 is in the second mode, and at this point, the stopping member 825 is abutted against the beveling limiting portion 837, and the cutting stool 800 is limited for bevel angle cutting.

When the switching handle 839 is positioned in the first position or the second position, the positioning member 843 enters the positioning dent 841 under the action of the positioning spring 845, such that the switching handle 839 is located in a corresponding position, while when the position of the switching handle 839 needs to be changed, only an extra force needs to be provided to overcome a spring force of the positioning spring 845, then the switching handle 839 can be switched. Due to such arrangement, accident mode switching caused by a fact that the position of the mode switching handle is accidentally changed by shaking of the cutting tool 800 in a use process of the user can be prevented.

Further, a protective member 853 is fixedly disposed on the first base plate 836. Continuously referring to FIG. 48, the protective member 853 and the beveling back support 832 are fixedly connected or integrally disposed. In the present embodiment, the protective member 853 and the beveling back support 832 are integrally disposed, and a through hole 854 for the stopping member 825 to pass through is disposed between the protective member 853 and the beveling back support 832. The stopping member 825 has a first surface for being abutted against the swing arm 868 and a second surface deviated from the first surface. In a rotation process of the stopping member 825, at least part of the stopping member 825 may be located in the through hole 854, and the protective member 853 faces the second surface of the stopping member 825, and is used for protecting the stopping member 825.

When the mode switching mechanism 823 is in the first mode, the stopping member 825 and the swing arm 868 are abutted against each other, so as to prevent the swing arm 868 from rotating relative to the first base plate 836, such that the relative positions of the first base plate 836 and the second base plate 848 are fixed without relative movement. If the cutting tool 800 falls under such mode, if the second base plate 848 falls onto the ground at first, a trend of moving to the first base plate 836 will be generated, and an instantaneous impact force during falling will be transmitted to the swing arm 868 by the second base plate 848, such that the swing arm 868 generates a trend of moving relative to the first base plate 836, the impact force is further transmitted to the stopping member 825 abutted against the swing arm 868, since the second surface of the stopping member 825 faces the protective member 853, the instantaneous impact force during falling will possibly cause the second surface of the stopping member 825 to be abutted against the protective member 853, and such impact force will be further transmitted to the protective member 853, thereby preventing the stopping member 825 from being damaged by the impact force during falling.

Further, the first base plate 836 is further provided with a limiting member 851. The limiting member 851 may be used for being abutted against the switching handle 839 rotating to the first position, such that accidental mode switching caused by a fact that the switching handle 839 is deviated from the first position along a direction away from the second position due to accidental touch can be prevented. The limiting member 851 may be detachably connected to the first base plate 836.

Referring to FIGS. 42 to 44, the second base plate 848 can be made of metal material or plastic material. In the present embodiment, the second base plate 848 is made of the metal material. Since the metal material is easily deformed when subjected to a stronger external force action, especially a larger impact force, therefore, the edge of the second base plate 848 may be provided with a weak portion 869. In the present embodiment, the weak portion 869 is a disconnected part of a reinforcing rib 871 of the second base plate 848. If the reinforcing rib 871 is continuous, then the integral strength of the second base plate 848 is improved, while if the reinforcing rib is disconnected in the edge position of the second base plate 848, then the strength of the edge position of the second base plate 848 is weaker than that of other parts of the second base plate 848. Due to such arrangement, the deformation of the second base plate 848 caused by the strong impact force after accidental falling of the second base plate 848 can be concentrated in the edge position of the second base plate 848, thereby avoiding relative blockage between the second base plate 848 and the first base plate 868 caused by the integral deformation of the second base plate 848. That is to say, by disposing the weak portion 869, the strength of the part on the second base plate 848 connected to the first base plate 836 is larger than that of other parts on the second base plate 848, and may be larger than that of the edge position of the second base plate 848. Of course, the weak portion 869 can also be a part made of material of lower strength, and is assembled with the main part of the second base plate 848 to form the second base plate 848.

The mode switching mechanism in the present embodiment is also suitable for other embodiments having two base plates. Of course, as understood by those skilled in the art, the mode switching mechanism can be adjusted due to the arrangement of the two base plates.

Figure 49:
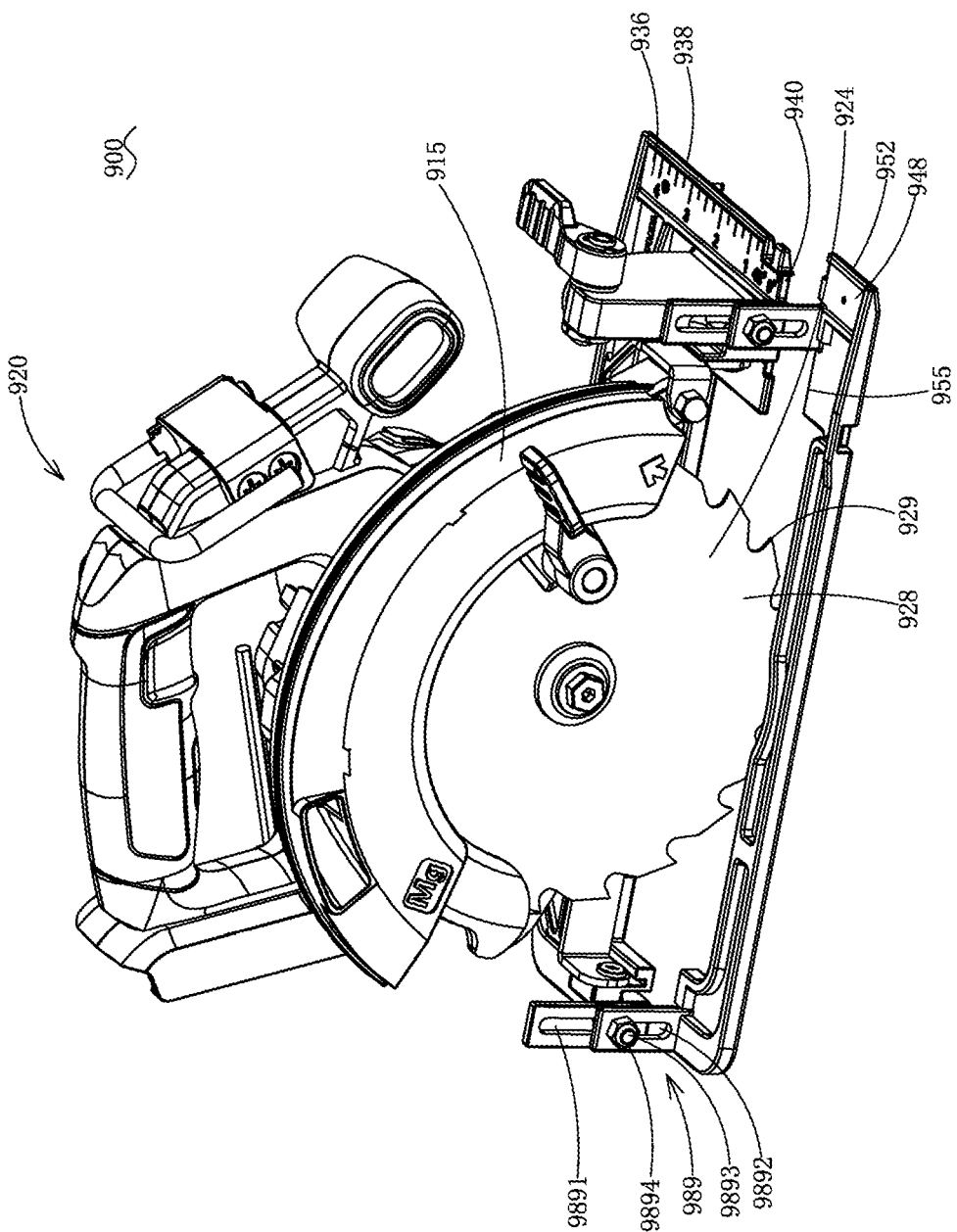
FIG. 49 is a space schematic diagram of a cutting tool provided by an example embodiment of the present invention.
Figure 50:
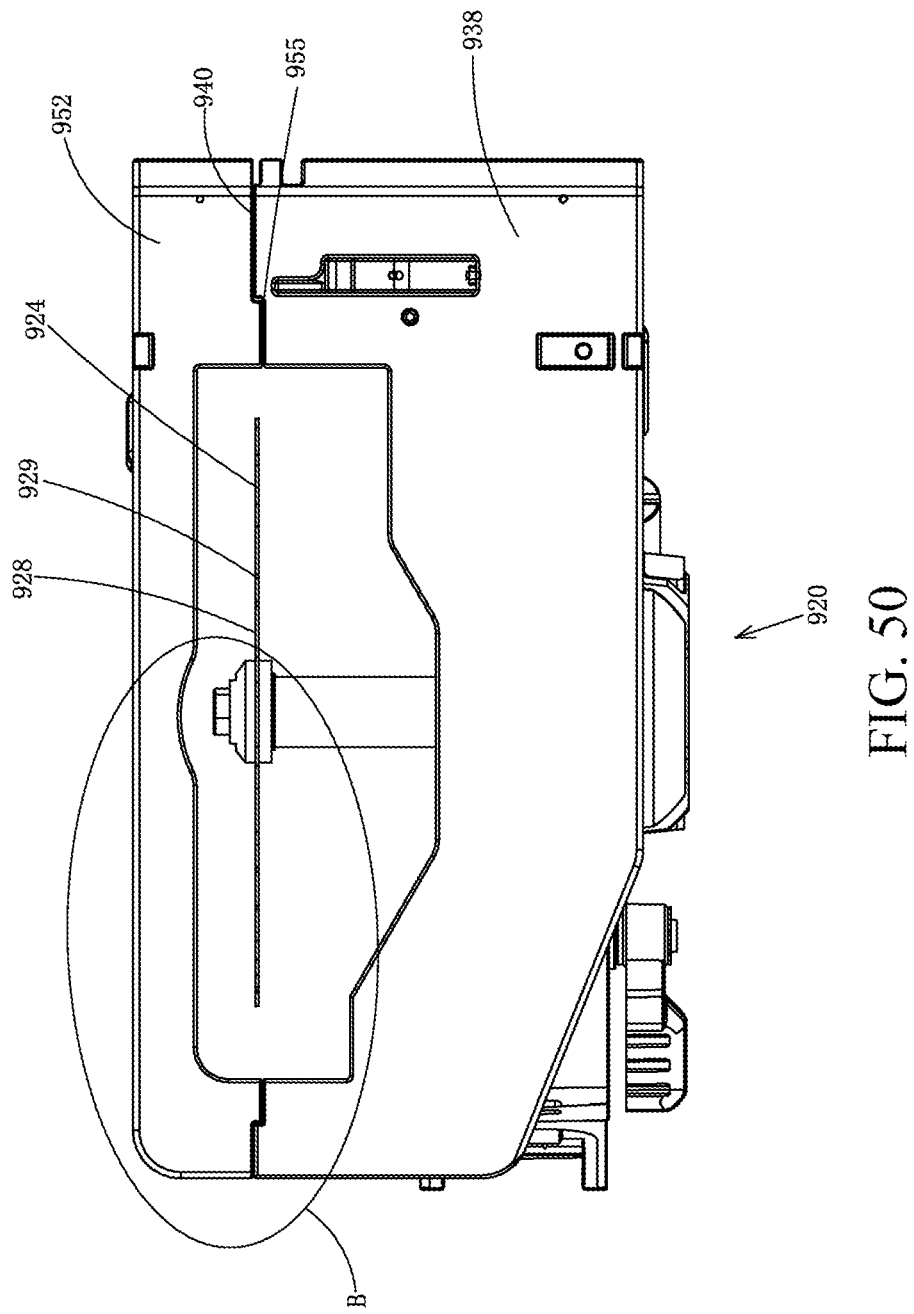
FIG. 50 is a bottom view of the cutting tool as shown in FIG. 49.
Figure 51:
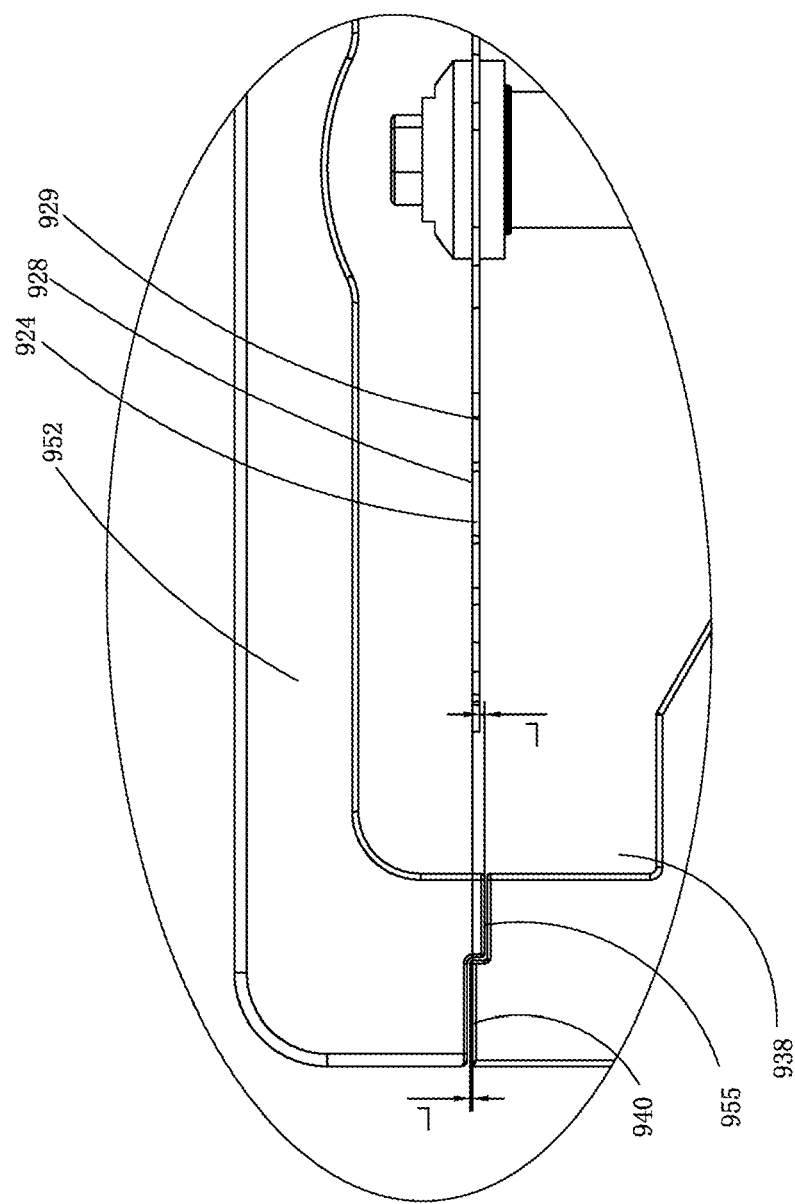
FIG. 51 is an enlarged view of a B part of FIG. 50.

FIGS. 49 to 51 show a cutting tool 900 provided by an example embodiment of the present invention.

In the above embodiments having two base plates, usually the base plate connected to the housing is called as the first base plate, and the base plate capable of moving relative to the first base plate is called as the second base plate, this is only for description rather than particular indication. In the present embodiment, the base plate connected to the housing is still called as the first base plate. In the above embodiment, the first base plate or the second base plate is provided with the abutting surface, that is to say, in the above embodiment, if the abutting surface needs to be exposed, the movement of the second base plate relative to the first base plate is in one direction. While in the present embodiment, the first base plate and the second base plate are both provided with an abutting surface, if the abutting surfaces need to be exposed, the second base plate can move in two directions relative to the first base plate, that is, the second base plate moves upwards or downwards relative to the first base plate.

Referring to FIG. 49, the first base plate 936 has a first bottom surface 938, and is further provided with a first abutting surface 940 coplanar with a first lateral cutting plane 928. Here, the first abutting surface 940, same as the above embodiment, can be disposed on the end surface of one side of the first base plate 936 away from the housing 920 or the transmission mechanism 923, and can also be movably disposed on the first base plate 936 by an abutting portion. In the present embodiment, the first abutting surface 940 is formed by the end surface on the outermost side of the first base plate 936.

The second base plate 948 has a second bottom surface 952, and is further provided with a second abutting surface 955 coplanar with a second lateral cutting plane 929. Here, the second abutting surface 955, same as the first abutting surface 940, can be disposed on the end surface of one side of the second base plate 948 close to the housing 920 or the transmission mechanism 923, and can also be movably disposed on the second base plate 948 by an abutting portion. In the present embodiment, the second abutting surface 955 is formed by the end surface on the innermost side of the second base plate 948. Here, an inner side close to the housing 920 or the transmission mechanism 923 is defined, and an outer side away from the housing 920 or the transmission mechanism 923 is defined.

Of course, the coplanarity between the first lateral cutting plane 928 of the saw blade 924 and the first abutting surface 940 is not only limited to the coplanarity in absolute meaning, and those skilled in the art can conceive of the condition of no absolute coplanarity since the first lateral cutting plane 928 and the first abutting surface 40 are in parallel and the first lateral cutting plane 928 is closer to the transmission mechanism 923 by a distance relative to the abutting surface 940. Or in order to avoid a damage to the guide device 110 during cutting of the saw blade 924, a certain clearance is reserved between the first lateral cutting plane 928 and the guide surface 111, that is, the first lateral cutting plane 928 and the first abutting surface 940 are in parallel and a certain distance L exists between the first lateral cutting plane 928 and the first abutting surface 940, referring to FIGS. 50 and 51, and the conditions in such distance range all belong to the coplanar range of the present embodiment.

On the bottom surface 938, the first lateral cutting plane 928 of the saw blade 924 may be positioned between the housing 920 and the first abutting surface 940, and the distance L between the first lateral cutting plane 928 of the saw blade 924 and the first abutting surface 940 is smaller than or equal to 3 mm. The L between the first lateral cutting plane 928 of the saw blade 924 and the first abutting surface 940 may be between 0.5 mm and 0.8 mm. In this way, cutting precision can be ensured sufficiently, and meanwhile, the guide surface 111 is prevented from being damaged due to jittering of the saw blade 924.

Same as the first abutting surface 940, the coplanarity between the second abutting surface 955 and the second lateral cutting plane 929 of the saw blade 924 is not only limited to the coplanarity in absolute meaning. The second lateral cutting plane 929 and the second abutting surface 955 are in parallel and a certain distance L exists between the second lateral cutting plane 929 and the second abutting surface 955, and the conditions in such distance range all belong to the coplanar range of the present embodiment.

On the bottom surface 952, the second abutting surface 955 may be positioned between the housing 920 and the second lateral cutting plane 929, and the distance L between the second lateral cutting plane 929 of the saw blade 924 and the second abutting surface 955 is smaller than or equal to 3 mm. The L between the second lateral cutting plane 929 of the saw blade 924 and the second abutting surface 955 may be between 0.5 mm and 0.8 mm. Therefore, cutting precision can be ensured sufficiently, and meanwhile, the guide surface 111 is prevented from being damaged due to jittering of the saw blade 924.

The distance between the first abutting surface 940 and the second abutting surface 955 may be larger than the thickness of the saw blade 924.

Continuing to refer to FIG. 49, in the present embodiment, the second base plate 948 is movably connected to the first base plate 936 along a direction perpendicular to the first bottom surface 938. Of course, the moving direction of the second base plate 948 relative to the first base plate 936 is not limited to be perpendicular to the first bottom surface 938, and the moving direction thereof can also be inclined. The movable connection between the second base plate 948 and the first base plate 936 is not limited to moving, and can be rotation, translation, etc. As understood by those skilled in the art, the second base plate 948 moves relative to the first base plate 936, and only the first abutting surface 940 or the second abutting surface 955 needs to be exposed to be abutted against the guide surface 111 of the guide device 110.

A sliding matching-connecting mechanism 989 is disposed between the first base plate 936 and the second base plate 948, and the switching of the second base plate 948 and the first base plate 936 between the first matching state and the second matching state is realized.

The sliding matching-connecting mechanism 989 comprises a first chute 9891 disposed in the first base plate 936, a second chute 9892 disposed in the second base plate 948, a sliding fixing member 9893 capable of sliding in the first and second chutes 9891 and 9892, and a locking mechanism for locking the sliding fixing member 9893.

Specifically, one end of the sliding fixing member 9893 is provided with an end cover (not shown); the other end is provided with threads, and one end of the sliding fixing member 9893 with the threads passes through the first and second chutes 9891 and 9892 to be matched with the locking mechanism. The locking mechanism comprises an operable nut 9894, in this way, the moving or fixing of the second base plate 948 relative to the first base plate 936 can be realized by operating the nut 9894.

The extending directions of the first chute 9891 and the second chute 9892 are perpendicular to the first bottom surface 938, and the sliding fixing member 9893 can slide in the first chute 9891 or the second chute 9892. If the operator selects the first abutting surface 940 to be matched with the guide surface 111, when in specific operation, the nut 9894 is screwed up firstly, the second base plate 948 is abutted against the upper surface of the guide device 110, that is, the second bottom surface 952 is in contact with the upper surface of the guide device 110, the cutting tool 900 is pressed down, the first base plate 936 moves downwards relative to the second base plate 948, and the sliding fixing member 9893 can move in the first chute 9891 or the second chute 9892 till the first bottom surface 938 is abutted against the workpiece surface; the first base plate 936 and the second base plate 948 relatively move to expose the first abutting surface 940 which is matched with the guide surface 111 so as to realize precise cutting. If the operator selects the second abutting surface 955 to be matched with the guide surface 111, when in specific operation, the operator screws up the nut 9894 firstly, the first base plate 936 is abutted against the upper surface of the guide device 110, that is, the first bottom surface 938 is in contact with the upper surface of the guide device, the second base plate 948 moves downwards, and the sliding fixing member 9893 can move in the first chute 9891 or the second chute 9892 to expose the second abutting surface 955 which is matched with the guide surface 111, and precise cutting can be realized similarly.

Of course, as understood by those skilled in the art, the sliding matching-connecting mechanism is not limited to the matching between the chutes and the sliding fixing member, and can also be a slide rail and a sliding matching-connecting member, etc., the locking mechanism is not limited to the threaded locking mechanism, and can be other locking structures such as a cam locking structure, which is not specifically repeated.

In the above embodiment, there are many connection relations between the first base plate and the second base plate, for example, rotation, translation and the like of the second base plate. Thus it can be seen that the inventive concept of the present embodiment can be realized as long as the first base plate and the second base plate are movably connected.

It can be seen that the first base plate and the second base plate can be both provided with an abutting surface coplanar with the saw blade plane, that is, the abutting surfaces matched with the guide surface of the guide device. The abutting surfaces are disposed on the opposite side surfaces of the first base plate and the second base plate. When the first abutting surface of the first base plate is matched with the guide device, a distance between the first base plate and the motor is larger than the distance between the second base plate and the motor, that is, the first bottom surface is under the second bottom surface; and the second bottom surface of the second base plate is supported by the guide device. When the second abutting surface of the second base plate is matched with the guide device, a distance between the first base plate and the motor is smaller than the distance between the second base plate and the motor, that is, the first bottom surface is above the second bottom surface; and the first bottom surface of the first base plate is supported by the guide device.

In the present embodiment, at least one of two opposite side surfaces of the first base plate and the second base plate is matched with the guide surface of the guide device. At least one of two opposite side surfaces of the first base plate and the second base plate may be flush with the saw blade plane. A distance between one of the two opposite side surfaces of the first base plate and the second base plate and the saw blade plane may be smaller than or equal to 3 mm. The distance between the saw blade plane and the abutting surface may be between 0.5 mm-0.8 mm.

One of two opposite side surfaces of the first base plate and the second base plate is abutted against the guide surface of the guide device, while the distance between the saw blade plane or the lateral cutting plane and one of two opposite side surfaces of the first base plate and the second base plate is smaller than or equal to 3 mm, therefore, the saw blade is very close to the guide surface of the guide device, a cutting track of the saw blade is a track of the cutting line aligned with the guide surface of the guide device on the workpiece, the operator can conveniently and quickly finish cutting without a need to perform extra measuring before cutting and without a need to reserve a space originally occupied by the base plate between the guide surface and the cutting line. The cutting tool is more convenient to use. The cutting is convenient, and then the cutting efficiency is higher. Besides, the cutting tool of the present embodiment is simple in structure, and the cost is lower.

Those skilled in the art can conceive that the present invention can have other implementing manners as long as the adopted technical essence is same as or similar to the present invention, or any changes or substitutions made based on the present invention fall within a protective scope of the present invention.

What is claimed is:

1. A cutting tool, used for cutting with a guide device being provided with a guide surface, the cutting tool comprising:
   a housing;
   a motor, accommodated in the housing;
   a transmission mechanism being configured to be connected to the motor and used for driving a saw blade, wherein the saw blade is provided with a saw blade plane;
   base plates connected to the housing, wherein the base plates comprise a first base plate provided with a first bottom surface and a second base plate provided with a second bottom surface;
   a connecting mechanism disposed between the first base late and the second base plate; and
   a mode switching mechanism comprising s topping member movable connected to one of the first base plate and the second base plate and a stopping matching portion selectively matched with the stopping member;
   wherein at least one of the first base plate and the second base plate is provided with an abutting surface coplanar with the saw blade plane for being matched with the guide surface, and the first base plate and the second base plate are relatively movable to expose the abutting surface; and
   wherein the first baseplate is provided with a saw blade groove for the saw blade to pass through; and
   wherein the connecting mechanism is disposed between the first base plate and the second base plate, such that the first bottom surface has a first position coplanar with the second bottom surface and a second position staggered perpendicular to a rotational axis of the saw blade and non-coplanar with the second bottom surface; and
   wherein when in the first position, the second base plate is flush with the first base plate to enclose the saw blade in the saw blade groove.

2. The cutting tool according to claim 1, wherein the first base plate is translational relative to the second base plate by connecting mechanism.

3. The cutting tool according to claim 2, wherein the connecting mechanism comprises a swing arm, one end of the swing arm is pivotally connected with the first base plate by a first pivoting shaft, the other end of the swing arm is pivotally connected with the second base plate by a second pivoting shaft, and the first pivoting shaft and the second pivoting shaft are perpendicular to the abutting surface.

4. The cutting tool according to claim 1, wherein the first base plate is slidable relative to the second base plate.

5. The cutting tool according to claim 1, wherein the blade is provided with an end surface away from the transmission mechanism, the end surface is defined as a first lateral cutting plane, and the first lateral cutting plane and the abutting surface are coplanar.

6. The cutting tool according to claim 1, wherein the blade is provided with an end surface away from the transmission mechanism, the end surface is defined as a first lateral cutting plane, and the first lateral cutting plane is positioned between the transmission mechanism and the abutting surface.

7. The cutting tool according to claim 1, wherein the first base plate is provided with a first abutting surface, the second base plate is provided with a second abutting surface, and the first abutting surface and the second abutting surface are alternatively matched with the guide surface. transmission mechanism is defined as a second lateral cutting plane, the first lateral cutting plane and the first abutting surface are coplanar and the second lateral cutting plane and the second abutting surface are coplanar.

8. The cutting tool according to claim 1, wherein the mode switching mechanism can be set in two positions, when it is in the first position, the mode switching mechanism prevents the relative movement of the first base plate and the second base plate; and when it is in the second position, the mode switching mechanism allows the relative movement of the first base plate and the second base plate.

9. The cutting tool according to claim 8, wherein a maximal distance that the saw blade extends out of the first bottom surface is defined as a maximal cutting depth, when the mode switching mechanism is in the first position, the cutting tool is set by a first maximal cutting depth, when the mode switching mechanism is in the second position, the cutting tool is set by a second maximal cutting depth, and the second maximal cutting depth is smaller than the first maximal cutting depth.

10. The cutting tool according to claim 8, wherein when the mode switching mechanism is in the second position, it prevents the saw blade from being inclined relative to the first bottom surface.

11. A cutting tool, comprising:
    a housing;
    a motor, accommodated in the housing;
    a transmission mechanism, connected to the motor and used for driving a saw blade;
    base plates, connected to the housing, and comprising a first base plate provided with a first bottom surface and a second base plate provided with a second bottom surface;
    a connecting mechanism; and
    a mode switching mechanism comprising a stopping member movable connected to one of the first base plate and the second base plate and a stopping matching portion selectively matched with the stopping member;
    wherein the first base plate and the second base plate are movably connected by the connecting mechanism, such that the base plates can be set in a first position where the first bottom surface and the second bottom surface are coplanar such that the first base plate is flush with the second base plate to enclose the saw blade in a saw blade groove, and a second position where the first bottom surface and the second bottom surface are staggered perpendicular to a rotational axis of the saw blade and non-coplanar.

12. A cutting tool, used tor cutting with a guide device being provided with a guide surface, the cutting tool comprising:
    a housing; a motor, accommodated in the housing;
    a transmission mechanism, connected to the motor and used tor driving a saw blade;
    base plates comprising a first base plate provided with a first bottom surface and a second base plate provided with a second bottom surface;
    a connecting mechanism; and
    a mode switching mechanism, comprising a stopping member movably connected to one of the first base plate and the second base plate and a stopping matching portion selectively matched with the stopping member;
    wherein the first base plate is connected to the housing and provided with a saw blade groove for the saw blade to pass through and an abutting surface; and wherein the second base plate is movably connected to the first base plate by the connecting mechanism, and when the abutting surface is exposed to be matched with the guide surface, the first bottom surface and the second bottom surface are staggered perpendicular to a rotational axis of the saw blade and non-coplanar, and when the abutting surface is not exposed to be matched with the guide surface, the first bottom surface and the second bottom surface are coplanar such that the first base late is flush with the second base plate to enclose the saw blade in the saw blade groove.

* * * * *